(12) United States Patent
Nagatani et al.

(10) Patent No.: US 8,395,306 B2
(45) Date of Patent: Mar. 12, 2013

(54) LIGHT SOURCE UNIT AND PROJECTOR

(75) Inventors: Kaname Nagatani, Matsumoto (JP);
Kunihiko Takagi, Okaya (JP); Tetsuo Shimizu, Matsumoto (JP); Yuji Takado, Matsumoto (JP); Akira Egawa, Shiojiri (JP); Satoshi Kinoshita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 292 days.

(21) Appl. No.: 12/818,030

(22) Filed: Jun. 17, 2010

(65) Prior Publication Data
US 2010/0321645 A1 Dec. 23, 2010

(30) Foreign Application Priority Data

Jun. 18, 2009 (JP) ................... 2009-145047
Jun. 18, 2009 (JP) ................... 2009-145048
Feb. 10, 2010 (JP) ................... 2010-027332
Apr. 2, 2010 (JP) ................... 2010-085856

(51) Int. Cl.
*H01K 1/30* (2006.01)
*G03B 21/28* (2006.01)
*H01J 9/24* (2006.01)
*F21V 7/00* (2006.01)

(52) U.S. Cl. .......... 313/113; 313/111; 313/114; 445/26; 362/217.05

(58) Field of Classification Search .......... 313/627–643, 313/567, 25, 26, 26.3, 318.01–318.12; 445/22, 445/26, 27; 439/226
See application file for complete search history.

(56) References Cited

U.S. PATENT DOCUMENTS
2010/0207503 A1* 8/2010 Egawa et al. ................. 313/111

FOREIGN PATENT DOCUMENTS
JP 2001-109068 4/2001
JP P3350003 9/2002
JP 2007-317656 12/2007

* cited by examiner

*Primary Examiner* — Tracie Y Green
(74) *Attorney, Agent, or Firm* — Maschoff Gilmore & Israelsen

(57) ABSTRACT

A light source unit includes: an arc tube having a light-emitting portion; a secondary reflector covering part of the periphery of the light-emitting portion and being provided with a secondary reflecting surface for reflecting light emitted from the light-emitting portion; a primary reflector having a primary reflecting surface for reflecting the light emitted from the light-emitting portion and the light reflected from the secondary reflector; a first electrode; and a second electrode; wherein the second electrode is arranged at a position which causes an ionic wind to be induced by applying a voltage between the second electrode and the first electrode and causes air between the secondary reflecting surface and the light-emitting portion to flow, and either one of the first electrode or the second electrode is arranged between the arc tube and the secondary reflector.

20 Claims, 46 Drawing Sheets

LIGHT SOURCE UNIT AND PROJECTOR

BACKGROUND

1. Technical Field

The present invention relates to a light source unit and a projector and, more specifically, to a technology of a light source unit having a reflector.

2. Related Art

In a lamp used as a light source of a projector, for example, in a discharge lamp such as an extra-high pressure mercury lamp, a reflector (reflecting mirror) configured to reflect light emitted from an arc tube is employed. In the related art, a configuration of the light source unit for enhancing usage efficiency of light emitted from the arc tube is proposed in order to obtain bright images efficiently using the projector. For example, a technology in which a secondary reflector which covers part of the arc tube is provided separately from the reflector as a primary reflector is proposed (see Japanese Patent No. 3350003, for example). Light reflected from the secondary reflector passes through the arc tube, then falls on the primary reflector, and then is reflected therefrom toward the front. Accordingly, reduction in thickness of the light source unit is achieved while allowing the light emitted from the arc tube to proceed efficiently to an optical system which uses the light from the light source unit.

Japanese Patent No. 3350003 is an example of the related art.

The lamp used in the projector is heated to high temperatures because most part of supplied electric energy is transformed to heat, and thus needs to be cooled down by a cooling wind or the like. In the case of the configuration in which the secondary reflector is provided, a portion of the surface of a light-emitting portion covered with the secondary reflector is difficult to be cooled down. In this case, the portion of the surface of the light-emitting portion covered with the secondary reflector and other portions have different thermal radiation properties. Therefore, there arises a problem of difficulty in adjusting the temperature of the arc tube appropriately. As regards the portion of the arc tube which is not sufficiently cooled down, a transparent member which constitutes the arc tube may become opaque because of crystallization caused by heat. Provision of a blower or a fan duct is conceivable for cooling down the arc tube. However, problems such as complication of the structure and noise generation by the blower may arise.

SUMMARY

An advantage of some aspect of the invention is to provide a light source unit which is capable of adjusting the temperature of an arc tube appropriately, is simplified in structure, and achieves suppression of noise generation, and a projector having this light source unit.

An aspect of the invention is directed to a light source unit including:

an arc tube having a light-emitting portion;

a secondary reflector covering part of the periphery of the light-emitting portion and being provided with a secondary reflecting surface for reflecting light emitted from the light-emitting portion;

a primary reflector having a primary reflecting surface for reflecting the light emitted from the light-emitting portion and the light reflected from the secondary reflector;

a first electrode; and a second electrode;

wherein the second electrode is arranged at a position which causes an ionic wind to be induced by applying a voltage between the second electrode and the first electrode and causes air between the secondary reflecting surface and the light-emitting portion to flow, and either one of the first electrode or the second electrode is arranged between the arc tube and the secondary reflector.

Since the air between the secondary reflecting surface and the light-emitting portion is caused to flow by means of the ionic wind, the light-emitting portion which is a portion of the arc tube covered with the secondary reflector is cooled down effectively. Accordingly, an appropriate temperature control of the arc tube is achieved. Also, since what should be done is just to apply a voltage between the first electrode and the second electrode, the light-emitting portion can be cooled down without using a blower or a fan duct. Accordingly, simplification of the structure and suppression of noise generation are achieved. The ionic wind is a wind induced by a corona discharge or a surface discharge generated when a predetermined voltage is applied between the first electrode and the second electrode. When the predetermined voltage is applied between the first electrode and the second electrode, air molecules are ionized by the corona discharge or the surface discharge in the vicinity of the electrode connected to an anode side, and moves toward the electrode connected to a cathode side. The wind induced by the movement of the ionized air is referred to as the ionic wind.

In a preferred embodiment of the invention, the light source unit includes the arc tube having the light-emitting portion configured to emit light; the secondary reflector covering part of the periphery of the light-emitting portion and being provided with the secondary reflecting surface for reflecting the light emitted from the light-emitting portion; the primary reflector having the primary reflecting surface for reflecting the light emitted from the light-emitting portion and the light reflected from the secondary reflector; the first electrode arranged between the secondary reflector and the light-emitting portion, and the second electrode arranged at a position to induce the ionic wind by applying a voltage between the first electrode and the second electrode and cause the air between the secondary reflecting surface and the light-emitting portion to flow.

The corona discharge is apt to occur when the distal end of the electrode is pointed.

In a preferred embodiment of the invention, the first electrode is arranged so as to be shifted from the second electrode toward the light-emitting portion. By connecting the first electrode to the anode side and the second electrode to the cathode side, the ionic wind flowing from the first electrode toward the second electrode is induced, so that the air between the secondary reflecting surface and the light-emitting portion is caused to flow with higher reliability. Accordingly, the temperature control of the arc tube is performed more appropriately.

In a preferred embodiment of the invention, the arc tube includes a first sealed portion provided integrally with one side of the light-emitting portion, and a second sealed portion provided integrally with the other side of the light-emitting portion, and further includes an extending portion formed integrally with the secondary reflector so as to cover the first sealed portion, and the second electrode is arranged between the extending portion and the first sealed portion. Even when the secondary reflector includes the extending portion, the air between the light-emitting portion and the secondary reflecting surface is caused to flow using the ionic wind flowing from the second electrode to the first electrode, so that the temperature control of the light-emitting tube is performed appropriately.

In a preferred embodiment of the invention, the second electrode has a needle-like shape. The ionic wind can be induced by causing the corona discharge between a distal end of the second electrode having the needle-like shape and the first electrode.

In a preferred embodiment of the invention, a plurality of the second electrodes are provided. Since the ionic wind can be induced at a plurality of positions with the provision of the plurality of second electrodes, the air between the secondary reflecting surface and the light-emitting portion can be significantly flowed, so that cooling of the light-emitting portion is achieved further effectively.

In a preferred embodiment of the invention, the plurality of second electrodes are arranged in such a manner that the distances between distal ends of the second electrodes and the first electrodes are varied from one second electrode to another. By varying the distances between the distal ends of the second electrodes and the first electrodes from one second electrode to another, the ionic winds being different in state from one second electrode to another can be induced. For example, the flow of the air between the arc tube and the secondary reflecting surface can be made controllable by inducing the ionic winds having different strength from one second electrode to another. By controlling the flow of the air, enhancement of cooling efficiency is achieved by causing the air around a portion of the light-emitting portion, which often becomes hot, to flow significantly.

In a preferred embodiment of the invention, the second electrode is formed by applying a conductive material onto the secondary reflector. Since the second electrode can be formed with a relatively simple operation such as applying the conductive material, reduction of the manufacturing cost of the light source unit is achieved. If the second electrode is too thin, it may be destroyed when a voltage is applied thereon. In contrast, if the second electrode is formed by application of the coating, a certain thickness can be provided to the second electrode by applying the coating repeatedly. Therefore, by providing the certain thickness to the second electrode, the second electrode which is hardly destroyed even when a voltage is applied thereon is formed.

In a preferred embodiment of the invention, the second electrode is formed by evaporating the conductive material onto the secondary reflector. The secondary reflecting surface of the secondly reflector may be formed by evaporating the metallic material. By forming the second electrode also by evaporating the metallic material, which is the conductive material, the secondary reflecting surface and the second electrode can be formed in one process, so that the reduction of the manufacturing cost of the light source unit on the basis of reduction of the manufacturing steps is achieved.

In a preferred embodiment of the invention, the second electrode is formed by bonding the sheet-shaped conductive material onto the secondary reflector. Since the second electrode can be formed with a relatively simple operation such as bonding the sheet-shaped conductive material, the reduction of the manufacturing cost of the light source unit is achieved. If the second electrode is too thin, it may be destroyed when a voltage is applied thereon. In contrast, by using the sheet-shaped conductive material having a certain thickness, the second electrode which is hardly destroyed even when a voltage is applied thereon is formed.

In a preferred embodiment of the invention, an edge portion of the second electrode on the side of the first electrode has a sawtooth shape having a plurality of projections and depressions in plan view. Since the ionic wind can be induced from apex portions of the plurality of projections and depressions owing to the sawtooth shape having the plurality of projections and depressions, the air between the secondary reflecting surface and the light-emitting portion can be significantly flowed, so that cooling of the light-emitting portion is achieved further effectively.

In a preferred embodiment of the invention, the sawtooth shape of the second electrode is an irregular shape in such a manner that the distances from the apex portions of the projections and depressions to the first electrodes are varied from one apex portion to another. By differentiating the distances between the apex portions of the projections and depressions and the first electrodes from apex portions to another, the ionic winds being different from one apex portion to another can be induced. For example, the flow of the air between the arc tube and the secondary reflecting surface can be made controllable by inducing the ionic winds having different strength from one apex portion to another. By controlling the flow of the air, the enhancement of the cooling efficiency is achieved by causing the air around a portion of the light-emitting portion which often becomes hot to flow significantly. Also, by forming the sawtooth shape on the second electrode, the positional relationship of the apex portions can be defined in advance, so that the positional adjustment of the apex portions with respect to each other at the time of assembly of the light source unit is no longer necessary. Accordingly, an assembleability of the light source unit is improved, and the reduction of the manufacturing cost is achieved.

In a preferred embodiment of the invention, the first electrode is a reflecting film formed by evaporating the conductive material onto the secondary reflecting surface for reflecting light. By using the reflecting film which reflects the light from the second reflecting surface as the first electrode, provision of the additional first electrode is no longer necessary, so that cost reduction on the basis of reduction of the number of components is achieved.

In a preferred embodiment of the invention, the light source unit includes the arc tube having the light-emitting portion configured to emit the light, and a first sealed portion provided integrally with the light-emitting portion on one side, the secondary reflector having the secondary reflecting surface configured to reflect the light emitted from the light-emitting portion by covering part of the periphery of the light-emitting portion and the extending portion configured to cover the first sealed portion, the primary reflector configured to reflect the light emitted from the light-emitting portion and the light reflected from the secondary reflector, an insulating sheet provided between the extending portion and the first sealed portion, the first electrode arranged between the insulating sheet and the extending portion, and the second electrode arranged on the side of the insulating sheet opposite from the side where the first electrode is arranged, the first electrode is arranged so as to be shifted from the second electrode toward the light-emitting portion, and the ionic wind is induced by applying a voltage between the first electrode and the second electrode to allow the air between the secondary reflecting surface and the light-emitting portion to flow.

The surface discharge occurs more easily than the corona discharge even with the electrode having no pointed electrode, so that ionization of the air might be achieved in a wide range. For example, the air might be ionized in the periphery of substantially the entire area of a flat portion thereof even when the electrode has the flat portion at the distal end thereof, and hence generation of the strong ionic wind is achieved. Therefore, the air between the light-emitting portion and the secondary reflecting surface is caused to flow significantly, so that cooling of the light-emitting portion is achieved further effectively.

Since the surface discharge can be caused even when an AC voltage is applied, the ionic wind can be induced without using a component for converting the voltage even when the AC voltage is supplied from the power source. Therefore, the component for converting the voltage can be eliminated, and hence the cost reduction is achieved. Since the insulating sheet is provided between the first electrode and the second electrode, a spark hardly occurs between the both electrodes. Accordingly, destruction of the electrode due to the spark or influence of the spark on other electronic apparatuses is restrained.

In a preferred embodiment of the invention, the extending portion, the first electrode, and the second electrode are formed into a cylindrical shape which surrounds substantially the entire circumference of the first sealed portion. Since the ionic wind can be induced from substantially the entire circumference of the first sealed portion, the air in the periphery of the entire light-emitting portion is caused to flow accordingly, so that the cooling of the light-emitting portion is achieved further effectively.

In a preferred embodiment of the invention, the light source unit includes the arc tube having the light-emitting portion configured to emit the light and the first sealed portion provided integrally with the light-emitting portion on one side, the secondary reflector having a secondary reflecting portion formed with the secondary reflecting surface configured to reflect the light emitted from the light-emitting portion by covering part of the periphery of the light-emitting portion and a first extending portion configured to cover the first sealed portion, the primary reflector configured to reflect the light emitted from the light-emitting portion and the light reflected from the secondary reflecting surface, the first electrode arranged on the opposite side of the secondary reflector from the side where the arc tube is provided, and the second electrode arranged between the first sealed portion and the first extending portion, and is characterized in that the first electrode is arranged so as to be shifted from the second electrode toward the light-emitting portion, and the ionic wind is induced by applying a voltage between the first electrode and the second electrode to allow the air between the secondary reflecting surface and the light-emitting portion to flow.

In a preferred embodiment of the invention, the first electrode is covered with an insulating layer. Since the first electrode is covered with an insulating film, a user is prevented from touching the first electrode by mistake. In other words, an accident of an electrical shock due to a touch with respect to the first electrode in the state of being applied with a voltage can be prevented from occurring. Also, the generation of the ionic wind on the outside of the secondary reflector is restrained.

In a preferred embodiment of the invention, the first extending portion is formed with an opening at a position further from the light-emitting portion than the second electrode so as to penetrate therethrough from the surface on the side of the arc tube to the opposite surface. Since the opening is formed through the extending portion, the air is easily supplied from the outside of the secondary reflector, so that the quantity of the ionic wind can be increased.

In a preferred embodiment of the invention, the first electrode extends from the first extending portion to a back surface of the secondary reflecting surface. Since the first electrode extends from the first extending portion to the back surface of the secondary reflecting surface, the ionic wind can be introduced between the light-emitting portion and the secondary reflecting surface more reliably.

In a preferred embodiment of the invention, the primary reflector has substantially the same shape as a curved surface obtained by cutting a surface of revolution obtained by rotating a predetermined curved line about a center axis along a predetermined plane, and the secondary reflector covers the opposite side of the light-emitting portion from the side where the primary reflector is provided. In this configuration, reduction in thickness of the light source unit is achieved.

In a preferred embodiment of the invention, the arc tube includes the second sealed portion provided integrally with the light-emitting portion on the other side, the secondary reflector includes a second extending portion which covers the second sealed portion, a third electrode arranged between the secondary reflector and the arc tube, and a fourth electrode arranged on the opposite side of the second extending portion from the side where the arc tube is provided, the third electrode is arranged so as to be shifted from the fourth electrode toward the light-emitting portion, and the ionic wind is induced by applying a voltage between the third electrode and the fourth electrode to allow the air between the secondary reflecting surface and the light-emitting portion to flow. Since the ionic wind can be induced also between the second extending portion and the second sealed portion, the air between the secondary reflecting surface and the light-emitting portion can be flowed further significantly, so that the cooling of the arc tube is achieved still further effectively.

In a preferred embodiment of the invention, the primary reflector has substantially the same shape as the surface of revolution obtained by rotating the predetermined curved line about the center axis, and the secondary reflector preferably covers the light-emitting portion on the side of the surface to be irradiated. Accordingly, the light source unit which is capable of causing the light emitted from the light-emitting portion to proceed efficiently toward the front is obtained.

In a preferred embodiment of the invention, the light source unit includes the arc tube having the light-emitting portion configured to emit the light, and the first sealed portion provided integrally with the light-emitting portion on one side, the secondary reflector having the secondary reflecting portion formed with the secondary reflecting surface configured to reflect the light emitted from the light-emitting portion by covering part of the periphery of the light-emitting portion, and the first extending portion configured to cover the first sealed portion, the primary reflector configured to reflect the light emitted from the light-emitting portion and the light reflected from the secondary reflecting surface, the electrodes provided so as to interpose an insulator therebetween and configured to cause the ionic wind to induce by being applied with a voltage, and a power feeding member being fitted to at least one of the primary reflector and the secondary reflector so as to come into contact with the electrode, and is characterized in that the electrodes includes a first electrode and a second electrode provided between the first sealed portion and the first extending portion, the power feeding member includes a first power feeding member coming into contact with the first electrode, and a second power feeding member coming into contact with the second electrode, and the first electrode is arranged so as to be shifted from the second electrode toward the light-emitting portion to allow the air between the secondary reflecting surface and the light-emitting portion to flow by means of the ionic wind.

Since the power feeding members are not secured to but are brought into contact with the respective electrodes, even though the coefficients of linear expansion of the respective electrodes are different from the coefficients of the linear expansion of the power feeding members for example, what will occur is only a shift corresponding to the difference in degree of expansion from each other under a high-temperature environment and the low-temperature environment. Therefore, there is no risk of occurrence of cracks at a connected point as in the case of the connection using the solder, so that a power supply with higher reliability can be realized.

In a preferred embodiment of the invention, the first electrode and the second electrode are provided with the intermediary of the insulator therebetween.

In a preferred embodiment of the invention, the primary reflector has substantially the same shape as the surface of revolution obtained by rotating the predetermined curved line about the center axis, and the secondary reflector covers the light-emitting portion on the side of the surface to be irradiated. Accordingly, the light source unit which is capable of causing the light emitted from the light-emitting portion to proceed efficiently toward the front is obtained.

In a preferred embodiment of the invention, the insulator is the secondary reflector. Since the secondary reflector formed of quartz or the like can be used as the insulator, the reduction of the number of components and the reduction of the manufacturing cost are achieved.

In a preferred embodiment of the invention, the insulator is the insulating film provided between the first sealed portion and the first extending portion. In general, the insulating film can easily be formed to be thinner than the secondary reflector. Therefore, by employing the insulating film thinner than the secondary reflector as the insulator, the ionic wind can be induced with a lower voltage applied thereto.

In a preferred embodiment of the invention, at least one of the first power feeding member and the second power feeding member includes a power receiving portion connected to a power cable, and the power receiving portion is configured to hold the power cable by clipping the same. The respective electrodes and the power cable can be connected directly by soldering or the like. However, the solder may be melted by heat from the arc tube, so that it is difficult to maintain a favorable connecting state. In contrast, since the power feeding member holds the power cable by clipping the same, the solder or the like does not have to be used for connecting the power cable. Therefore, by using the power feeding members, a power supply with high reliability is realized even under the high-temperature environment, namely, in the vicinity of the arc tube.

In a preferred embodiment of the invention, at least one of the first power feeding member and the second power feeding member is fitted to the secondary reflector so as to clip the first electrode or the second electrode and part of the secondary reflector. Accordingly, the highly reliable power supply is realized by bringing the electrode and the power feeding member into contact with each other.

In a preferred embodiment of the invention, at least one of the first power feeding member and the second power feeding member clips the first extending portion from the opposite side from the surface to be irradiated. Since the power feeding member clips the first extending portion from the opposite side from the surface to be irradiated, the irradiation of the light is prevented from being intercepted by the power feeding member, so that lowering of light usage efficiency is prevented.

In a preferred embodiment of the invention, the extending portion includes a cylindrical portion having substantially a cylindrical shape, and the second power feeding member has a coil shape formed into a helical shape having an outer diameter larger than an inner diameter of the cylindrical portion and is fitted to the inner surface of the cylindrical portion so as to come into contact with the second electrode by being inserted into the cylindrical portion. Since the second power feeding member is compressed when the second power feeding member formed into the helical shape having the outer diameter larger than the inner diameter of the cylindrical portion is inserted into the cylindrical portion, the second power feeding member can be brought into tight contact with the second electrode by an elastic force thereof.

In a preferred embodiment of the invention, the extending portion includes the cylindrical portion having substantially the cylindrical shape, and the first power feeding member has substantially a C-shape having an inner diameter smaller than an outer diameter of the cylindrical portion and is fitted to the outer peripheral surface of the cylindrical portion so as to come into contact with the first electrode. Since the inner diameter of the first power feeding member is expanded when the first power feeding member in substantially the C-shape having the inner diameter smaller than the outer diameter of the cylindrical portion is fitted to the outer peripheral surface of the cylindrical portion, the first power feeding member can be brought into tight contact with the first electrode by the elastic force thereof.

In a preferred embodiment of the invention, the second power feeding member has substantially a C-shape having the outer diameter larger than the inner diameter of the cylindrical portion and is fitted to the inner surface of the cylindrical portion so as to come into contact with the second electrode by being inserted into the cylindrical portion. Since the second power feeding member is compressed when the second power feeding member in substantially the C-shape being larger than the inner diameter of the cylindrical portion is fitted to the inner surface of the cylindrical portion, the second power feeding member can be brought into tight contact with the second electrode with the elastic force thereof.

In a preferred embodiment of the invention, the primary reflector includes a proximal portion to be secured to at least one of the extending portion and the first sealed portion, and the first feeding member is fitted to an outer peripheral surface of the proximal portion and comes into contact with the first electrode. By fitting the first power feeding portion on the outer peripheral surface of the proximal portion of the primary reflector, the first power feeding portion is brought into contact with the first electrode while being fixed, so that the power supply to the first electrode is achieved.

Another aspect of the invention is directed to a projector including the above-described light source unit, a voltage applying unit configured to apply a voltage between the first electrode and the second electrode, and a spatial light modulator configured to modulate the light emitted from the light source unit according to an image signal. By using the above-described light source unit, the projector which is capable of cooling down the light-emitting portion effectively while restraining complication of the structure and the noise generation is obtained.

In a preferred embodiment of the invention, an insulator provided so as to be interposed between the first electrode and the second electrode is further included, and the voltage applying unit applies an AC voltage between the first electrode and the second electrode. Since the spark is hardly generated between the first electrode and the second electrode, the destruction of the electrode due to the spark and the influence of the spark on other electronic apparatuses are restrained, so that the projector which can be operated stably is achieved.

In a preferred embodiment of the invention, the voltage applying unit applies a voltage which causes the corona discharge between the first electrode and the second electrode, but does not cause the spark. Accordingly, the destruction of the electrode due to the spark and the influence of the spark on other electronic apparatuses are restrained, so that the projector which can be operated stably is achieved.

BRIEF DESCRIPTION OF THE DRAWINGS

The invention will be described with reference to the accompanying drawings wherein like numbers reference like elements.

DESCRIPTION OF EXEMPLARY EMBODIMENTS

Figure 1:
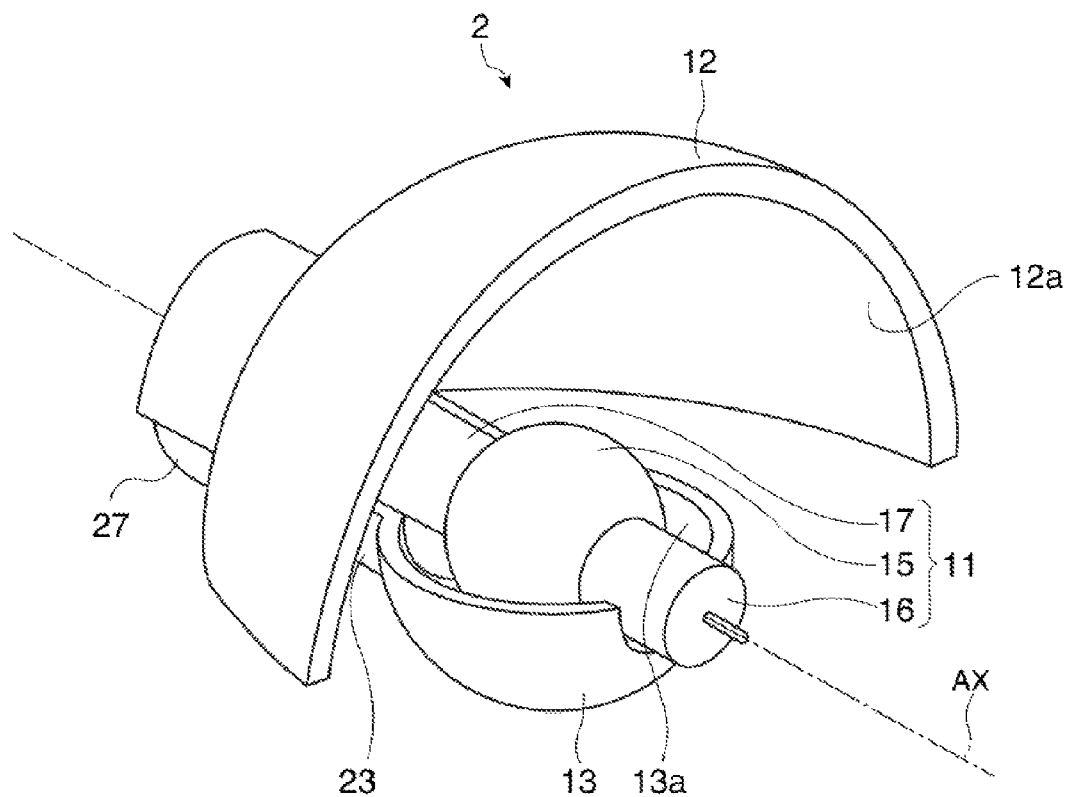
FIG. 1 is an external perspective view showing a schematic configuration of a light source unit according to a first embodiment of the invention.

Referring now to the drawings, embodiments of the invention will be described below. In all the drawings described below, components may be illustrated in different scales so that the respective components are easily viewable. The same parts are designated by the same reference numerals and overlapped descriptions thereof may be omitted.

First Embodiment

Figure 2:
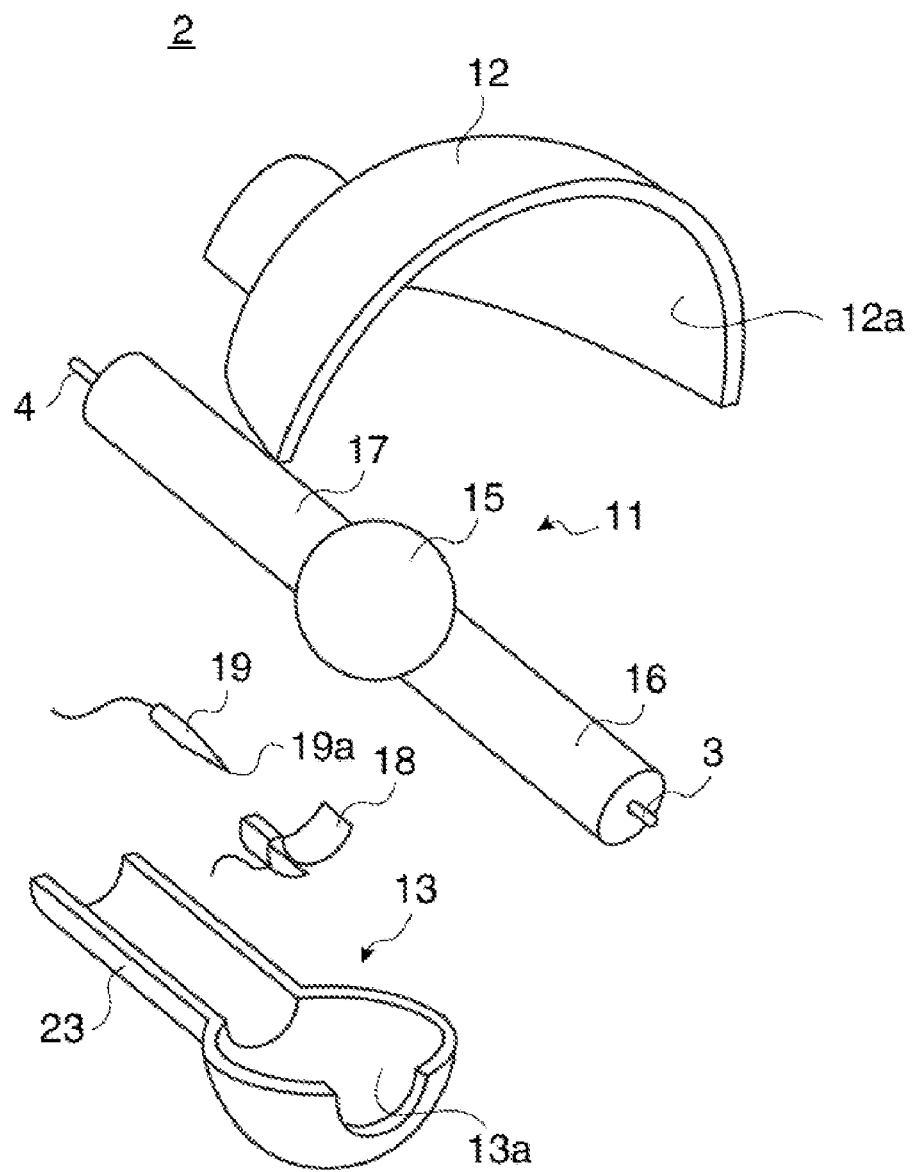
FIG. 2 is an exploded perspective view of the light source unit.
Figure 3:
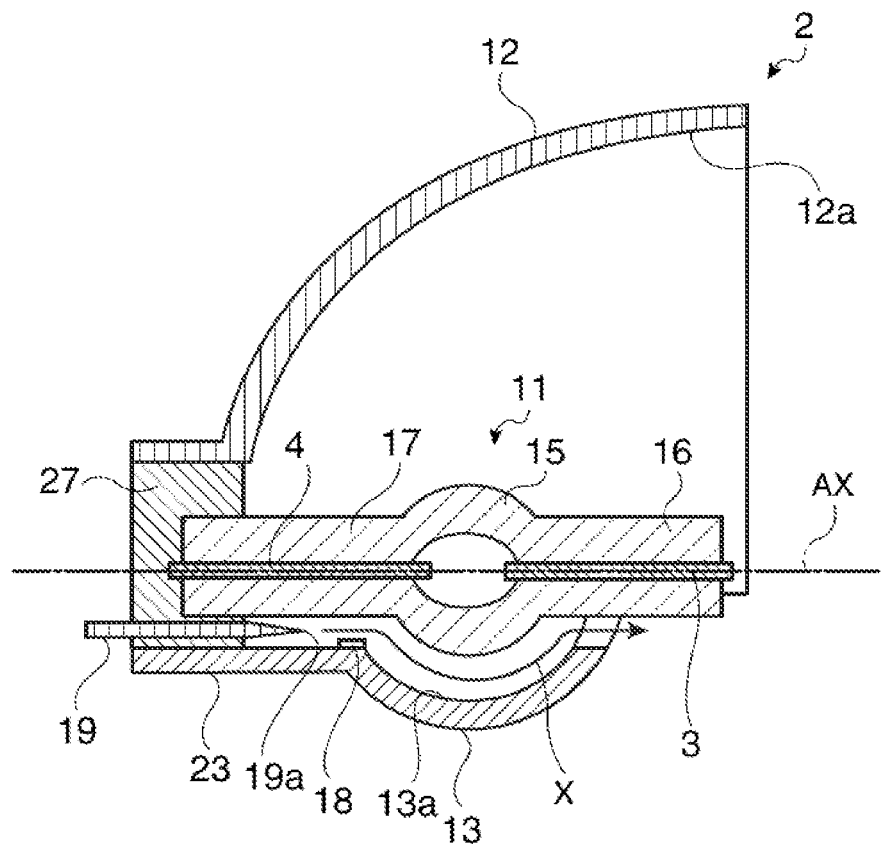
FIG. 3 is a lateral cross-sectional view of the light source unit.

FIG. 1 is an external perspective view showing a schematic configuration of a light source unit 2 according to a first embodiment of the invention. FIG. 2 is an exploded perspective view of the light source unit 2 shown in FIG. 1. FIG. 3 is a lateral cross-sectional view of the light source unit 2 shown in FIG. 1. The light source unit 2 includes an arc tube 11, a primary reflector 12, a secondary reflector 13, a first cooling electrode (first electrode) 18, and a second cooling electrode (second electrode) 19. The light source unit 2 emits light containing red (R) light, green (G) light, and blue (B) light. In the description of the embodiments of this application, an X-axis is an axis orthogonal to a center axis AX of the arc tube 11. A Y-axis is an axis orthogonal to the center axis AX and the X-axis. A Z-axis is an axis parallel to the center axis AX. The direction of an arrow of the Z-axis indicates a direction from the light source unit 2 toward a surface to be irradiated, not shown. The directions of arrows of the respective axes are determined to be positive directions, and opposite directions are determined to negative directions. The side of the positive direction along the Z-axis with respect to the light source unit 2 (the side where the surface to be irradiated exists) is referred to as "front side" and the side of the negative direction is referred to as "back side". Likewise, the side of the positive direction along the Y-axis with respect to the light source unit 2 is referred to as "upper side", and the side of the negative direction is referred to as "lower side".

The arc tube 11 is, for example, an extra-high pressure mercury lamp. The arc tube 11 includes a light-emitting portion 15 having substantially a spherical shape. In the interior of the light-emitting portion 15, light is emitted from the light-emitting portion 15 by the formation of an arc between arc electrodes 3 and 4. The light-emitting portion 15 includes a second sealed portion 16 and a first sealed portion 17 provided integrally. The first sealed portion 17 has a cylindrical shape, and is provided on one side (back side) of the light-emitting portion 15. The second sealed portion 16 has a cylindrical shape and is provided on the other side (front side) of the light-emitting portion 15. With the configuration as described above, the arc tube 11 has a shape having the light-emitting portion 15 interposed between the second sealed portion 16 and the first sealed portion 17.

The primary reflector 12 includes a primary reflecting surface 12a configured to reflect the light emitted from the light-emitting portion 15. The primary reflector 12 reflects the light emitted from the light-emitting portion 15 off the primary reflecting surface 12a, and causes the same to proceed to the front side. The primary reflecting surface 12a has substantially the same shape as a curved surface obtained by cutting a spheroid obtained by rotating an ellipse about the center axis AX along a predetermined plane. In this embodiment, the term "predetermined plane" means a plane including the center axis AX of the arc tube 11. The predetermined plane may be a plane other than the flat plane including the center axis AX in order to enhance light usage efficiency. The predetermined plane may be a plane parallel to the center axis AX or a plane extending at an angle with respect to the center axis AX, for example.

The primary reflector 12 is formed by evaporating a high-reflective member, for example, a dielectric multilayer film or a metallic member onto the surface of a base material formed into a desired shape. The high-reflective member uses a member demonstrating a high reflectance ratio for light having wavelengths in a visible region. By using the primary reflector 12 having the primary reflecting surface 12a of the shape obtained by cutting the spheroid, the light source unit 2 having a thickness smaller than light source units employing a reflector of the shape obtained not by cutting the spheroid is achieved. The primary reflecting surface 12a is not limited to substantially the same shape as the curved surface obtained by cutting the spheroid. For example, a shape substantially the same as a curved surface obtained by cutting a surface of revolution formed by rotating a predetermined curved line such as a parabola, or a shape of a free curved surface may also be employed.

The secondary reflector 13 includes a secondary reflecting surface 13a configured to reflect the light emitted from the light-emitting portion 15. The secondary reflector 13 reflects the light emitted from the light-emitting portion off the secondary reflecting surface 13a toward the light-emitting portion 15. The light reflected from the secondary reflecting surface 13a enters the primary reflecting surface 12a, and is reflected from the primary reflecting surface 12a and proceeds to the front side. The secondary reflecting surface 13a covers part of the periphery of the light-emitting portion 15 from the underside. A clearance is provided between the secondary reflector 13 and the light-emitting portion 15. The secondary reflector 13 is formed by evaporating the high-reflective member, for example, the dielectric multilayer film or the metallic member onto the surface of the base material formed into a desired shape. The high-reflective member uses the member demonstrating the high reflectance ratio for light having wavelengths in the visible region. With the provision of the primary reflector 12 and the secondary reflector 13, the light emitted from the light-emitting portion 15 is allowed to proceed efficiently toward the front.

The secondary reflector 13 includes an extending portion 23 rearward thereof so as to cover part of the first sealed portion 17. By the extending portion 23 bonded to a securing portion 27, positioning and fixation of the secondary reflector 13 in the light source unit 2 are achieved. The securing portion 27 serves to secure the arc tube 11, the primary reflector 12, and the secondary reflector 13 integrally.

The first cooling electrode 18 and the second cooling electrode 19 serve to induce an ionic wind by applying a voltage between the both electrodes 18 and 19. The first cooling electrode 18 is formed by bending the plate-shaped metallic member being rectangular in plan view so as to follow the shape of the extending portion 23. The first cooling electrode 18 is located between the first sealed portion 17 of the arc tube 11 and the extending portion 23 of the secondary reflector 13 and is arranged in the vicinity of the secondary reflecting surface 13a. Here, the first cooling electrode 18 is arranged between the first sealed portion 17 and the extending portion 23, the light reflected from the secondary reflecting surface 13a is hardly intercepted by the first cooling electrode 18, so that lowering of light usage efficiency is restrained.

The second cooling electrode 19 is formed of the needle-shaped metallic member. The second cooling electrode 19 is arranged in such a manner that a pointed distal end 19a portion is arranged between the first sealed portion 17 of the arc tube 11 and the extending portion 23 of the secondary reflector 13 at a position shifted backward from the first cooling electrode 18. In this arrangement, the first cooling electrode 18 is arranged at a position shifted from the distal end 19a of the second cooling electrode 19 toward the light-emitting portion 15.

The first cooling electrode 18 is connected to a cathode side of a voltage applying unit, not shown, and the second cooling electrode 19 is connected to an anode side of the voltage applying unit. Then, a voltage is applied between the both electrodes 18 and 19 using the voltage applying unit. Consequently, a corona discharge is caused between the both electrodes 18 and 19. Air molecules ionized by the corona discharge near the distal end 19a of the second cooling electrode 19 are attracted by and moved to the first cooling electrode 18. The ionized air molecules collide with other air molecules when they are moving, and induces so-called the ionic wind from the second cooling electrode 19 toward the first cooling electrode 18. The voltage to be applied between the both electrodes 18 and 19 is preferably of a magnitude which does not generate a spark between the both electrodes 18 and 19. For example, when the distance between the distal end 19a of the second cooling electrode 19 and the first cooling electrode 18 is approximately 2 mm, a voltage of 2 to 3 kV is applied between the both electrodes 18 and 19.

With the generation of the ionic wind flowing from the second cooling electrode 19 toward the first cooling electrode 18, a flow of air along an arrow X is generated, so that the air between the light-emitting portion 15 and the secondary reflecting surface 13a is caused to flow. Accordingly, the portion of the arc tube 11 covered with the secondary reflector 13 can effectively be cooled down, and hence the appropriate temperature adjustment of the arc tube 11 is achieved. Since the air between the light-emitting portion 15 and the secondary reflecting surface 13a is caused to flow without providing a blower or a fan duct, the probability of occurrence of the problems such as complication of the structure and noise generation by the blower is reduced. In addition, since the ionic wind is induced in a portion where the air flow is wanted, that is, in the vicinity of the portion between the light-emitting portion 15 and the secondary reflecting surface 13a, an effective cooling is achieved with a small quantity of wind.

Figure 4:
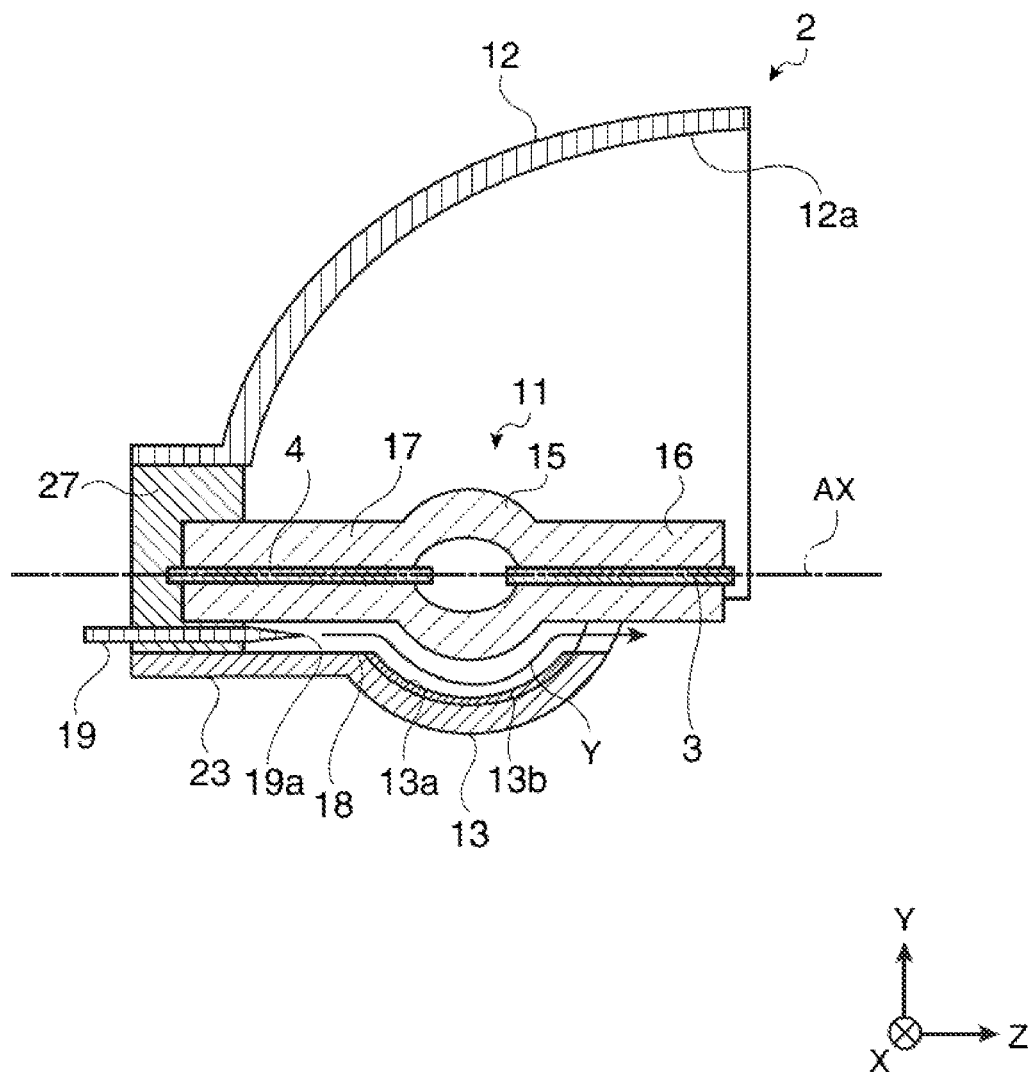
FIG. 4 is a lateral cross-sectional view of the light source unit according to a first modification of the first embodiment.

FIG. 4 is a lateral cross-sectional view of the light source unit 2 according to a first modification of the first embodiment. In the first modification, a reflecting film 13b formed on the secondary reflecting surface 13a is used as the first cooling electrode 18. More specifically, the reflecting film 13b is formed by evaporating metal, which is a conductive material, onto the secondary reflecting surface 13a. Then, the reflecting film 13b is connected to the cathode side of the voltage applying unit.

By the application of a voltage between the second cooling electrode 19 and the reflecting film 13b, the ionic wind flowing from the second cooling electrode 19 toward the reflecting film 13b can be induced. Accordingly, since the air between the light-emitting portion 15 and the secondary reflecting surface 13a is caused to flow by generating a flow of air along an arrow Y, the effective cooling of the light-emitting portion 15 is achieved. Since the reflecting film 13b formed for reflecting the light emitted from the light-emitting portion 15 can be used as an electrode for inducing the ionic wind, the number of components is reduced in comparison with a case where the electrode is separately provided, so that cost reduction is achieved.

Figure 5:
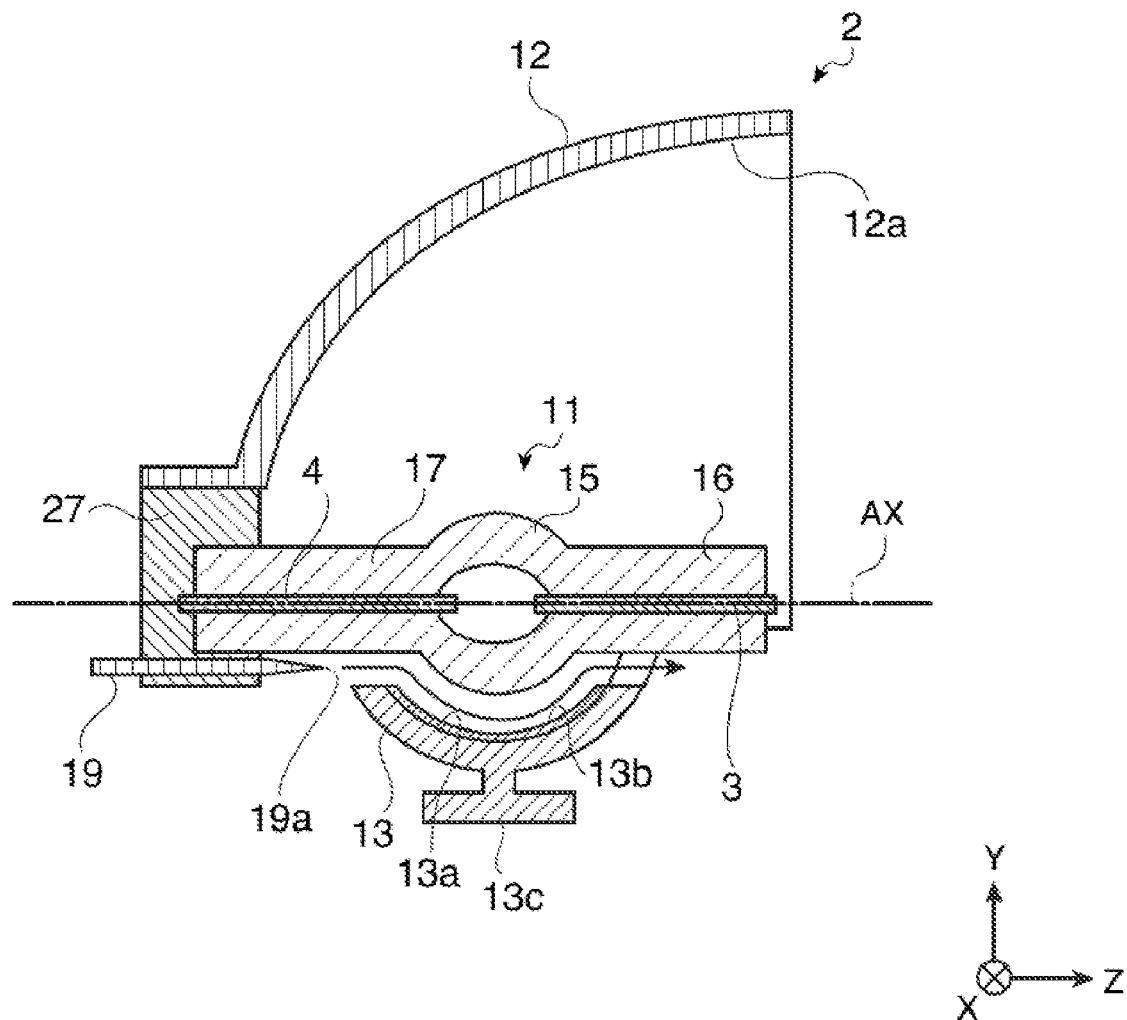
FIG. 5 is a lateral cross-sectional view of the light source unit according to a second modification of the first embodiment.

FIG. 5 is a lateral cross-sectional view of the light source unit 2 according to a second modification of the first embodiment. In the light source unit 2 according to the second modification, the reflecting film 13b formed on the secondary reflector 13 is used as the first cooling electrode 18 in the same manner as the first modification. The secondary reflector 13 provided in the light source unit 2 according to the second modification is not provided with the extending portion, but is provided with a fixing portion 13c on the opposite side from the secondary reflecting surface 13a. For example, if the light source unit is provided with an explosion-proof cover which covers the underside of the primary reflector, the secondary reflector 13 can be fixed by fixing the same to the explosion-proof cover using the fixing portion 13c.

The second cooling electrode 19 is arranged in the vicinity of the rear end of the reflecting film 13b. The second cooling electrode 19 is arranged in such a manner that the distal end thereof is shifted backward from the rear end of the reflecting film 13b. The extending portion is not provided on the secondary reflector 13 in the second modification. However, with the configuration of the first cooling electrode 18 and the second cooling electrode 19 as described above, the ionic wind flowing along the arrow Y is induced, and hence the air between the light-emitting portion 15 and the secondary reflecting surface 13a is caused to flow. Accordingly, the effective cooling of the light-emitting portion 15 is enabled.

Figure 6:
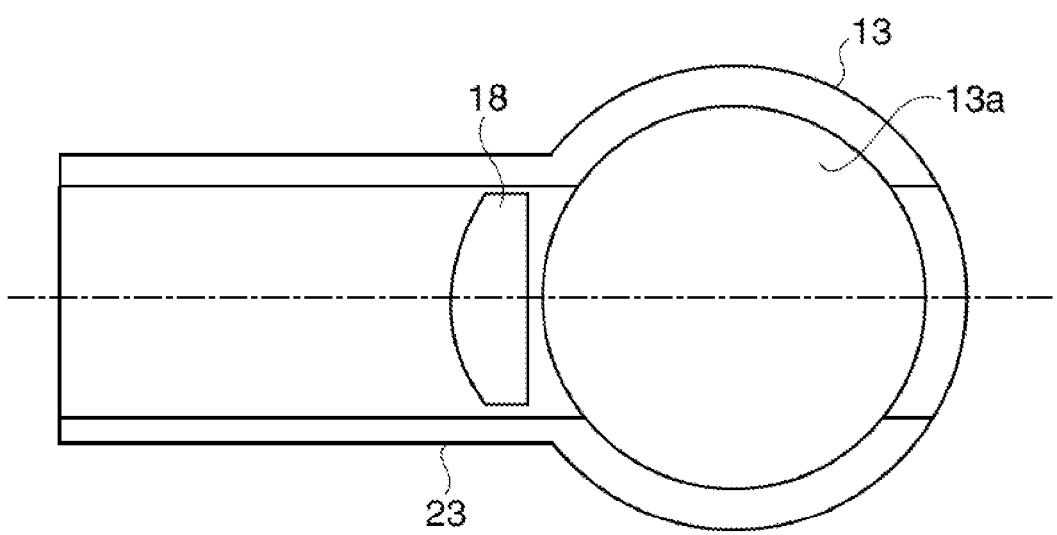
FIG. 6 is a plan view of a secondary reflector provided in the light source unit according to a third modification of the first embodiment.

FIG. 6 is a plan view of a portion of the secondary reflector 13 provided in the light source unit according to a third modification of the first embodiment. In the third modification, the first cooling electrode 18 has a shape having an arcuate portion on the back portion in a state of being mounted on the secondary reflector 13. In the case where the first cooling electrode 18 is formed into such shape as described above, the air between the light-emitting portion and the secondary reflecting surface 13a can be caused to flow using the ionic wind, and the effective cooling of the light-emitting portion 15 is achieved.

Second Embodiment

Figure 7:
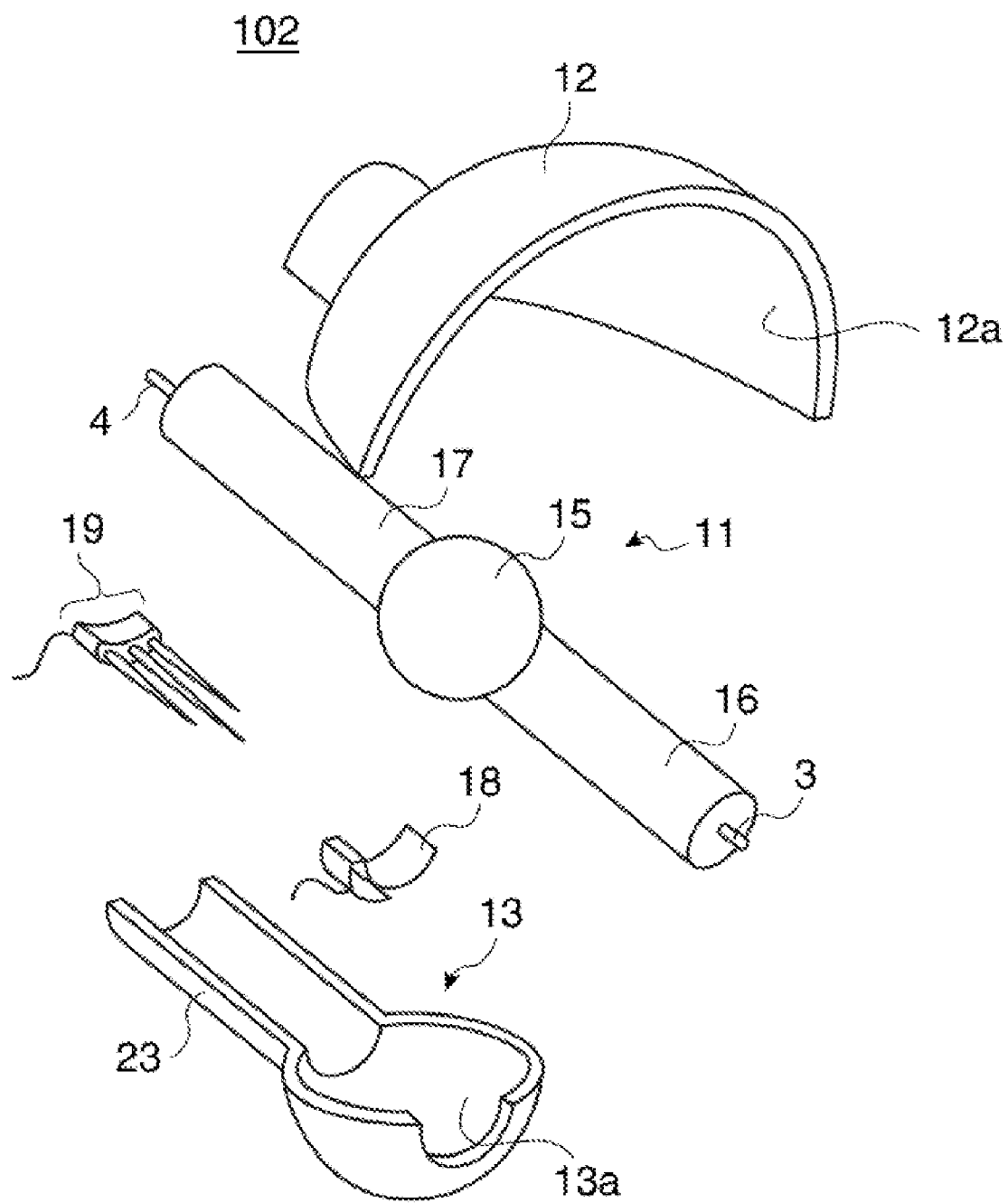
FIG. 7 is an exploded perspective view of a light source unit according to a second embodiment of the invention.

FIG. 7 is an exploded perspective view of a light source unit according to a second embodiment of the invention. In the second embodiment, the second cooling electrode 19 is formed of the metallic member having a plurality of needle members (hereinafter, referred to as needle members).

Figure 8:
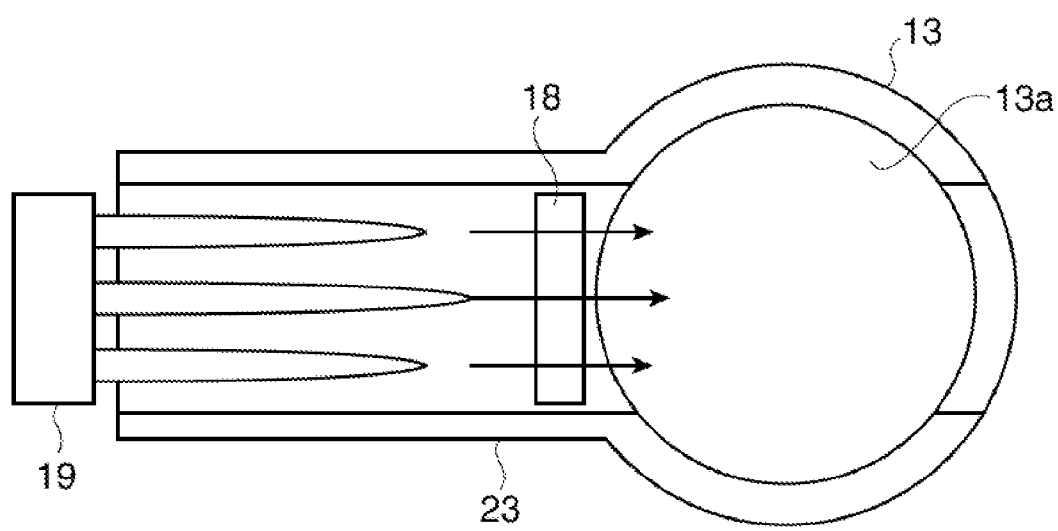
FIG. 8 is a plan view of a portion of the secondary reflector.

FIG. 8 is a plan view of a portion of the secondary reflector 13 provided in a light source unit 102 shown in FIG. 7. As shown in FIG. 8, since the second cooling electrode 19 includes a plurality of needle members, the ionic wind is induced at a plurality of points so that a larger flow of the air between the light-emitting portion 15 and the secondary reflector 13 is generated. Accordingly, the cooling of the light-emitting portion 15 is achieved further effectively. Also, as shown in FIG. 8, by varying the distances between the distal ends of the needle members which constitute the second cooling electrode 19 and the first cooling electrode 18 from one needle member to another, or by varying the voltages to be applied from one needle member to another, the ionic winds being different in state from one first cooling electrode to another can be induced. For example, the flow of the air between the light-emitting portion 15 and the secondary reflector 13 can be made controllable by generating the ionic winds having different strength from one second cooling electrode 19 to another. By controlling the flow of the air, enhancement of cooling efficiency is achieved by causing the air around a portion of the light-emitting portion 15 which often becomes hot (for example, a lower most end) to flow significantly. As a matter of course, a configuration in which the distances between distal ends of all of the needle members and the first cooling electrode 18 are equalized is also applicable.

Third Embodiment

Figure 9:
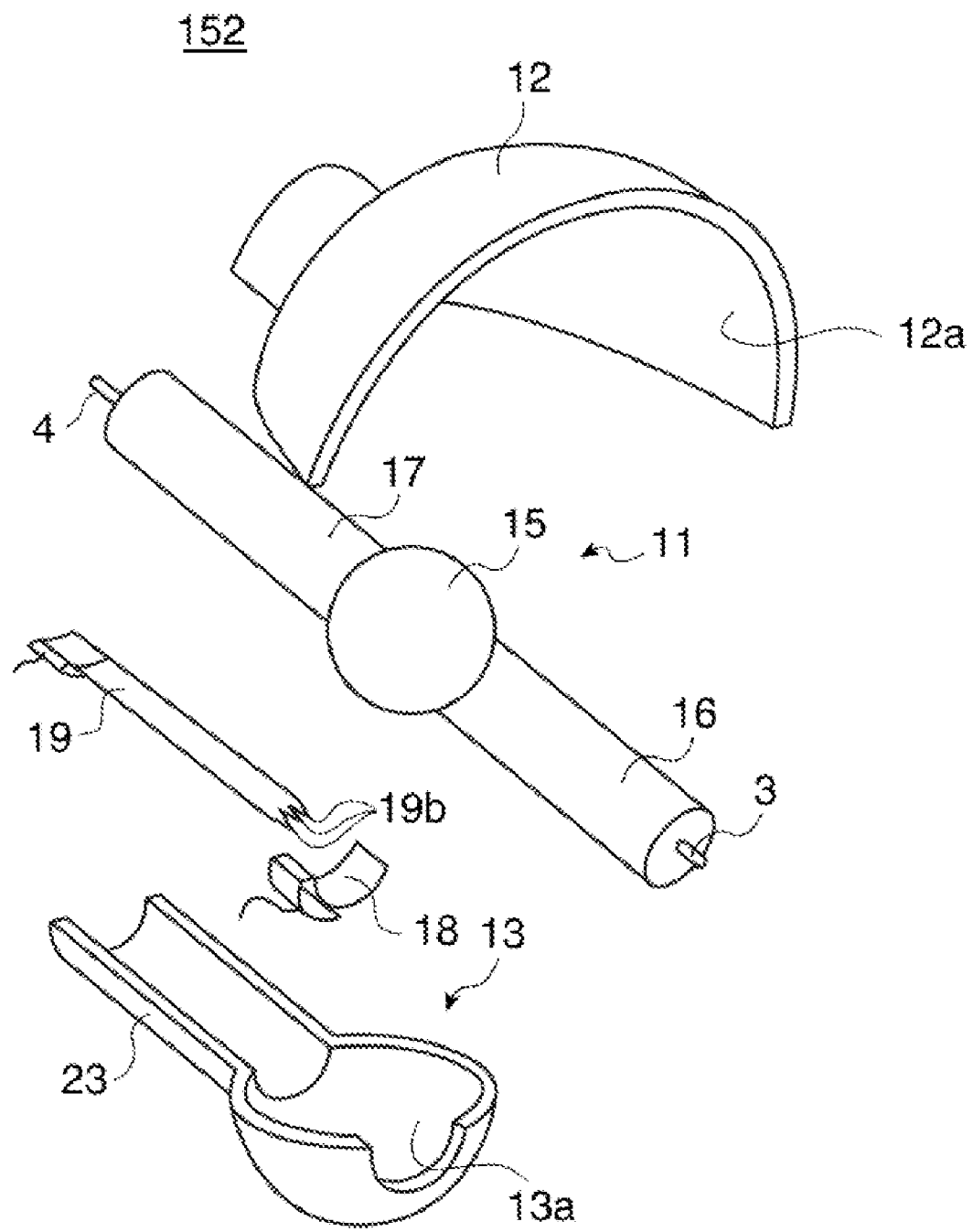
FIG. 9 is an exploded perspective view of a light source unit according to a third embodiment of the invention.

FIG. 9 is an exploded perspective view of a light source unit 152 according to a third embodiment of the invention. In the third embodiment, the second cooling electrode 19 is formed of an aluminum sheet, which is aluminum formed into a sheet shape. The second cooling electrode 19 is formed into a sawtooth shape having projections and depressions at an edge portion on the side of the first cooling electrode 18 in plan view. For example, the second cooling electrode 19 having the sawtooth shape is obtained by punching the aluminum sheet into a desired shape. The second cooling electrode 19 is bonded to the extending portion 23 of the secondary reflector 13. When a voltage is applied between the first cooling electrode 18 and the second cooling electrode 19, the ionic wind is induced between a plurality of apex portions 19b of the sawtooth shape and the first cooling electrode 18 due to the corona discharge. The air between the light-emitting portion 15 and the secondary reflecting surface 13a is caused to flow by means of the ionic wind, so that the light-emitting portion 15 is efficiently cooled down.

The sawtooth shape of the second cooling electrode 19 may be formed to have an irregular shape by varying the intervals between the apex portions 19b or the sizes of the projections and depressions and varied in distance with respect to the first cooling electrode 18 from one apex portion 19b to another, so that the flow of the air between the light-emitting portion 15 and the secondary reflector 13 can be controlled. For example, the flow of the air between the light-emitting portion 15 and the secondary reflector 13 can be made controllable by generating the ionic winds having different strength from one second cooling electrode 19 to another. By controlling the flow of the air, enhancement of the cooling efficiency is achieved by causing the air around a portion of the light-emitting portion 15 which often becomes hot (for example, a lower most end) to flow significantly.

Since the positional relationship of the apex portions 19b with respect to each other can be set in advance in the case of the second cooling electrode 19 provided with the sawtooth shape, an adjustment of the distances of the respective apex portions 19b with respect to the first cooling electrode 18 is not necessary at the time of assembly of the light source unit 152. Accordingly, an assembleability of the light source unit 152 is improved, and reduction of the manufacturing cost is achieved.

An edge portion of the second cooling electrode 19 is not limited to be formed into the sawtooth shape having the plurality of apex portions 19b. For example, it may be formed into an angled portion having one apex. In the third embodiment, the sheet-shaped second cooling electrode 19 is formed by bonding the aluminum sheet to the extending portion 23 of the secondary reflector 13. However, the invention is not limited thereto. For example, the second cooling electrode may be formed by evaporating a conductive metallic material onto the extending portion 23 of the secondary reflector 13.

Figure 10:
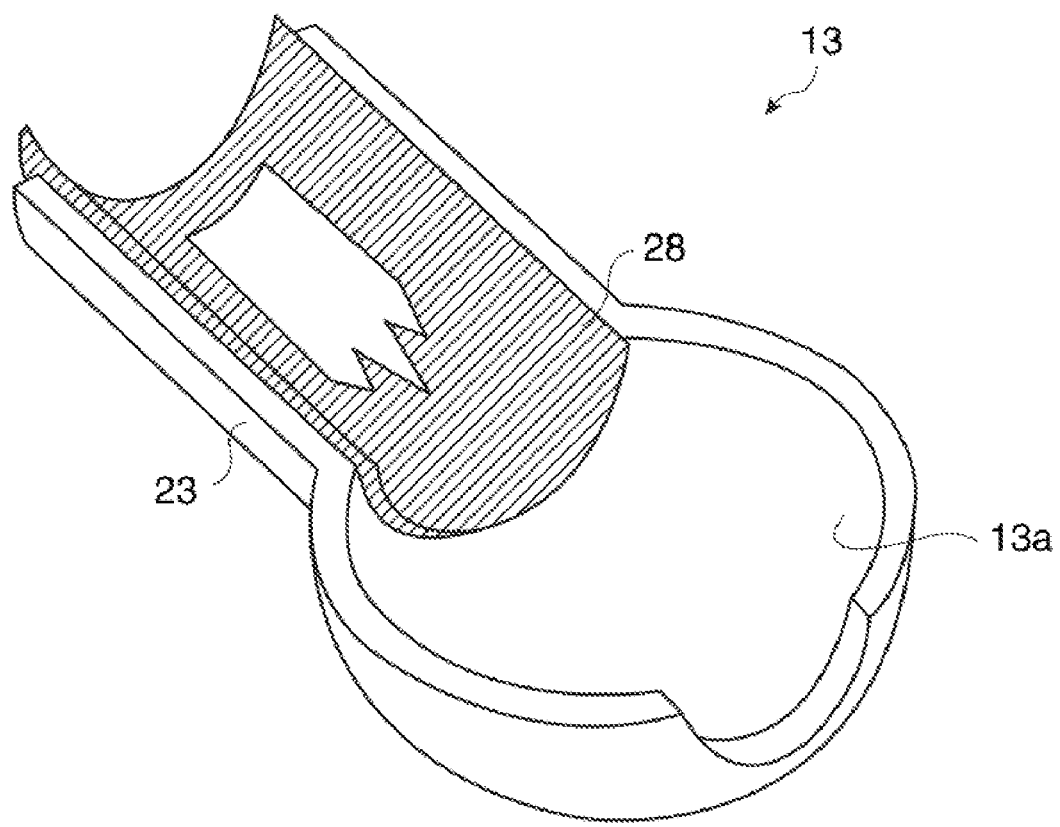
FIG. 10 is a drawing showing a state in which a masking sheet is placed onto the secondary reflector.

FIG. 10 is a drawing showing a state in which a masking sheet is placed over the secondary reflector 13. The second cooling electrode having a desired shape can be formed on the extending portion 23 by placing a masking sheet 28 punched into a desired shape over the extending portion 23 when evaporating the metallic material onto the secondary reflector 13. Here, by forming the reflecting film 13b to be formed on the secondary reflecting surface 13a of the secondary reflector 13 by evaporating the metal thereon, the reflecting film 13b and the second cooling electrode 19 can be formed simultaneously, so that the cost reduction on the basis of reduction of the manufacturing steps is achieved. Also, by using the reflecting film 13b as a first cooling electrode, the reduction of the manufacturing cost on the basis of the further reduction of the manufacturing steps is achieved.

As shown in FIG. 10, the second cooling electrode of a desired shape may be formed on the extending portion 23 by applying conductive material, for example, the conductive coating containing metal in a state in which the masking sheet is placed over the secondary reflector 13. The second cooling electrode can be formed with a relatively simple operation such as applying the conductive coating. If the second cooling electrode is too thin, it may be destroyed when a voltage is applied thereon. When the second cooling electrode is formed of the aluminum sheet or the conductive coating, a certain thickness can easily be provided to the second cooling electrode by using a thicker sheet material or applying the coating repeatedly. By providing the certain thickness to the second cooling electrode, the second cooling electrode which is hardly destroyed by the application of the voltage is achieved.

Fourth Embodiment

Figure 11:
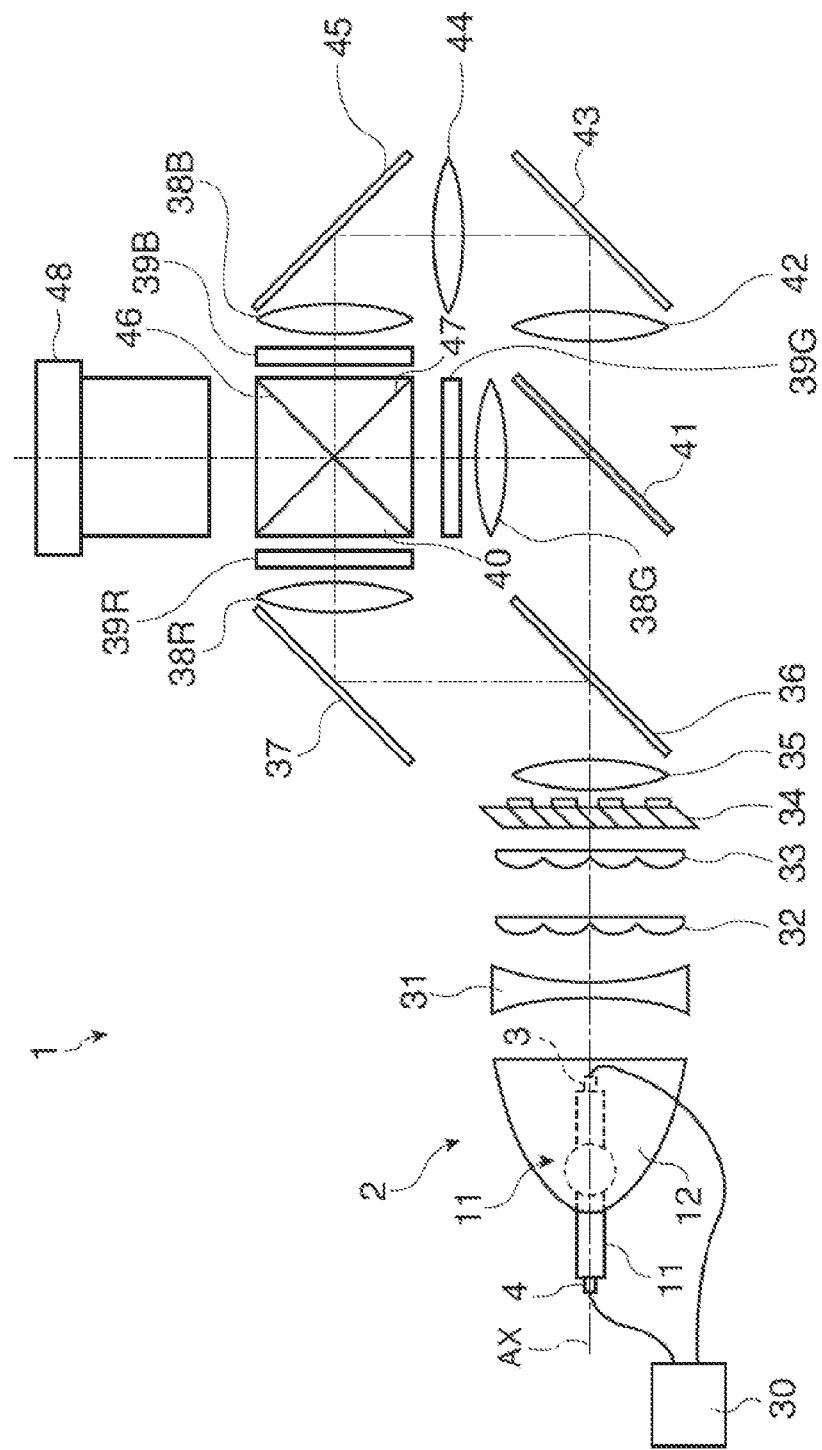
FIG. 11 is a drawing showing a schematic configuration of a projector according to a fourth embodiment of the invention.

FIG. 11 is a drawing showing a schematic configuration of the projector 1 according to a fourth embodiment of the invention. The projector 1 is a front projector configured to project light on a screen, not shown, and allow viewers to appreciate images by observing the light reflected from the screen. The projector 1 also includes the light source unit 2 according to the first embodiment described above (see also FIGS. 1 and 2). The light source unit 2 emits light containing red (R) light, green (G) light, and blue (B) light. A voltage applying unit 30 is connected to the light source unit 2. The voltage applying unit 30 converts an AC voltage supplied from a power source (not shown) to a DC voltage. The first cooling electrode 18 of the light source unit 2 is connected to a cathode of the voltage applying unit 30, and the second cooling electrode 19 is connected to an anode of the voltage applying unit 30. The voltage applying unit 30 applies the converted DC voltage between the first cooling electrode 18 and the second cooling electrode 19. The voltage applying unit 30 applies a voltage which causes the corona discharge, but does not cause the spark between the first cooling electrode 18 and the second cooling electrode 19.

A concave lens 31 collimates light emitted from the light source unit 2. A first integrator lens 32 and a second integrator lens 33 have a plurality of lens elements arranged in an array. The first integrator lens 32 divides a luminous flux from the concave lens 31 into a plurality of parts. The respective lens elements of the first integrator lens 32 converge the luminous flux from the concave lens 31 at positions in the vicinity of the respective lens elements of the second integrator lens 33. The lens elements of the second integrator lens 33 form images of the lens elements of the first integrator lens 32 on a spatial light modulator.

The light passed through the two integrator lenses 32 and 33 is transformed into a linear polarized light in a specific direction of oscillation by the a polarized light transforming element 34. A superimposed lens 35 superimposes the images of the respective lens elements of the first integrator lens 32 on the spatial light modulator. The first integrator lens 32, the second integrator lens 33, and the superimposed lens 35 uniformize a light intensity distribution of the light from the light source unit 2 on the spatial light modulator. The light from the superimposed lens 35 falls on a first dichroic mirror 36. The first dichroic mirror 36 reflects the R-light, and allows the G-light and B-light to pass therethrough. The R-light fallen on the first dichroic mirror 36, the optical path of which is bent by being reflected from the first dichroic mirror 36 and a reflector 37, enters an R-light field lens 38R. The R-light field lens 38R collimates the R-light from the reflector 37 and causes the same to enter an R-light spatial light modulator 39R.

The R-light spatial light modulator 39R is a spatial light modulator which modulates the R-light according to an image signal, and is a transmissive liquid crystal display device. A liquid crystal panel, not shown, provided in the R-light spatial light modulator 39R includes a liquid crystal layer, which modulates the light according to the image signal, encapsulated between two transparent substrates. The R-light modulated by the R-light spatial light modulator 39R enters a cross dichroic prism 40 as a color combining optical system.

The G-light and the B-light passed through the first dichroic mirror 36 fall on a second dichroic mirror 41. The second dichroic mirror 41 reflects the G-light and allows the B-light to pass therethrough. The G-light fallen on the second dichroic mirror 41, the optical path of which is bent by being reflected from the second dichroic mirror 41, enters a G-light field lens 38G. The G-light field lens 38G collimates the G-light from the second dichroic mirror 41, and causes the same to enter a G-light spatial light modulator 39G. The G-light spatial light modulator 39G is a spatial light modulator which modulates the G-light according to an image signal, and is the transmissive liquid crystal display device. The G-light modulated by the G-light spatial light modulator 39G enters a surface of the cross dichroic prism 40 different from the surface through which the R-light enters.

The B-light passed through the second dichroic mirror 41 passes through a relay lens 42, then the optical pass thereof is bent due to the reflection from a reflector 43. The B-light from the reflector 43 passes further through a relay lens 44, then the optical path thereof is bent due to the reflection from a reflecting mirror 45, and enters a B-light field lens 38B. Since the optical path of the B-light is longer than the optical path of the R-light and the optical of the G-light, a relay optical system using the relay lenses 42 and 44 is employed in the optical path of the B-light in order to equalize the illumination magnification of the spatial light modulator to those of light in other colors.

The B-light field lens 38B collimates the B-light from the reflecting mirror 45, and causes the same to enter a B-light spatial light modulator 39B. The B-light spatial light modulator 39B is a spatial light modulator which modulates the B-light according to the image signal, and is the transmissive liquid crystal display device. The B-light modulated by the B-light spatial light modulator 39B enters a surface of the cross dichroic prism 40 different from the surface through which the R-light enters and the surface through which the G-light enters.

The cross dichroic prism 40 includes two dichroic films 46, 47 substantially orthogonal to each other. The first dichroic film 46 reflects the R-light, and allows the G-light and B-light to pass therethrough. The second dichroic film 47 reflects the B-light, and allows the R-light and G-light to pass therethrough. The cross dichroic prism 40 combines the R-light, the G-light, and the B-light entering from different directions respectively and causes the combined light to go out toward a projection lens 48. The projection lens 48 projects the light combined by the cross dichroic prism 40 toward the screen.

With the employment of the light source unit 2 which is capable of cooling down the light-emitting portion effectively while restraining occurrence of the problems such as the complication of the structure or the generation of noise, the projector 1 is capable of displaying bright images stably with high efficiency in a simple configuration. If the state shown in FIG. 3 is an elect state and a state inverted vertically therefrom is defined as an inverted state, the upper side of the arc tube 11 is covered with the secondary reflector 13 when the light source unit 2 is used in the inverted state. In this inverted state, heat is apt to stay between the light-emitting portion 15 and the secondary reflecting surface 13a. However, since the light-emitting portion can be cooled down effectively by causing the air between the light-emitting portion and the secondary reflector to flow using the ionic wind, probability of occurrence of malfunction due to the ineffective cooling is restrained and the stable operation of the projector 1 is achieved.

Fifth Embodiment

Figure 12:
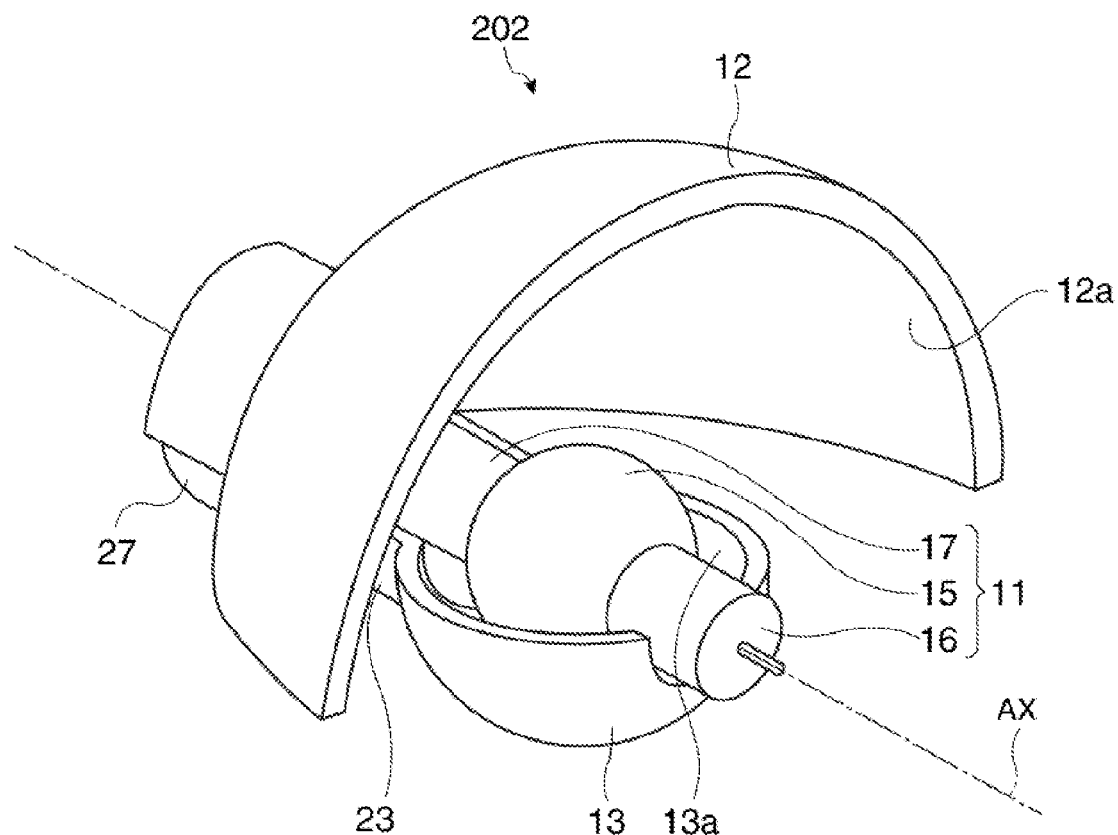
FIG. 12 is an external perspective view showing a schematic configuration of a light source unit according to a fifth embodiment of the invention.
Figure 12:
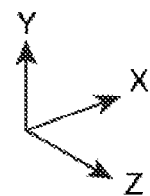
Figure 13:
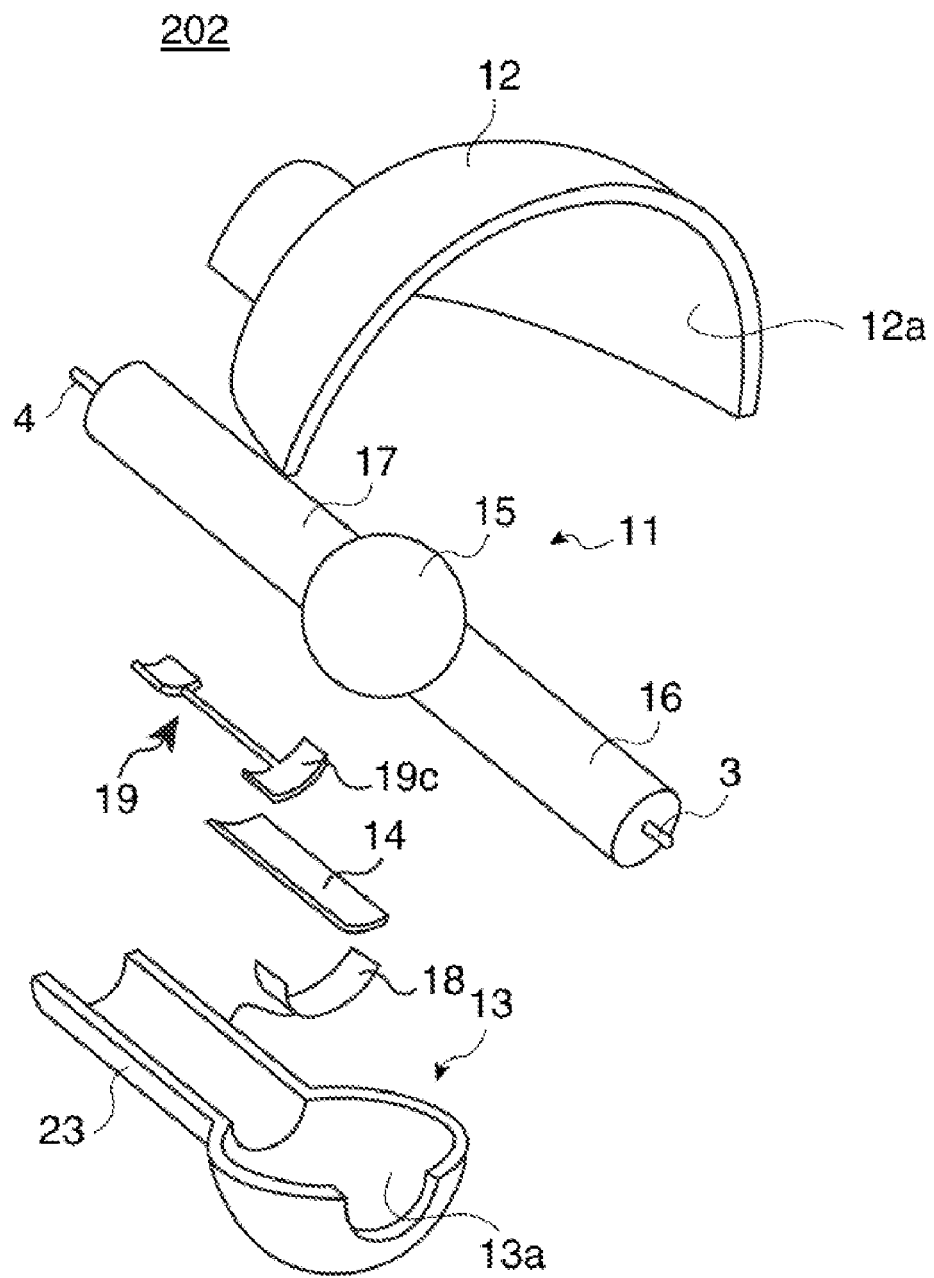
FIG. 13 is an exploded perspective view of the light source unit.
Figure 14:
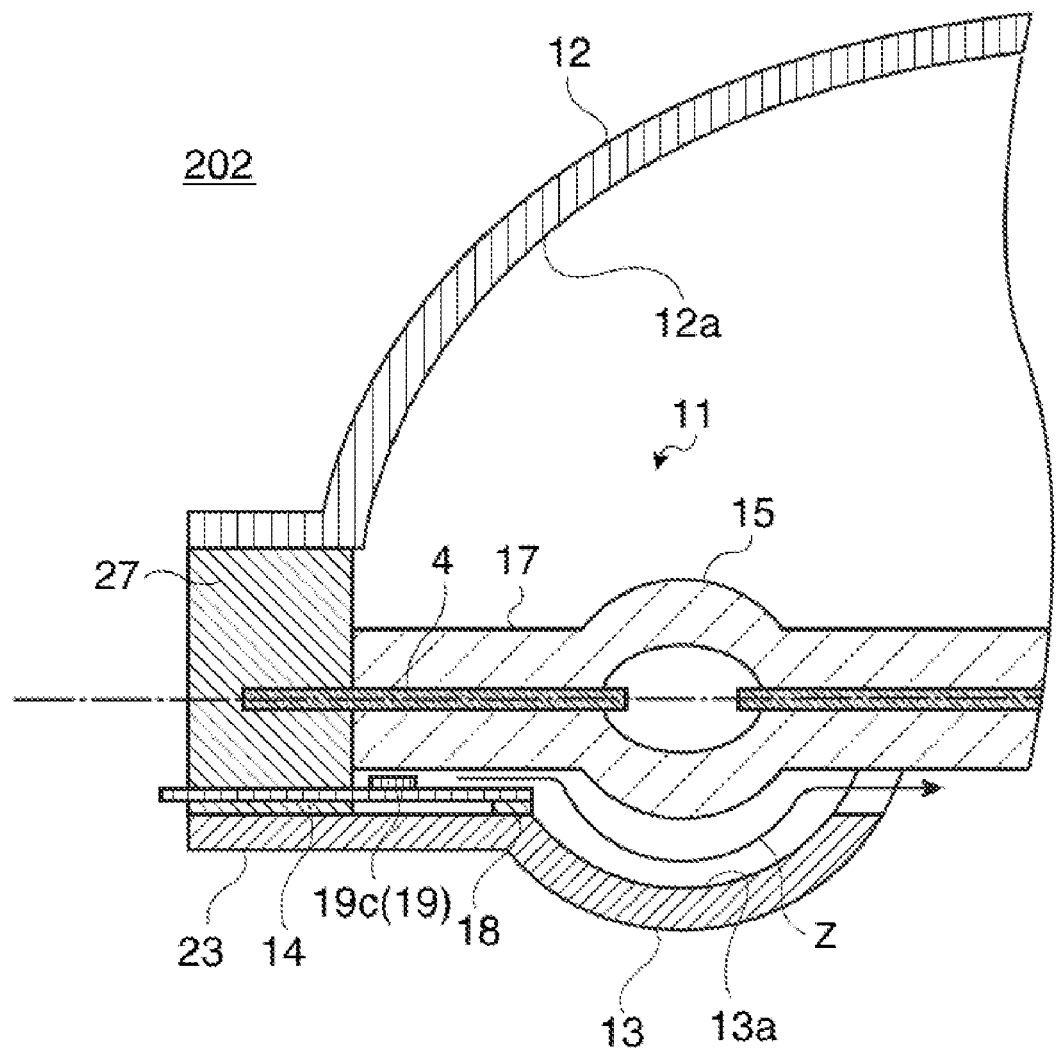
FIG. 14 is a lateral cross-sectional view of the light source unit.

FIG. 12 is an external perspective view showing a schematic configuration of a light source unit 202 according to a fifth embodiment of the invention. FIG. 13 is an exploded perspective view of the light source unit 202 shown in FIG. 12. FIG. 14 is a lateral cross-sectional view of the light source unit 202 shown in FIG. 12. The light source unit 202 includes the arc tube 11, the primary reflector 12, the secondary reflector 13, an insulating sheet 14, the first cooling electrode (first electrode) 18, and the second cooling electrode (second electrode) 19. The light source unit 202 emits light containing red (R) light, green (G) light, and blue (B) light. In the description of the embodiments of this application, the X-axis is an axis orthogonal to the center axis AX of the arc tube 11. The Y-axis is an axis orthogonal to the center axis AX and the X-axis. The Z-axis is an axis parallel to the center axis AX. The direction of an arrow of the Z-axis indicates a direction from the light source unit 202 toward a surface to be irradiated, not shown. The directions of arrows of the respective axes are determined to be the positive directions, and opposite directions are determined to the negative directions. The side of the positive direction along the Z-axis with respect to the light source unit 202 (the side where the surface to be irradiated exists) is referred to as "front side" and the side of the negative direction is referred to as "back side". Likewise, the side of the positive direction along the Y-axis with respect to the light source unit 202 is referred to as "upper side", and the side of the negative direction is referred to as "lower side".

The arc tube 11, the primary reflector 12, and the secondary reflector 13 employed in the fifth embodiment are the same as those employed in the embodiments described above.

The insulating sheet 14 is formed of an insulating material formed into a sheet shape, and is arranged between the first sealed portion 17 and the extending portion 23. The insulating sheet 14 is arranged so as to extend along the surface of the extending portion 23 on the side of the first sealed portion 17. The first cooling electrode 18 and the second cooling electrode 19 are arranged so as to interpose the insulating sheet between the both electrodes 18 and 19. The first cooling electrode 18 and the second cooling electrode 19 serve to induce the ionic wind due to a surface discharge by applying a voltage between the both electrodes 18 and 19.

The first cooling electrode 18 is formed by bending the plate-shaped metallic member being rectangular in plan view so as to follow the shape of the extending portion 23. The first cooling electrode 18 is arranged on the side of one surface of the insulating sheet 14. The first cooling electrode 18 is located between the insulating sheet 14 and the extending portion 23 and is arranged in the vicinity of the secondary reflecting surface 13a.

The second cooling electrode 19 is formed of the metallic member, and is provided with a discharging portion 19c having a rectangular shape in plan view at the distal end thereof. The second cooling electrode 19 is arranged in such a manner that the portion of the discharging portion 19c is positioned on the opposite side of the insulating sheet 14 from the side where the first cooling electrode 18 is arranged. The second cooling electrode 19 is arranged in such a manner that the discharging portion 19c is shifted backward from the first cooling electrode 18. In this arrangement, the first cooling electrode 18 is arranged at a position shifted from the discharging portion 19c of the second cooling electrode 19 toward the light-emitting portion 15.

The first cooling electrode 18 and the second cooling electrode 19 are connected to the voltage applying unit, not shown, and a voltage is applied between the both electrodes 18 and 19 using the voltage applying unit, so that the surface discharge is caused between the both electrodes 18 and 19. The air molecules ionized by the surface discharge near the discharging portion 19c of the second cooling electrode 19 are attracted toward the first cooling electrode 18 and move on the insulating sheet 14. The ionized air molecules collide with other air molecules when they are moving, and induce so-called the ionic wind from the second cooling electrode 19 toward the first cooling electrode 18. The voltage to be applied between the both electrodes 18 and 19 is preferably the AC voltage.

With the generation of the ionic wind on the insulating sheet 14, a flow of air along an arrow Z is generated, so that the air between the light-emitting portion 15 an the secondary reflecting surface 13a is caused to flow. Accordingly, the portion of the arc tube 11 covered with the secondary reflector 13 can effectively be cooled down, and hence the appropriate temperature adjustment of the arc tube 11 is achieved. The surface discharge occurs more easily than the corona discharge even with the electrode having no pointed electrode, so that ionization of the air might be achieved in a wide range. For example, the air might be ionized in the periphery of substantially the entire area of one side of the discharging portion 19c of the second cooling electrode 19 on the side of the first cooling electrode 18, so that the stronger ionic wind can be induced. Therefore, the air between the light-emitting portion 15 and the secondary reflecting surface 13a is caused to flow significantly, so that cooling of the light-emitting portion 15 is achieved further effectively.

Since the air between the light-emitting portion 15 and the secondary reflecting surface 13a is caused to flow without providing the blower or the fan duct, the probability of occurrence of the problems such as the complication of the structure and the noise generation by the blower is reduced. In addition, since the ionic wind can be induced in a portion where the air flow is wanted, that is, in the vicinity of the portion between the light-emitting portion 15 and the secondary reflecting surface 13a, the effective cooling is achieved with a small quantity of wind.

Since the insulating sheet 14 is present between the first cooling electrode 18 and the second cooling electrode 19, the probability of generation of the spark between the both electrodes 18 and 19 is reduced. Accordingly, destruction of the electrode due to the spark or influence of the spark on other electronic apparatuses is restrained.

Figure 15:
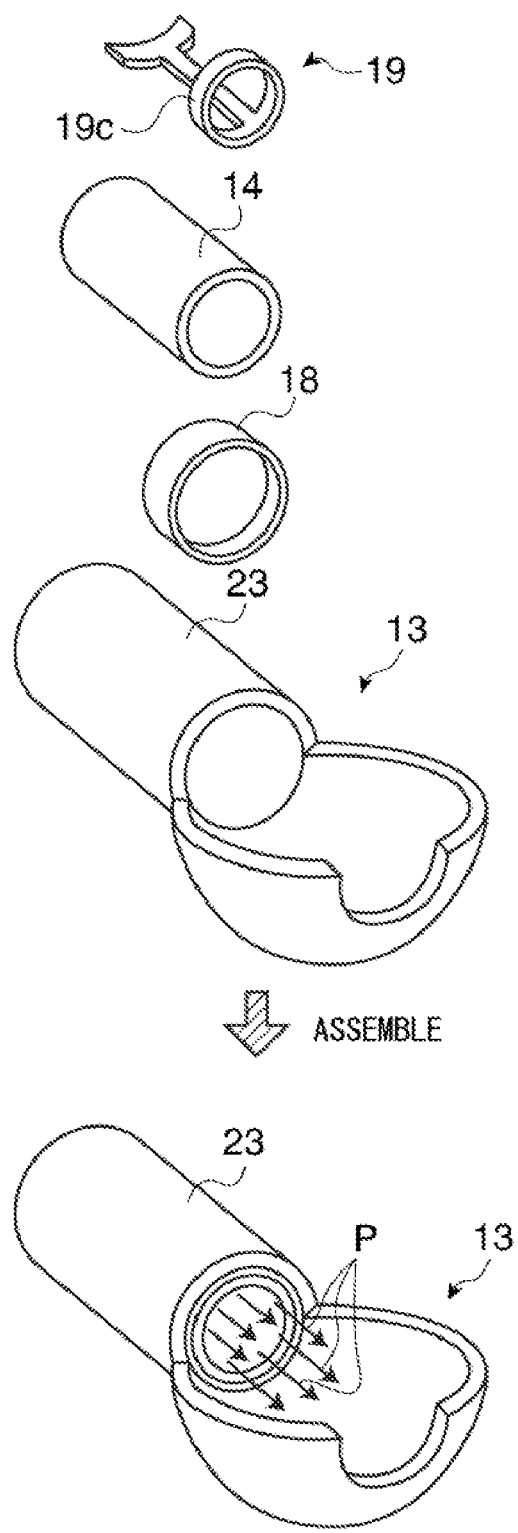
FIG. 15 is a perspective view of the secondary reflector, an insulating sheet, a first cooling electrode, and a second cooling electrode provided in the light source unit according to a first modification of the fifth embodiment.

FIG. 15 is a perspective view of the secondary reflector 13, the insulating sheet 14, the first cooling electrode 18, and the second cooling electrode 19 provided in the light source unit according to a first modification of the fifth embodiment. In the first modification, the extending portion 23 of the secondary reflector 13 is formed into a cylindrical shape, and surrounds substantially the entire periphery of the first sealed portion 17 of the arc tube 11. The insulating sheet 14 is also formed into a cylindrical shape so as to be arranged along an inner wall of the cylindrical extending portion 23, and surrounds substantially the entire periphery of the first sealed portion 17. The first cooling electrode 18 is also formed into a cylindrical shape, and the discharging portion 19c of the second cooling electrode 19 is also formed into the cylindrical shape so as to surround substantially the entire periphery of the first sealed portion 17.

By combining these members, they are arranged in piles in the order of the extending portion 23, the first cooling electrode 18, the insulating sheet 14, and the second cooling electrode 19 from the direction of the outer periphery. The first cooling electrode 18 is arranged at a position shifted from the discharging portion 19c of the second cooling electrode 19 toward the light-emitting portion.

If the AC voltage is applied between the first cooling electrode 18 and the second cooling electrode 19 in the state of being combined in this manner, the ionic wind flowing toward the light-emitting portion 15 can be induced over substantially the entire periphery of the first sealed portion 17 as indicated by arrows P. Therefore, not only the air between the light-emitting portion 15 and the secondary reflecting surface 13a, but also the air in the periphery of the entire light-emitting portion 15 is caused to flow, so that the cooling of the light-emitting portion 15 is achieved further effectively.

Sixth Embodiment

Figure 16:
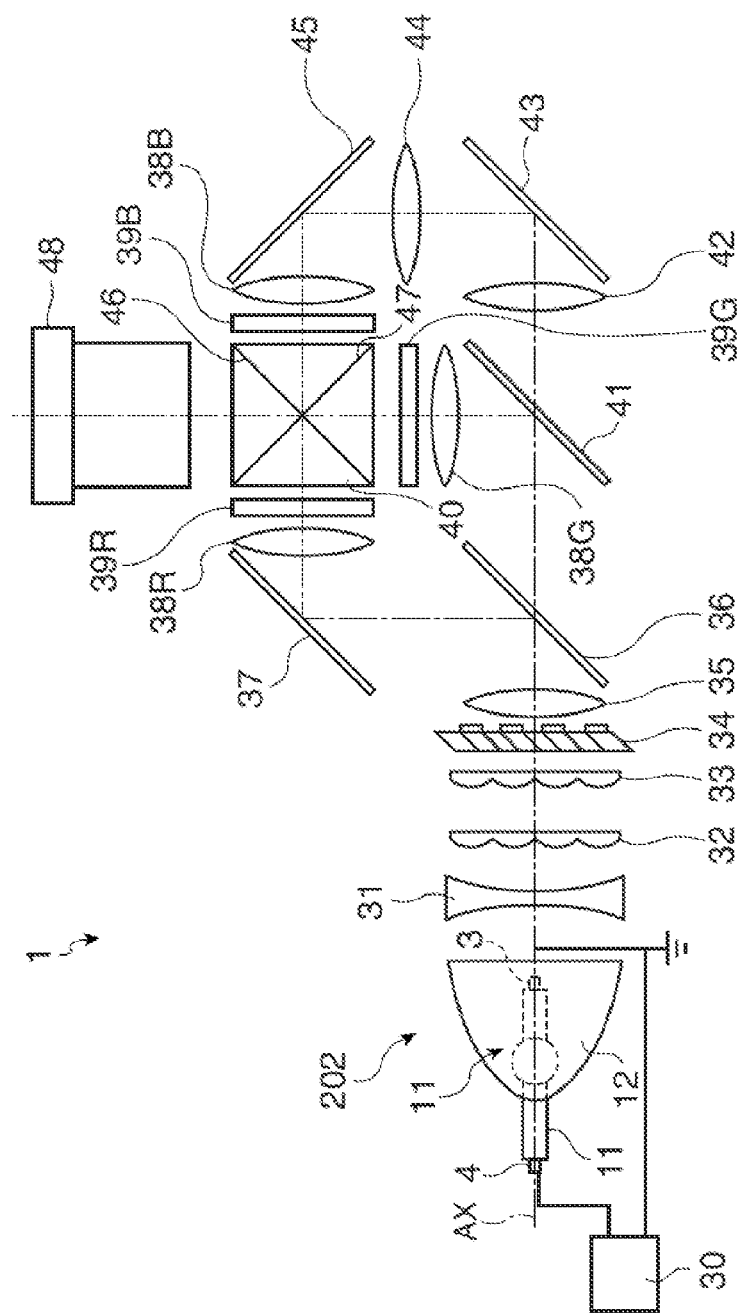
FIG. 16 is a drawing showing a schematic configuration of the projector according to a sixth embodiment of the invention.

FIG. 16 is a drawing showing a schematic configuration of the projector 1 according to a sixth embodiment of the invention. The projector 1 also includes the light source unit 202 according to the fifth embodiment described above (see also FIG. 12 and FIG. 13). The light source unit 202 emits light containing the red (R) light, the green (G) light, and the blue (B) light. The voltage applying unit 30 is connected to the light source unit 202. The voltage applying unit 30 applies the AC voltage supplied from the power source (not shown) between the first cooling electrode 18 and the second cooling electrode 19. The voltage applying unit 30 applies the voltage which causes the surface discharge between the first cooling electrode 18 and the second cooling electrode 19. The first cooling electrode 18 is grounded.

In the projector 1 according to the sixth embodiment of the invention, the light emitted from the light source unit 202 is modulated by the R-light spatial light modulator 39R, the G-light spatial light modulator 39G, and the B-light spatial light modulator 39B, is passed through the projection lens 48, and is projected in the direction of the screen in the same manner as the projectors according to the above-described embodiments.

With the employment of the light source unit 202 which is capable of cooling down the light-emitting portion effectively while restraining occurrence of the problems such as the complication of the structure or the generation of noise, the projector 1 is capable of displaying the bright images stably with high efficiency in the simple configuration. If the state shown in FIG. 14 is the elect state and the state inverted vertically therefrom is defined the inverted state, The upper side of the arc tube 11 is covered with the secondary reflector 13 when the light source unit 202 is used in the inverted state. In this inverted state, the heat is apt to stay between the light-emitting portion 15 and the secondary reflecting surface 13a. However, since the light-emitting portion 15 can be cooled down effectively by causing the air between the light-emitting portion and the secondary reflector to flow using the ionic wind, the probability of occurrence of malfunction due to the ineffective cooling is restrained and the stable operation of the projector 1 is achieved. Also, since the surface discharge can be utilized by arranging the insulating sheet 14 so as to be interposed between the first cooling electrode 18 and the second cooling electrode 19, the AC voltage supplied from the power source can be applied without converting into the DC voltage. Therefore, the component for converting the voltage can be eliminated, and hence the cost reduction is achieved.

Seventh Embodiment

Figure 17:
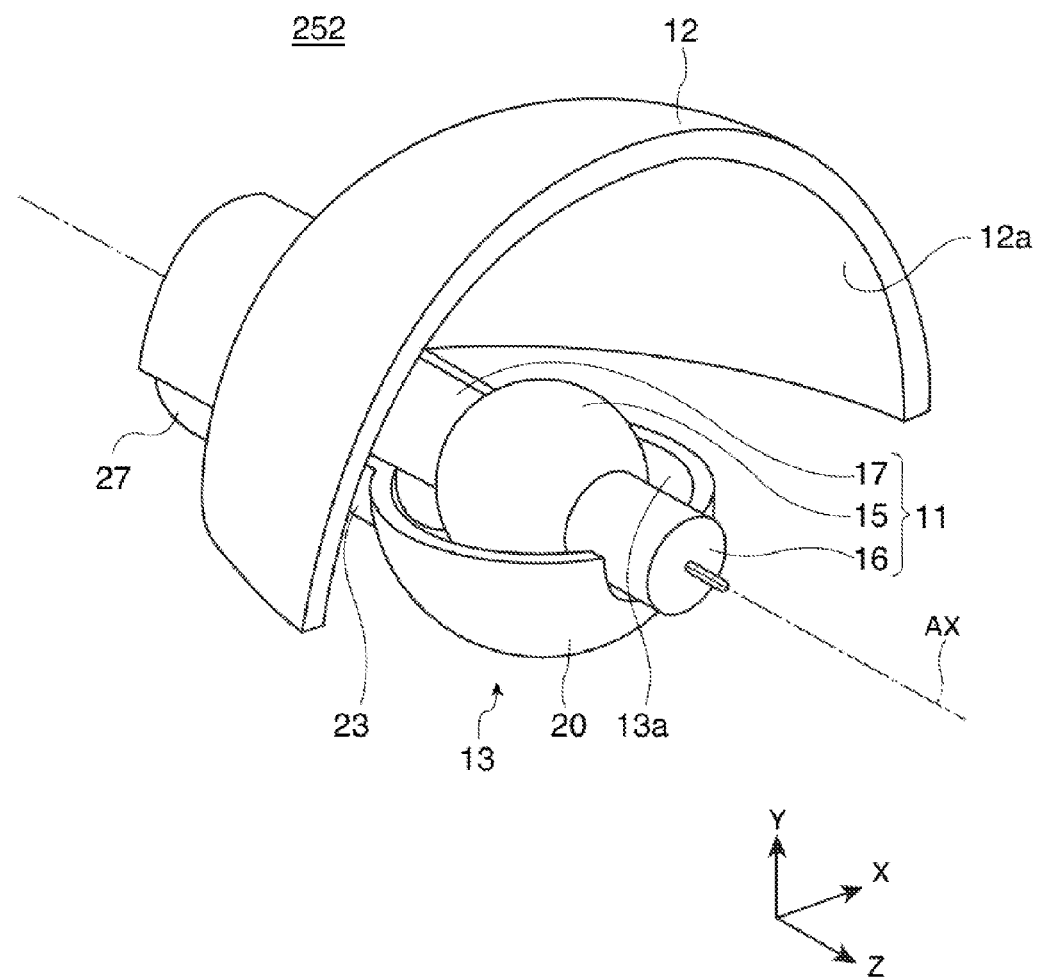
FIG. 17 is an external perspective view showing a schematic configuration of a light source unit according to a seventh embodiment of the invention.
Figure 18:
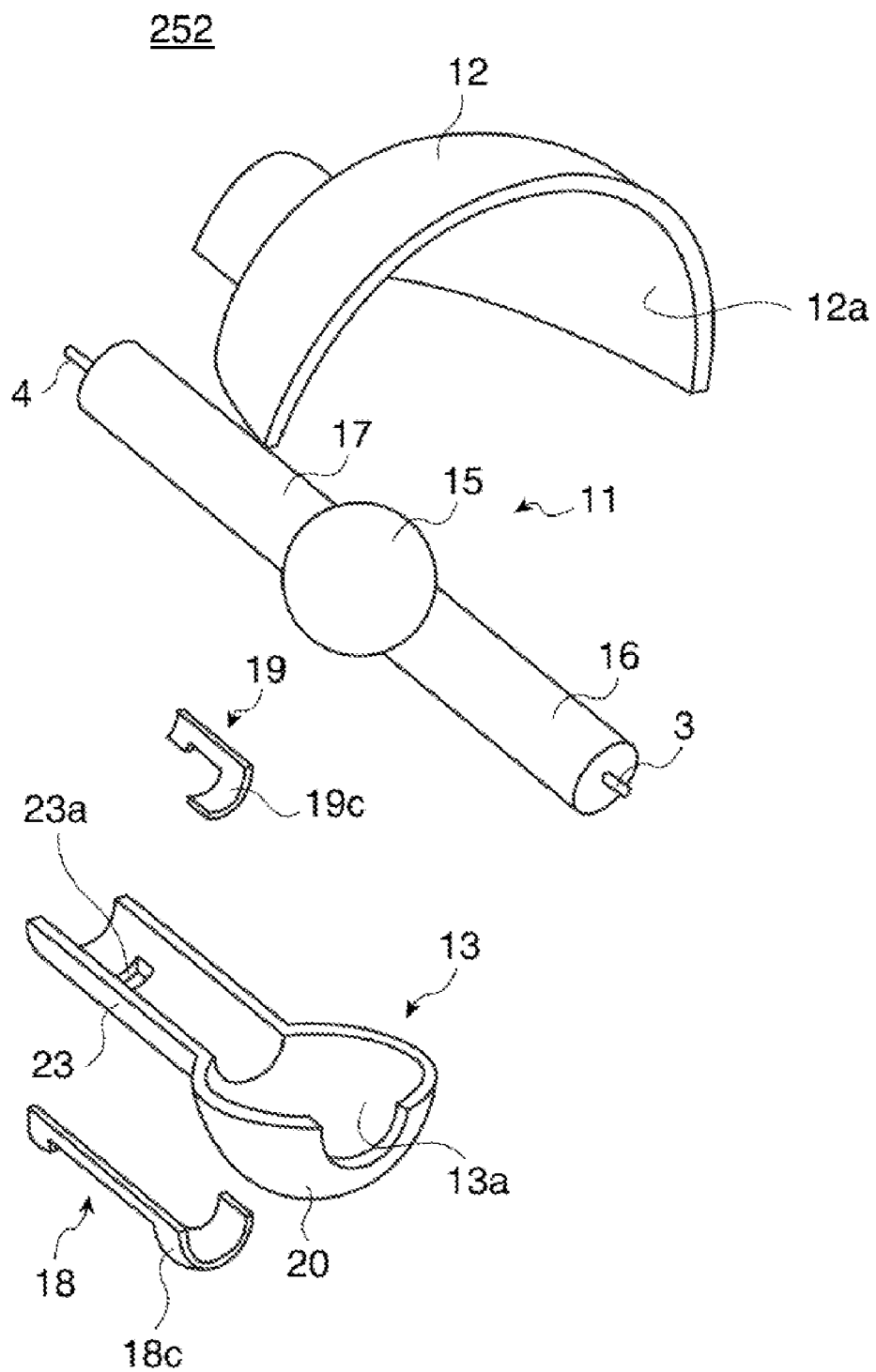
FIG. 18 is an exploded perspective view of the light source unit.
Figure 19:
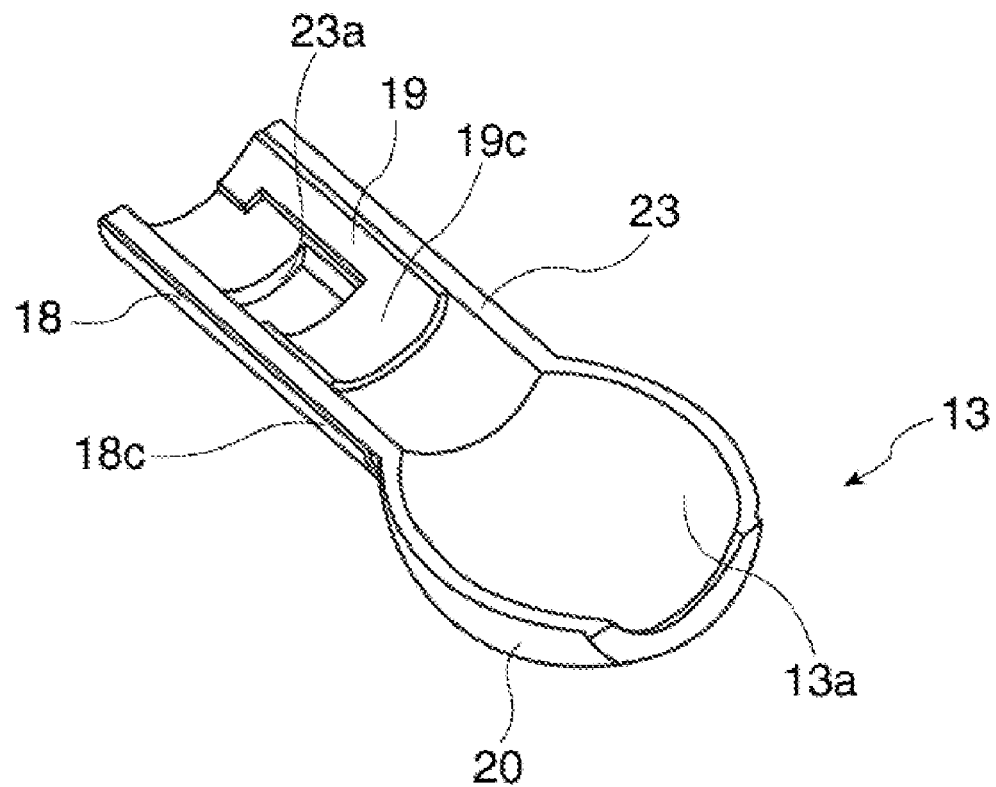
FIG. 19 is a perspective view of the secondary reflector having a first electrode and a second electrode attached thereto.
Figure 20:
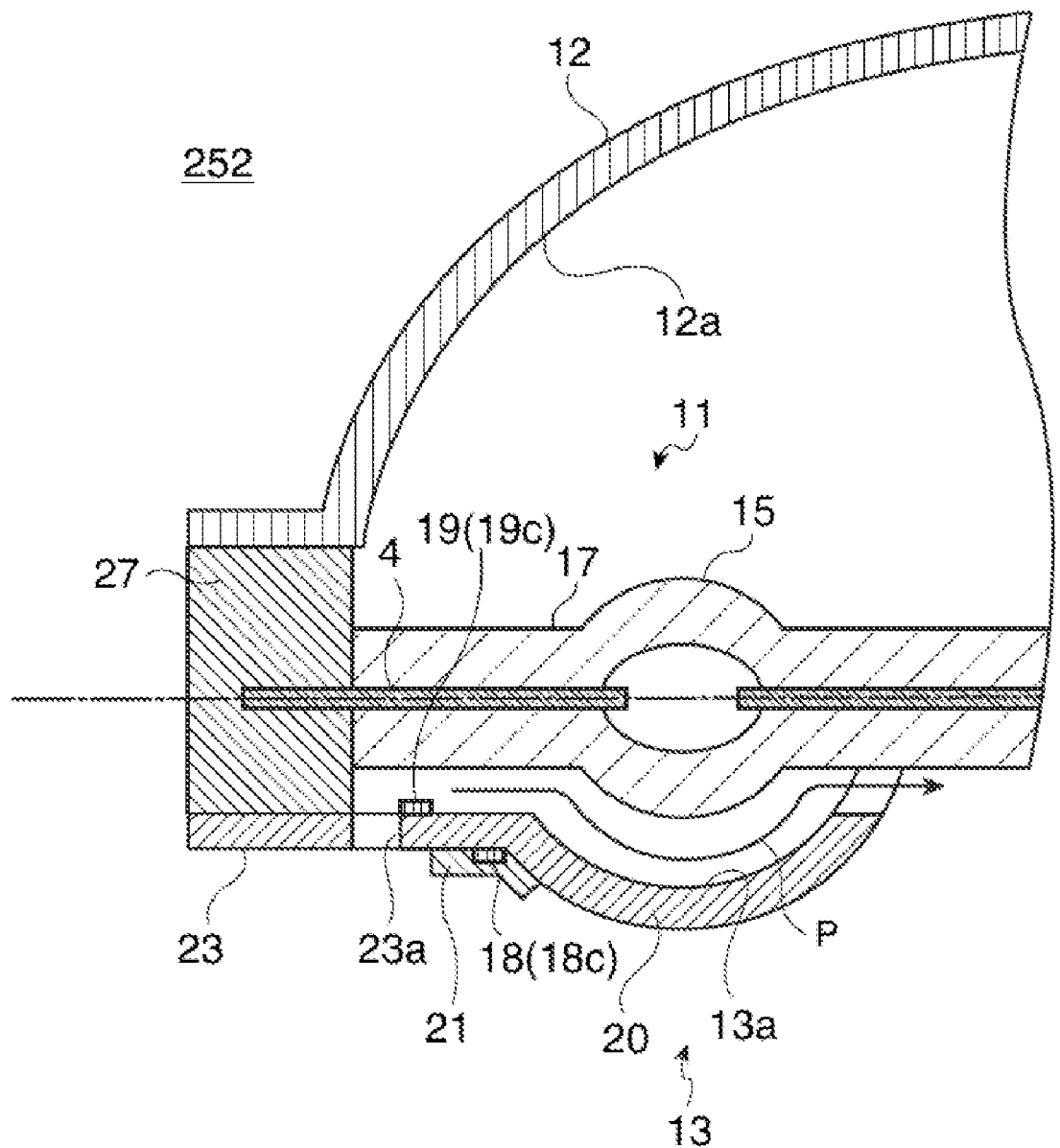
FIG. 20 is a lateral cross-sectional view of the light source unit.

FIG. 17 is an external perspective view showing a schematic configuration of a light source unit 252 according to a seventh embodiment of the invention. FIG. 18 is an exploded perspective view of the light source unit 252 shown in FIG. 17. FIG. 19 is a perspective view of the secondary reflector having the first cooling electrode (first electrode) 18 and the second cooling electrode (second electrode) 19 attached thereon. FIG. 20 is a lateral cross-sectional view of the light source unit 252 shown in FIG. 17. The light source unit 252 includes the arc tube 11, the primary reflector 12, the secondary reflector 13, the first cooling electrode (first electrode) 18, and the second cooling electrode (second electrode) 19. The light source unit 252 emits light containing red (R) light, green (G) light, and blue (B) light. In the description of the embodiments of this application, the X-axis is an axis orthogonal to the center axis AX of the arc tube 11. The Y-axis is an axis orthogonal to the center axis AX and the X-axis. The Z-axis is an axis parallel to the center axis AX. The direction of an arrow of the Z-axis indicates a direction from the light source unit 252 toward a surface to be irradiated, not shown. The directions of arrows of the respective axes are determined to be the positive directions, and opposite directions are determined to the negative directions. The side of the positive direction along the Z-axis with respect to the light source unit 252 (the side where the surface to be irradiated exists) is referred to as "front side" and the side of the negative direction is referred to as "back side". Likewise, the side of the positive direction along the Y-axis with respect to the light source unit 252 is referred to as "upper side", and the side of the negative direction is referred to as "lower side".

The arc tube 11 and the primary reflector 12 employed in the seventh embodiment are the same as those employed in the embodiments described above.

The secondary reflector 13 includes a secondary reflecting portion 20 formed with the secondary reflecting surface 13a for reflecting the light emitted from the light-emitting portion 15 and the extending portion (first extending portion) 23. The secondary reflector 13 reflects the light emitted from the light-emitting portion 15 off the secondary reflecting surface 13a toward the light-emitting portion 15. The light reflected from the secondary reflecting surface 13a enters the primary reflecting surface 12a, and is reflected from the primary reflecting surface 12a and proceeds to the front side. The secondary reflecting surface 13a covers part of the periphery of the light-emitting portion 15 from the underside. A clearance is provided between the secondary reflecting portion 20 and the light-emitting portion 15. The secondary reflector 13 is formed by evaporating the high-reflective member such as the dielectric multilayer film onto the surface of the base material formed into a desired shape. In the seventh embodiment, the basic material used for the secondary reflector 13 is an insulator such as quartz. The dielectric multilayer film is also an insulator. The high-reflective member uses a member demonstrating a high reflectance ratio for light having wavelengths in the visible region. With the provision of the primary reflector 12 and the secondary reflector 13, the light emitted from the light-emitting portion 15 is allowed to proceed efficiently toward the front.

The extending portion 23 is formed on the back side portion of the secondary reflecting portion 20 so as to cover part of the first sealed portion 17. By the extending portion 23 bonded to the securing portion 27, positioning and fixation of the secondary reflector 13 in the light source unit 252 are achieved. The securing portion 27 serves to secure the arc tube 11, the primary reflector 12, and the secondary reflector 13 integrally. The extending portion 23 is formed with an opening 23a which penetrates through the surface from the side of the arc tube 11 to the surface opposite therefrom. Hereinafter, the side of the secondary reflector 13 on which the arc tube 11 is arranged is referred to as "inside", and the opposite side is also referred to as "outside".

The first cooling electrode 18 and the second cooling electrode 19 are arranged so as to interpose the secondary reflector 13 between the both electrodes 18 and 19. The first cooling electrode 18 and the second cooling electrode 19 serve to induce the ionic wind due to the surface discharge by applying a voltage between the both electrodes 18 and 19.

The first cooling electrode 18 is formed by bending the plate-shaped metallic member so as to follow the shape of the extending portion 23, and includes a discharging portion 18c at the distal end thereof. The first cooling electrode 18 is arranged on the outside of the extending portion 23. The first cooling electrode 18 is covered with the insulating film (insulating layer) 21.

The second cooling electrode 19 is formed by bending the plate-shaped metallic member so as to follow the shape of the extending portion 23. The second cooling electrode 19 is provided with the discharging portion 19c at the distal end thereof. The second cooling electrode 19 is bonded to the inside of the extending portion 23. Accordingly, the second cooling electrode 19 is arranged between the first sealed portion 17 and the extending portion 23. The second cooling electrode 19 is arranged so that the discharging portion 19c is positioned on the side of the light-emitting portion 15 with respect to the opening 23a.

The second cooling electrode 19 is arranged in such a manner that the discharging portion 19c is shifted backward from the discharging portion 18c of the first cooling electrode 18. In this arrangement, the discharging portion 18c of the first cooling electrode 18 is arranged at a position shifted from the discharging portion 19c of the second cooling electrode 19 toward the light-emitting portion 15. The cooling electrodes 18 and 19 may be formed of a metallic film or an ITO film (transparent conductive film). In particular, the ITO film has a smaller difference in linear expansion coefficient thereof from that of the secondary reflector 13 than the difference between the linear expansion coefficient of the metallic member and the linear expansion coefficient of the secondary reflector 13 in many cases. Therefore, when it is stuck on the secondary reflector 13, the probability of separation thereof due to the temperature difference is reduced.

The first cooling electrode 18 and the second cooling electrode 19 are connected to the voltage applying unit, not shown, and a voltage is applied between the both electrodes 18 and 19, so that the surface discharge is caused between the both electrodes 18 and 19 arranged so as to interpose the extending portion 23 of the secondary reflector 13 as an insulator therebetween. The air molecules ionized by the surface discharge near the discharging portion 19c of the second cooling electrode 19 are attracted toward the discharging portion 18c of the first cooling electrode 18 and move between the extending portion 23 and the first sealed portion 17. The ionized air molecules collide with other air molecules when they are moving, and induces so-called the ionic wind from the second cooling electrode 19 toward the first cooling electrode 18. The voltage to be applied between the both electrodes 18 and 19 is preferably the AC voltage.

With the generation of the ionic wind between the extending portion 23 and the first sealed portion 17, a flow of air along the arrow P is generated, so that the air between the light-emitting portion 15 and the secondary reflecting surface 13a is caused to flow. Accordingly, the portion of the arc tube 11 covered with the secondary reflector 13 can be effectively cooled down, and hence the appropriate temperature adjustment of the arc tube 11 is achieved. The surface discharge occurs more easily than the corona discharge even with the electrode having no pointed electrode, so that ionization of the air might be achieved in a wide range. For example, the air might be ionized in the periphery of substantially the entire area of one side of the discharging portion 19c on one side of the first cooling electrode 18, so that the stronger ionic wind can be induced. Therefore, the air between the light-emitting portion 15 and the secondary reflecting surface 13a is caused to flow significantly, so that the cooling of the light-emitting portion 15 is achieved further effectively.

Since the opening 23a is formed through the extending portion 23 on the upstream side of the discharging portion 19c with respect to the flow of the ionic wind, the air is easily supplied from the outside to the inside of the secondary reflector 13, so that the quantity of the ionic wind can be increased.

Since the air between the light-emitting portion 15 and the secondary reflecting surface 13a is caused to flow without providing the blower or the fan duct, the probability of occurrence of the problems such as the complication of the structure and the noise generation by the blower is reduced. In addition, since the ionic wind can be induced in a portion where the air flow is wanted, that is, in the vicinity of the portion between the light-emitting portion 15 and the secondary reflecting surface 13a, the effective cooling is achieved with a small quantity of wind.

Since the secondary reflector 13 as the insulator is present between the first cooling electrode 18 and the second cooling electrode 19, the probability of the generation of the spark between the both electrodes 18 and 19 is reduced. Accordingly, the destruction of the electrode due to the spark or the influence of the spark on other electronic apparatuses is restrained. Also, since the first cooling electrode 18 is covered with the insulating film 21, a user is prevented from touching the first cooling electrode 18 by mistake. In other words, an accident of an electrical shock due to a touch with respect to the first cooling electrode 18 in the state of being applied with a voltage can be prevented from occurring. Also, since the first cooling electrode 18 is covered with the insulating film 21, the generation of the ionic wind on the outside of the secondary reflector 13 is restrained.

Figure 21:
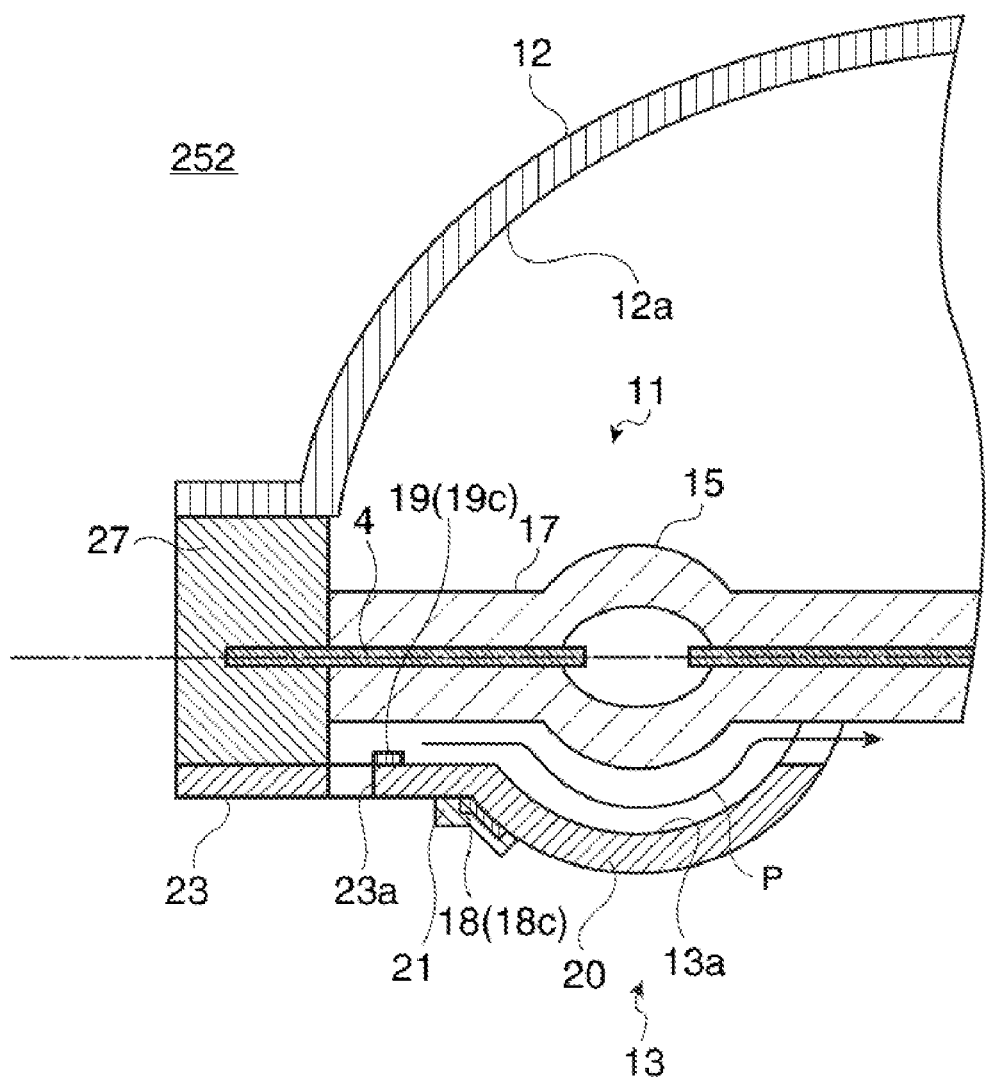
FIG. 21 is a lateral cross-sectional view of the light source unit according to a first modification of the seventh embodiment.

FIG. 21 is a lateral cross-sectional view of the light source unit according to a first modification of the seventh embodiment. In the first modification, the discharging portion 18c of the first cooling electrode 18 extends from the extending portion 23 to the back side of the secondary reflecting surface 13a. Since the discharging portion 18c of the first cooling electrode 18 extends from the extending portion 23 to the back side of the secondary reflecting surface 13a, the ionic wind can be introduced between the light-emitting portion 15 and the secondary reflecting surface 13a more reliably. Therefore, the air between the light-emitting portion 15 and the secondary reflecting surface 13a can be caused to flow further reliably to cool down the light-emitting portion 15 effectively.

Figure 22:
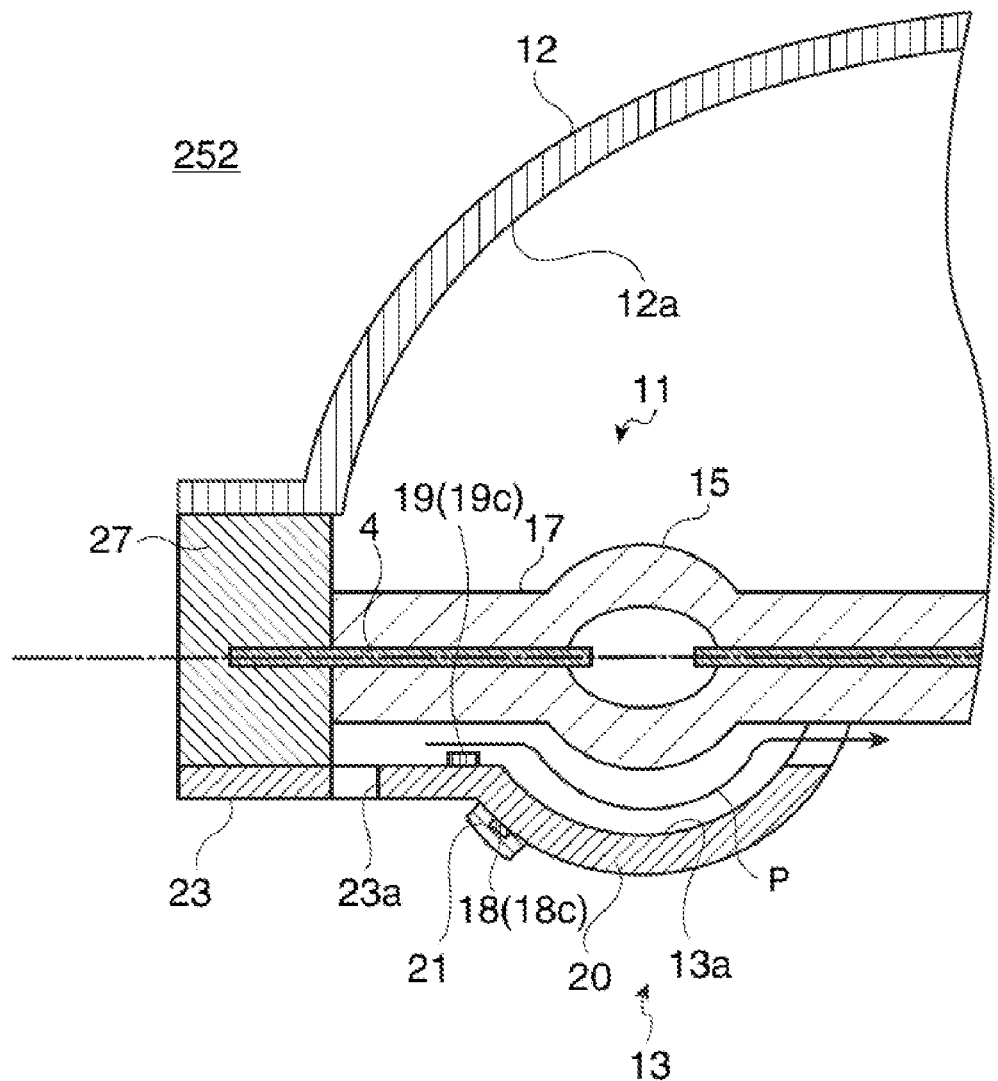
FIG. 22 is a lateral cross-sectional view of the light source unit according to a second modification of the seventh embodiment.

FIG. 22 is a lateral cross-sectional view of the light source unit according to a second modification of the seventh embodiment. In the second modification, the discharging portion 18c of the first cooling electrode 18 is arranged on the back side of the secondary reflecting surface 13a. In association with it, the discharging portion 19c of the second cooling electrode 19 is also arranged so as to be shifted toward the light-emitting portion 15 in comparison with the case shown in FIG. 20. Since the discharging portion 18c of the first cooling electrode 18 is arranged on the back side of the secondary reflecting surface 13a, the ionic wind can be introduced between the light-emitting portion 15 and the secondary reflecting surface 13a more reliably. Therefore, the air between the light-emitting portion 15 and the secondary reflecting surface 13a can be caused to flow further reliably to cool down the light-emitting portion 15 effectively.

Eighth Embodiment

Figure 23:
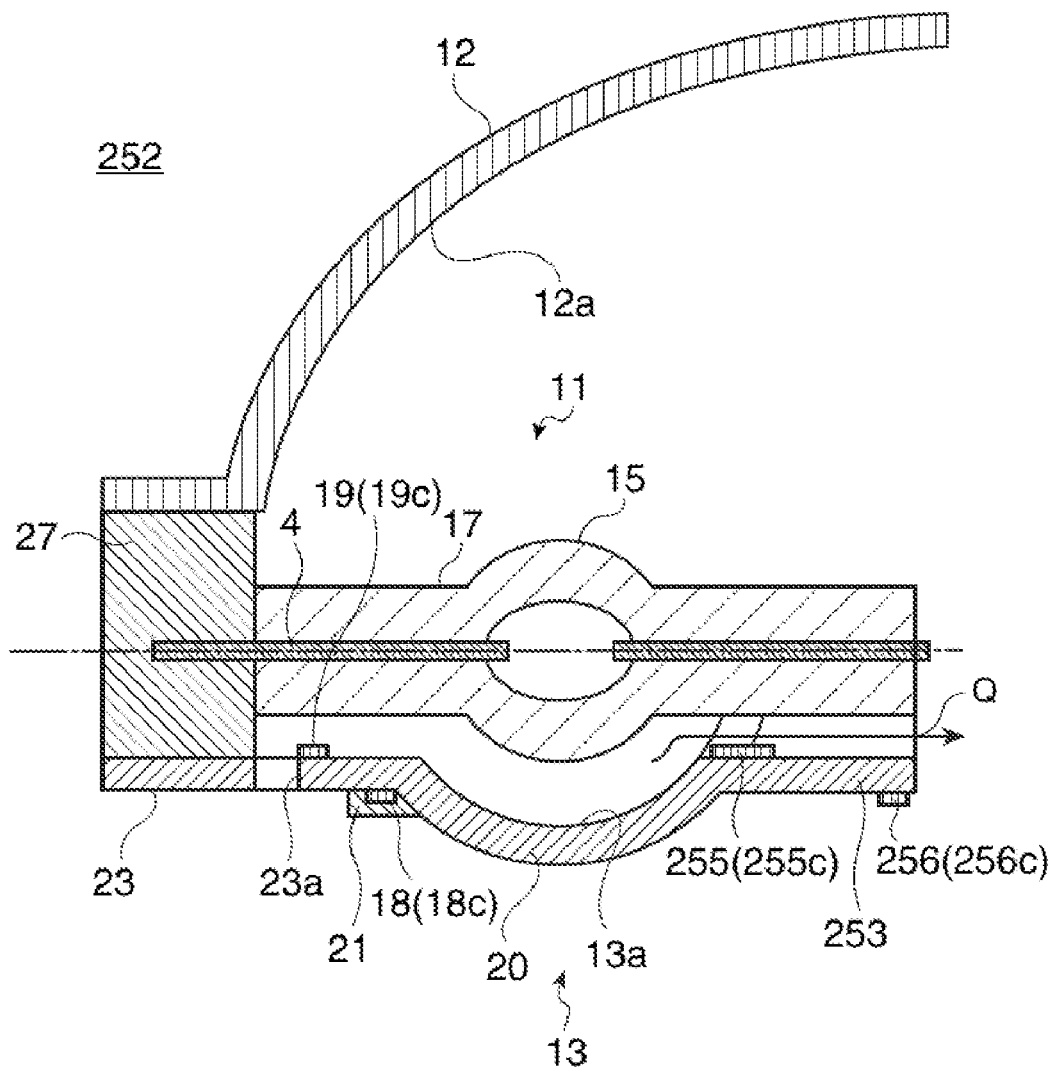
FIG. 23 is a lateral cross-sectional view of the light source unit according to an eighth embodiment.

FIG. 23 is a lateral cross-sectional view of the light source unit according to an eighth embodiment of the invention. In the eighth embodiment, an extending portion (second extending portion) 253 which covers the second sealed portion 16 of the arc tube 11 is formed on the side of the secondary reflecting portion 20 opposite from the side where the extending portion 23 is formed. On the side of the extending portion 253, a third cooling electrode (third electrode) 255 and a fourth cooling electrode (fourth electrode) 256 are provided.

The third cooling electrode 255 is formed by bending the plate-shaped metallic member so as to follow the shape of the extending portion 253. The third cooling electrode 255 is provided with a discharging portion 255c at the distal end thereof. The third cooling electrode 255 is bonded to the inside of the extending portion 253. Accordingly, the third cooling electrode 255 is arranged between the extending portion 253 and the second sealed portion 16.

The fourth cooling electrode 256 is formed by bending the plate-shaped metallic member so as to follow the shape of the extending portion 253, and includes the discharging portion 256c at the distal end thereof. The fourth cooling electrode 256 is arranged on the outside of the extending portion 253. The third cooling electrode 255 is arranged in such a manner that the discharging portion 255c is shifted backward from the discharging portion 256c of the fourth cooling electrode 256. In this arrangement, the discharging portion 255c of the third cooling electrode 255 is arranged at a position shifted from the discharging portion 256c of the fourth cooling electrode 256 toward the light-emitting portion 15.

The third cooling electrode 255 and the fourth cooling electrode 256 are connected to the voltage applying unit, not shown, and a voltage is applied between the both electrodes 255 and 256, so that the surface discharge is caused between the both electrodes 255 and 256 arranged so as to interpose the extending portion 253 of the secondary reflector 13 as the insulator therebetween. The air molecules ionized by the surface discharge near the discharging portion 255c of the third cooling electrode 255 are attracted toward the fourth discharging portion 256 and move between the extending portion 253 and the second sealed portion 16. The ionized air molecules collide with other air molecules when they are moving, and induce so-called the ionic wind from the third cooling electrode 255 toward the fourth cooling electrode 256. The voltage to be applied between the both electrodes 255 and 256 is preferably the AC voltage.

With the generation of the ionic wind between the extending portion 253 and the second sealed portion 16, a flow of air along an arrow Q is generated. Therefore, the air between the light-emitting portion 15 and the secondary reflecting surface 13a is caused to flow further significantly than the case of inducing the ionic wind only on the side of the first sealed portion 17. Accordingly, the cooling of the portion of the arc tube 11 covered with the secondary reflector 13 is achieved further effectively, whereby the appropriate temperature adjustment of the arc tube 11 is achieved. In the same manner as the modification in the seventh embodiment, the third cooling electrode 255 may be extended to the back side of the secondary reflecting surface 13a or may be provided only on the back side of the secondary reflecting surface 13a.

Ninth Embodiment

Figure 24:
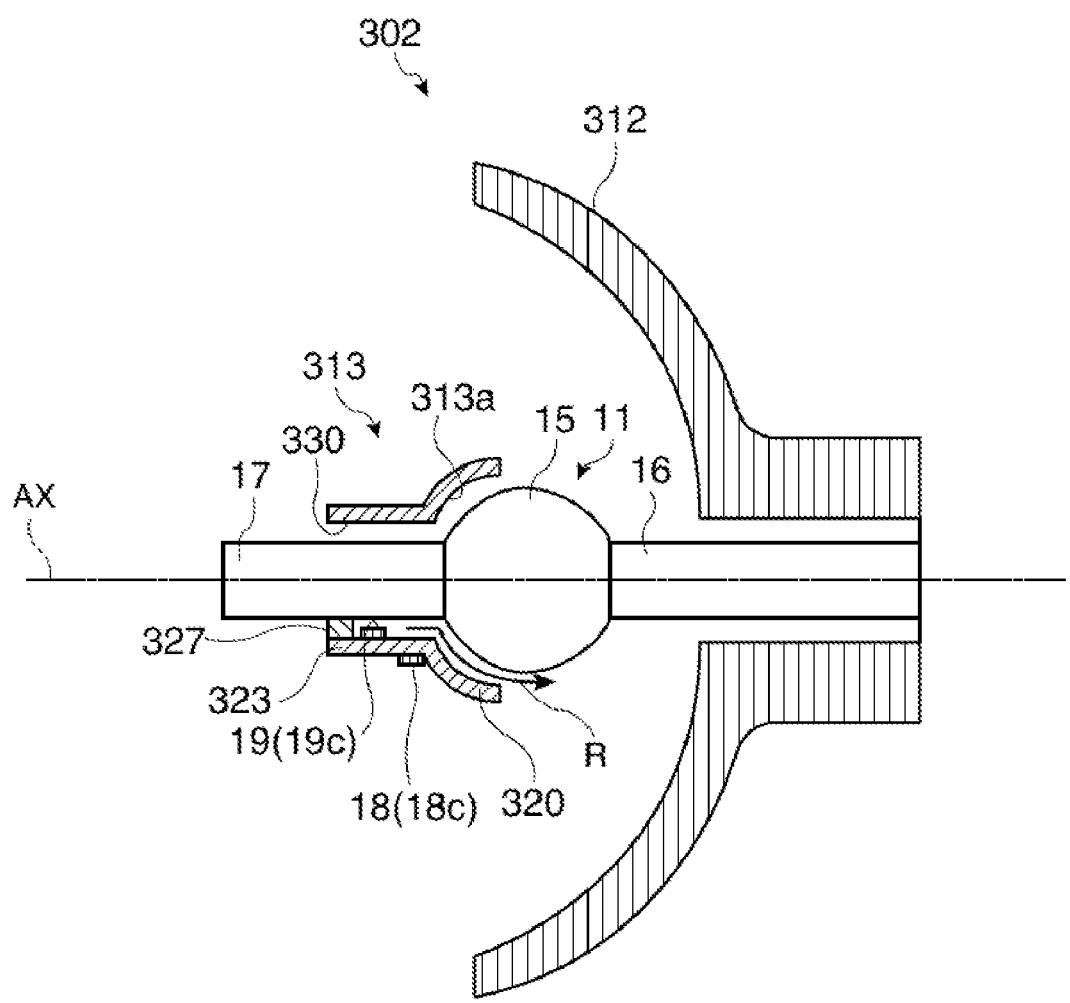
FIG. 24 is a lateral cross-sectional view of a light source unit according to a ninth embodiment.

FIG. 24 is a lateral cross-sectional view of a light source unit 302 according to a ninth embodiment of the invention. The light source unit 302 according to the ninth embodiment is characterized in that a secondary reflector 313 is provided on the front side (the side of the surface to be irradiated) with respect to the light-emitting portion 15.

A primary reflector 312 has substantially the same shape as the spheroid obtained by rotating the ellipse about the center axis AX. The primary reflector 312 is formed by evaporating the high-reflective member, for example, the dielectric multilayer film or the metallic member onto the surface of the base material formed into a desired shape. The primary reflector 312 is not limited to substantially the same shape as the spheroid and, may be substantially the same shape as the surface of revolution obtained by rotating the predetermined curved line such as the parabola or may be the shape of the free-form surface.

The secondary reflector 313 includes a secondary reflecting portion 320 formed with a secondary reflecting surface 313a and an extending portion 323. The secondary reflector 313 covers the periphery of the light-emitting portion 15 on the front side with respect to the light emitting portion 15 with the secondary reflecting portion 320. The secondary reflector 313 reflects the light emitted from the light-emitting portion 15 by the secondary reflecting surface 313a toward the light-emitting portion 15. A clearance is provided between the secondary reflecting surface 313a and the light-emitting portion 15. The secondary reflector 313 is formed by evaporating a dielectric multilayer film as a high-reflective member onto the surface of the base material formed into a desired shape. The base material used for the secondary reflector 313 in the ninth embodiment is an insulator. The dielectric multilayer film is also an insulator. With the provision of the primary reflector 312 and the secondary reflector 313, the light emitted from the light-emitting portion 15 is allowed to proceed efficiently toward the front.

The secondary reflector 313 is formed with the extending portion 323 on the front side thereof so as to cover the first sealed portion 17 of the arc tube 11. The extending portion 323 assumes a cylindrical shape which covers the periphery of the first sealed portion 17. In the ninth embodiment, the first sealed portion 17 of arc tube 11 is a sealed portion provided on the front side of the light-emitting portion 15.

The first cooling electrode 18 is arranged on the outside of the extending portion 323. The second cooling electrode 19 is bonded to the inside of the extending portion 323. The second cooling electrode 19 is arranged in such a manner that the discharging portion 19c is shifted backward from the discharging portion 18c of the first cooling electrode 18. In this arrangement, the discharging portion 18c of the first cooling electrode 18 is arranged at a position shifted from the discharging portion 19c of the second cooling electrode 19 toward the light-emitting portion 15.

Figure 25:
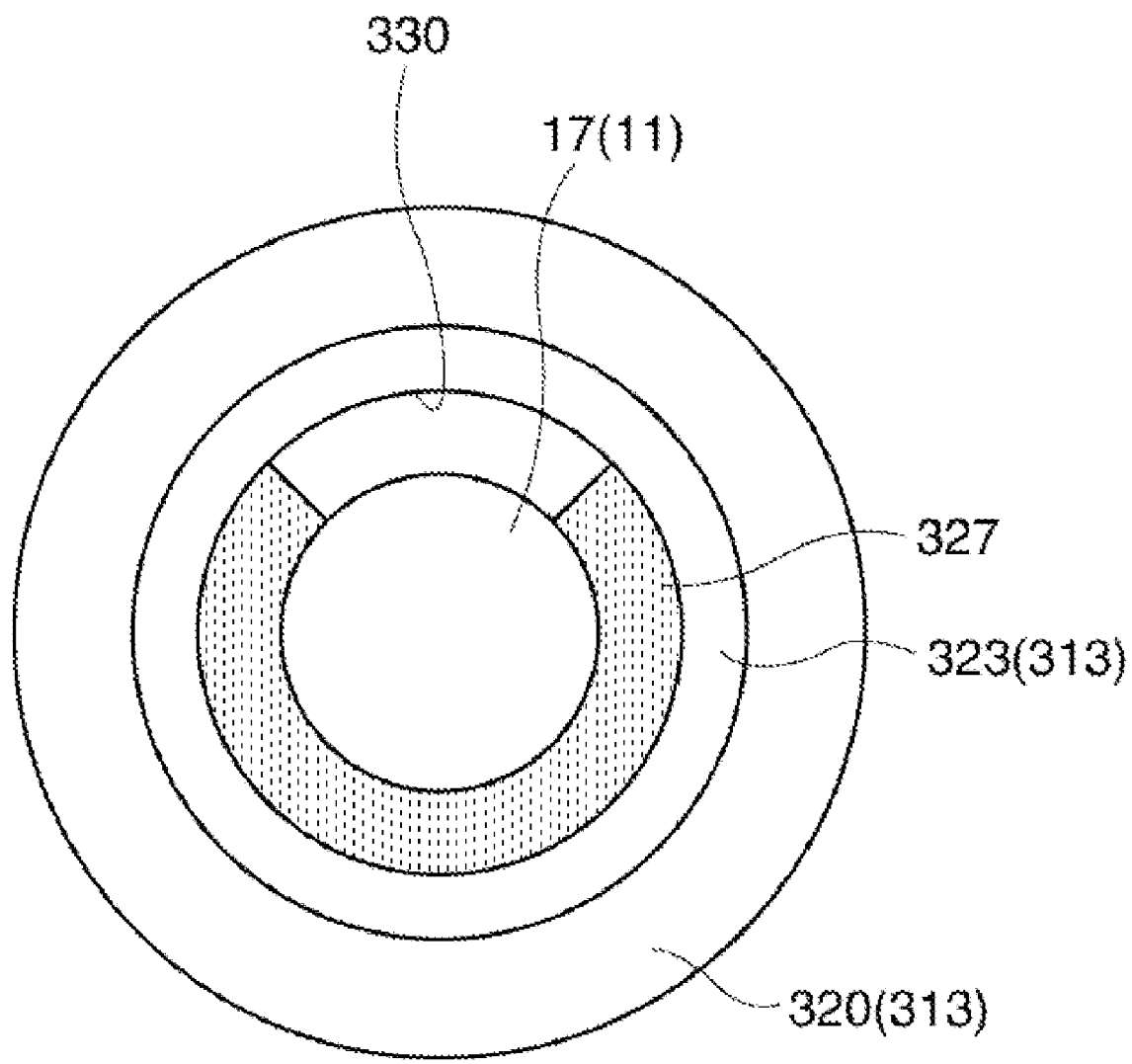
FIG. 25 is a drawing of a portion of an arc tube of the light source unit viewed from the front.

FIG. 25 is a drawing of a portion of the arc tube 11 of the light source unit 302 shown in FIG. 24 viewed from the front. The arc tube 11 is positioned and fixed by securing the first sealed portion 17 and the extending portion 323 with a securing portion 327. As shown in FIG. 25, the clearance between the first sealed portion 17 and the extending portion 323 is not completely filled with the securing portion 327, and a part of the clearance defines an opening 330.

In the configuration as described above, the first cooling electrode 18 and the second cooling electrode 19 are connected to the voltage applying unit, not shown, and a voltage is applied between the both electrodes 18 and 19, so that the surface discharge is caused between the both electrodes 18 and 19 arranged so as to interpose the extending portion 323 of the secondary reflector 313 as the insulator therebetween. The air molecules ionized by the surface discharge near the discharging portion 19c of the second cooling electrode 19 are attracted toward the first cooling electrode 18 and move between the extending portion 323 and the first sealed portion 17. The ionized air molecules collide with other air molecules when they are moving, and induce so-called the ionic wind from the second cooling electrode 19 toward the first cooling electrode 18. The voltage to be applied between the both electrodes 18 and 19 is preferably the AC voltage.

With the generation of the ionic wind between the extending portion 323 and the first sealed portion 17, a flow of air along an arrow R is generated, so that the air between the light-emitting portion 15 and the secondary reflecting surface 313a is caused to flow. Accordingly, the portion of the arc tube 11 covered with the secondary reflector 313 can effectively be cooled down, and hence the appropriate temperature adjustment of the arc tube 11 is achieved.

Since the portion between the first sealed portion 17 and the extending portion 323 is not completely filled with the securing portion 327 and the opening 330 is formed on the upstream side of the discharging portion 19c with respect to the flow of the ionic wind, the air is easily supplied from the outside of the secondary reflector 313, so that the quantity of the ionic wind can be increased.

Tenth Embodiment

Figure 26:
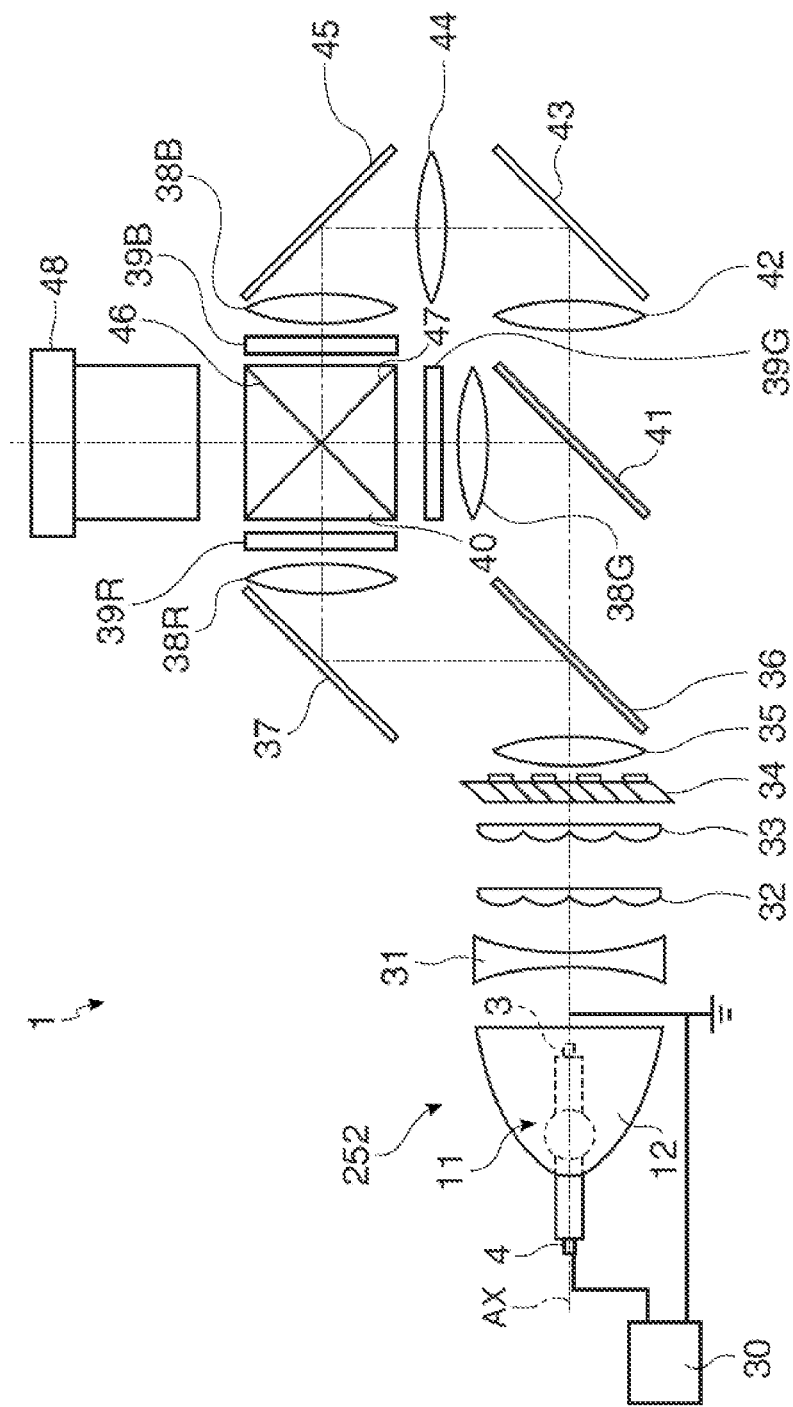
FIG. 26 is a drawing showing a schematic configuration of the projector according to a tenth embodiment of the invention.

FIG. 26 is a drawing showing a schematic configuration of the projector 1 according to a tenth embodiment of the invention. The projector 1 is the front projector configured to project the light on the screen, not shown, and allow the viewers to appreciate images by observing the light reflected from the screen. The projector 1 includes the light source unit 252 according to the seventh embodiment (see also FIG. 17, FIG. 18, FIG. 19, and FIG. 20). The light source unit 252 emits light containing red (R) light, green (G) light, and blue (B) light. The voltage applying unit 30 is connected to the light source unit 252. The voltage applying unit 30 applies the AC voltage supplied from the power source (not shown) between the first cooling electrode 18 and the second cooling electrode 19. The voltage applying unit 30 applies the voltage which causes the surface discharge between the first cooling electrode 18 and the second cooling electrode 19. The first cooling electrode 18 is grounded.

In the projector 1 according to the tenth embodiment of the invention, the light emitted from the light source unit 202 is modulated by the R-light spatial light modulator 39R, the G-light spatial light modulator 39G, and the B-light spatial light modulator 39B, is passed through the projection lens 48, and is projected in the direction of the screen in the same manner as the projectors according to the above-described embodiments.

With the employment of the light source unit 252 which is capable of cooling down the light-emitting portion effectively while restraining occurrence of the problems such as the complication of the structure or the generation of noise, the projector 1 is capable of displaying the bright images stably with high efficiency in the simple configuration. Assuming that the state shown in FIG. 19 is the elect state and the state inverted vertically therefrom is the inverted state, the upper side of the arc tube 11 is covered with the secondary reflector 13 when the light source unit 252 is used in the inverted state. In this inverted state, the heat is apt to stay between the light-emitting portion 15 and the secondary reflecting surface 13a. However, since the light-emitting portion 15 can be cooled down effectively by causing the air between the light-emitting portion 15 and the secondary reflector 13 to flow using the ionic wind, the probability of occurrence of malfunction due to the ineffective cooling is restrained and the stable operation of the projector 1 is achieved. Also, since the surface discharge can be utilized by arranging the secondary reflector 13 as the insulator so as to be interposed between the first cooling electrode 18 and the second cooling electrode 19, the AC voltage supplied from the power source can be applied without converting into the DC voltage. Therefore, the component for converting the voltage can be eliminated, and hence the cost reduction is achieved.

The light source unit used in the projector 1 is not limited to the light source unit 252 described in the seventh embodiment, and the light source unit 252 described in the eighth embodiment and the light source unit 302 described in the ninth embodiment may also be used.

Eleventh Embodiment

Figure 27:
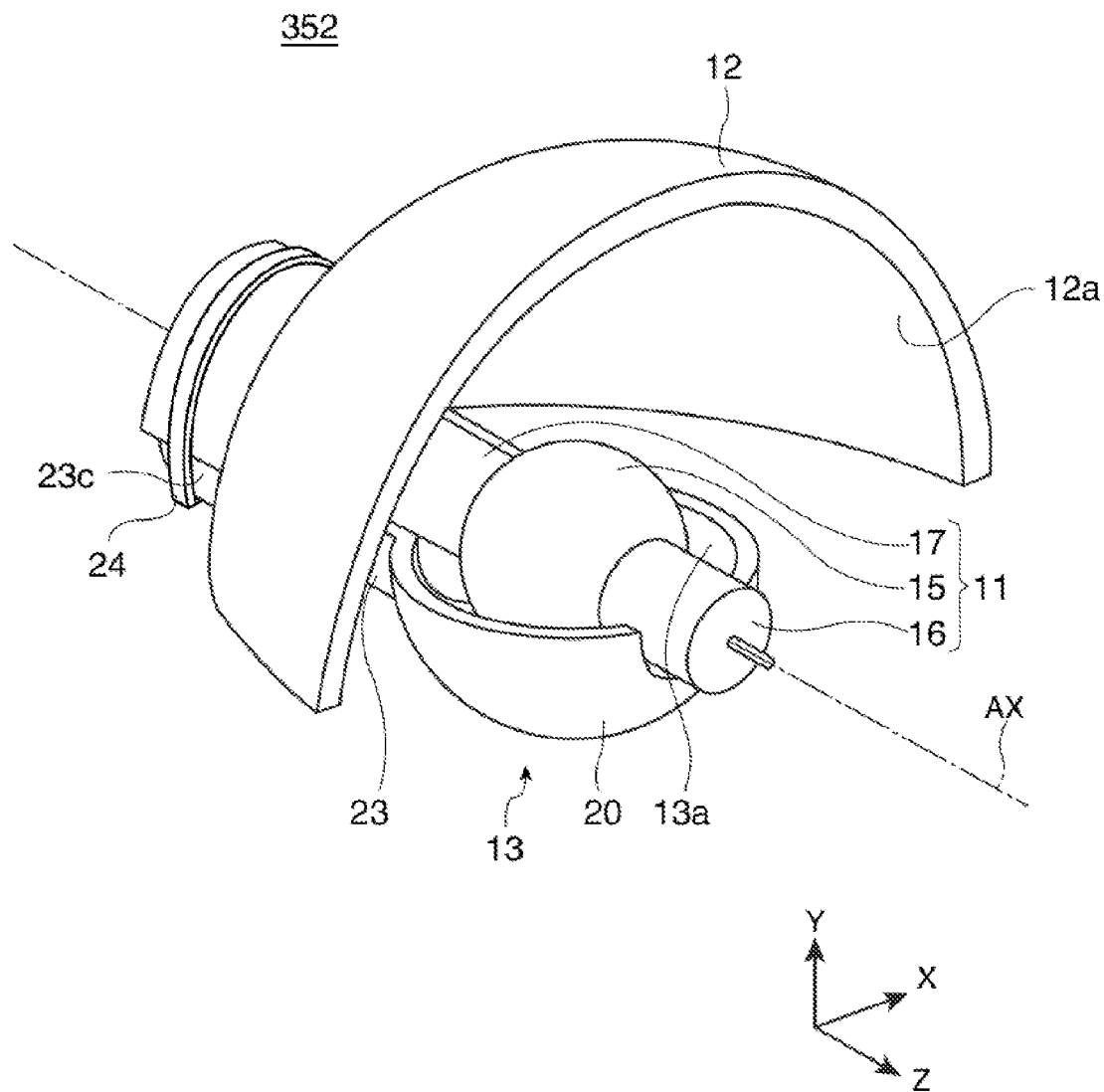
FIG. 27 is an external perspective view showing a schematic configuration of a light source unit according to an eleventh embodiment of the invention.
Figure 28:
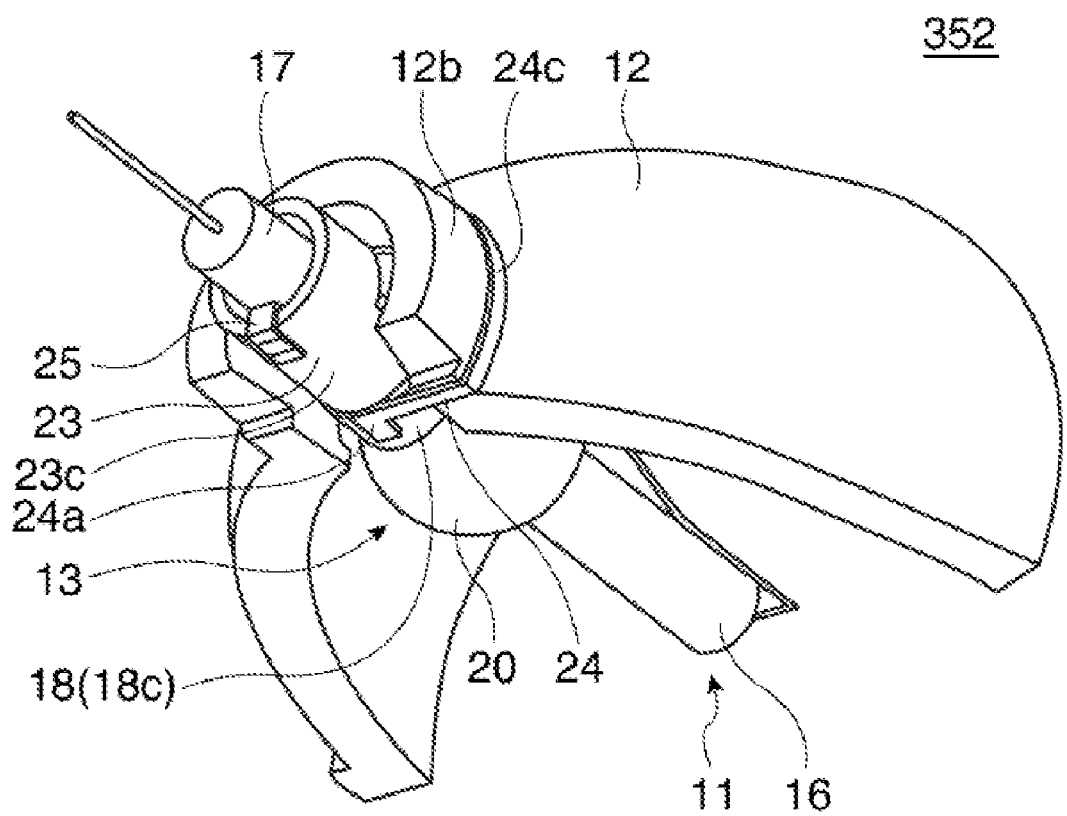
FIG. 28 is a perspective view of the light source unit shown in FIG. 1 viewed from the side of the secondary reflector.
Figure 29:
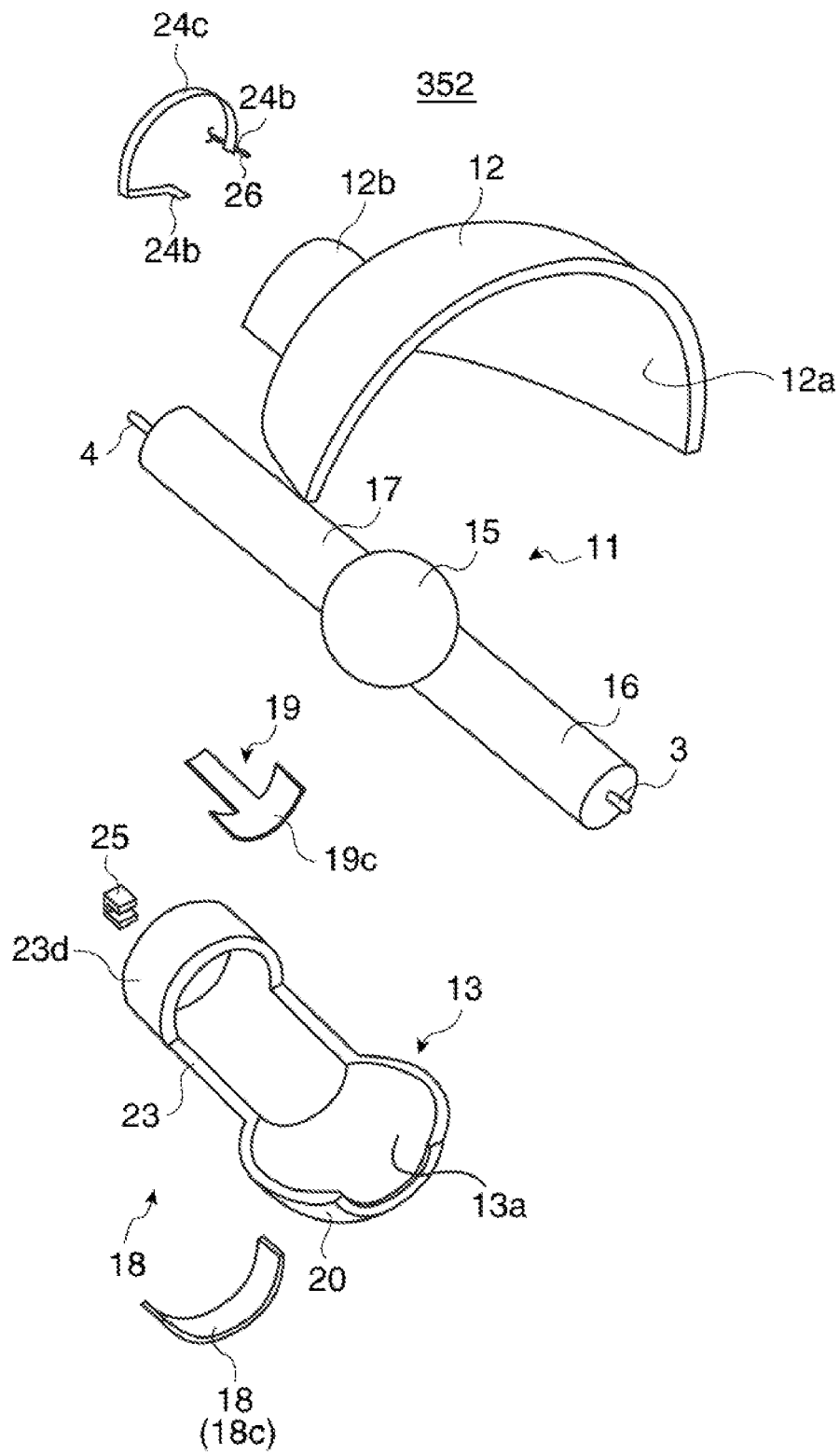
FIG. 29 is an exploded perspective view of the light source unit.
Figure 30:
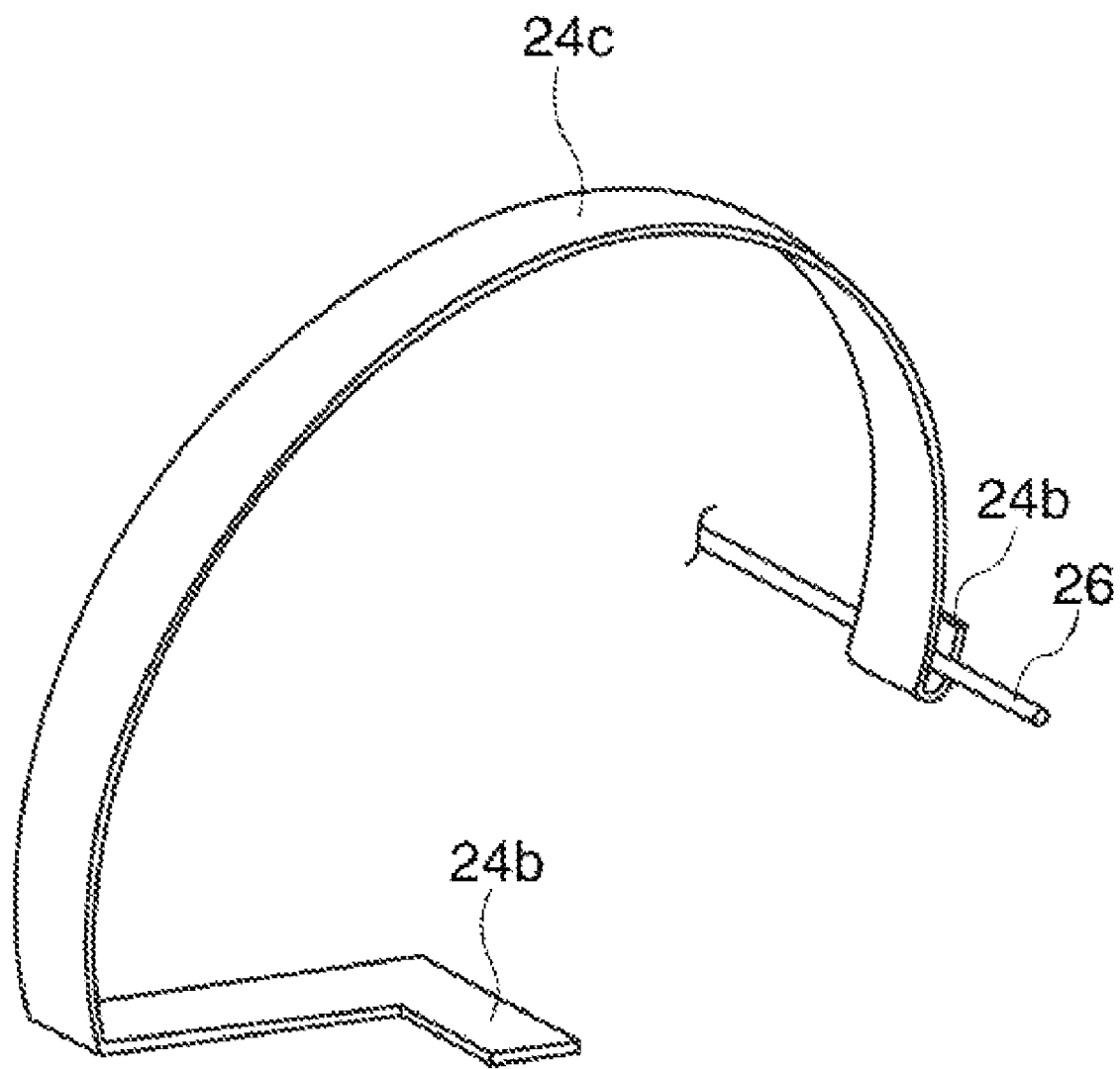
FIG. 30 is an external perspective view of a first power feeding member.
Figure 31:
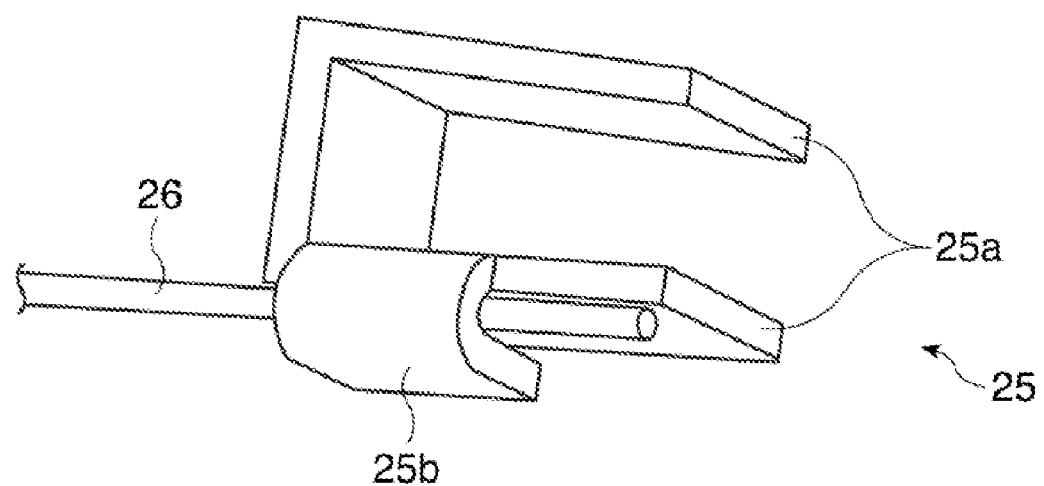
FIG. 31 is a perspective view for explaining a power receiving portion of a second power feeding member.
Figure 32:
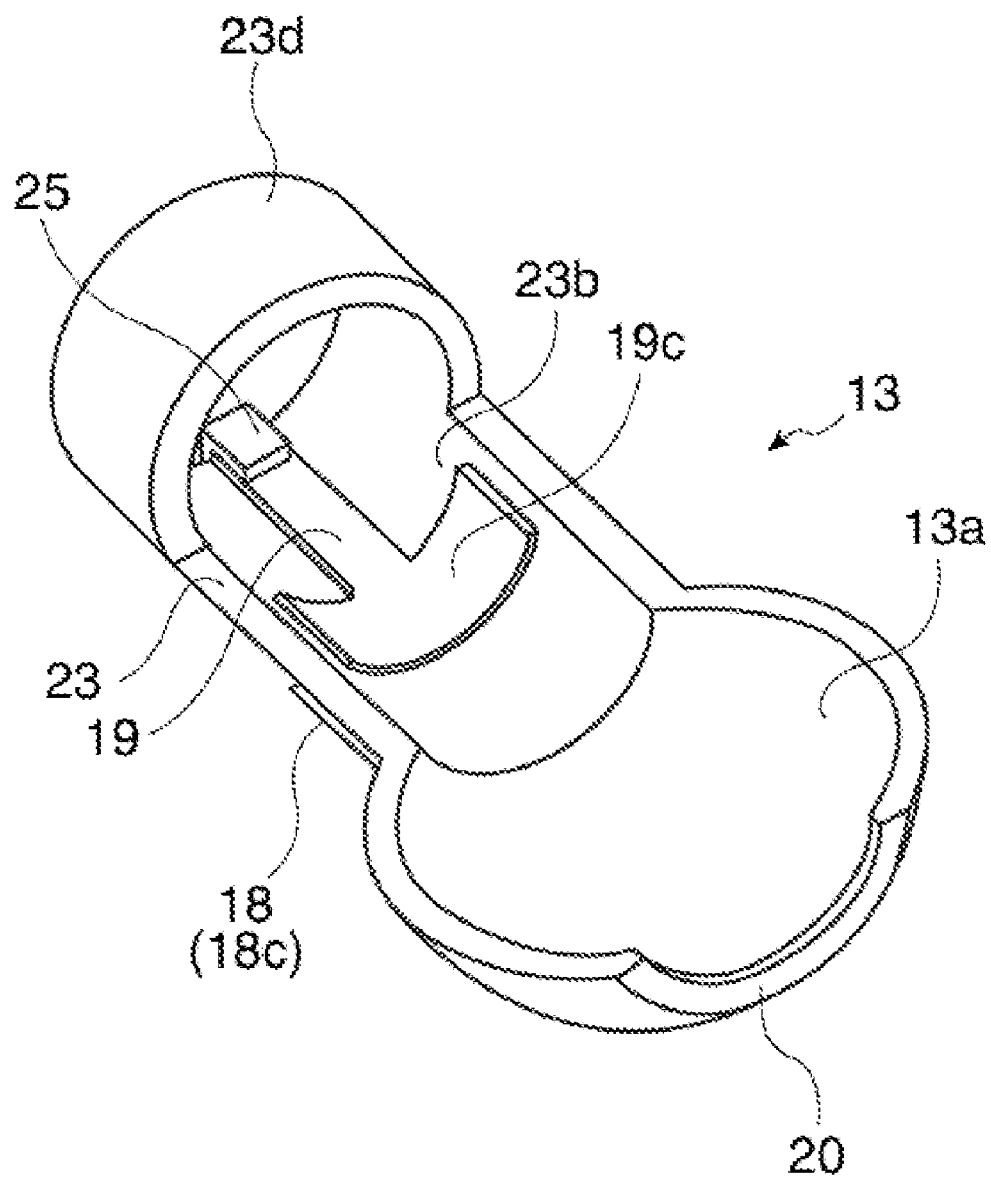
FIG. 32 is a perspective view showing the secondary reflector in a state in which the second power feeding member is attached.
Figure 33:
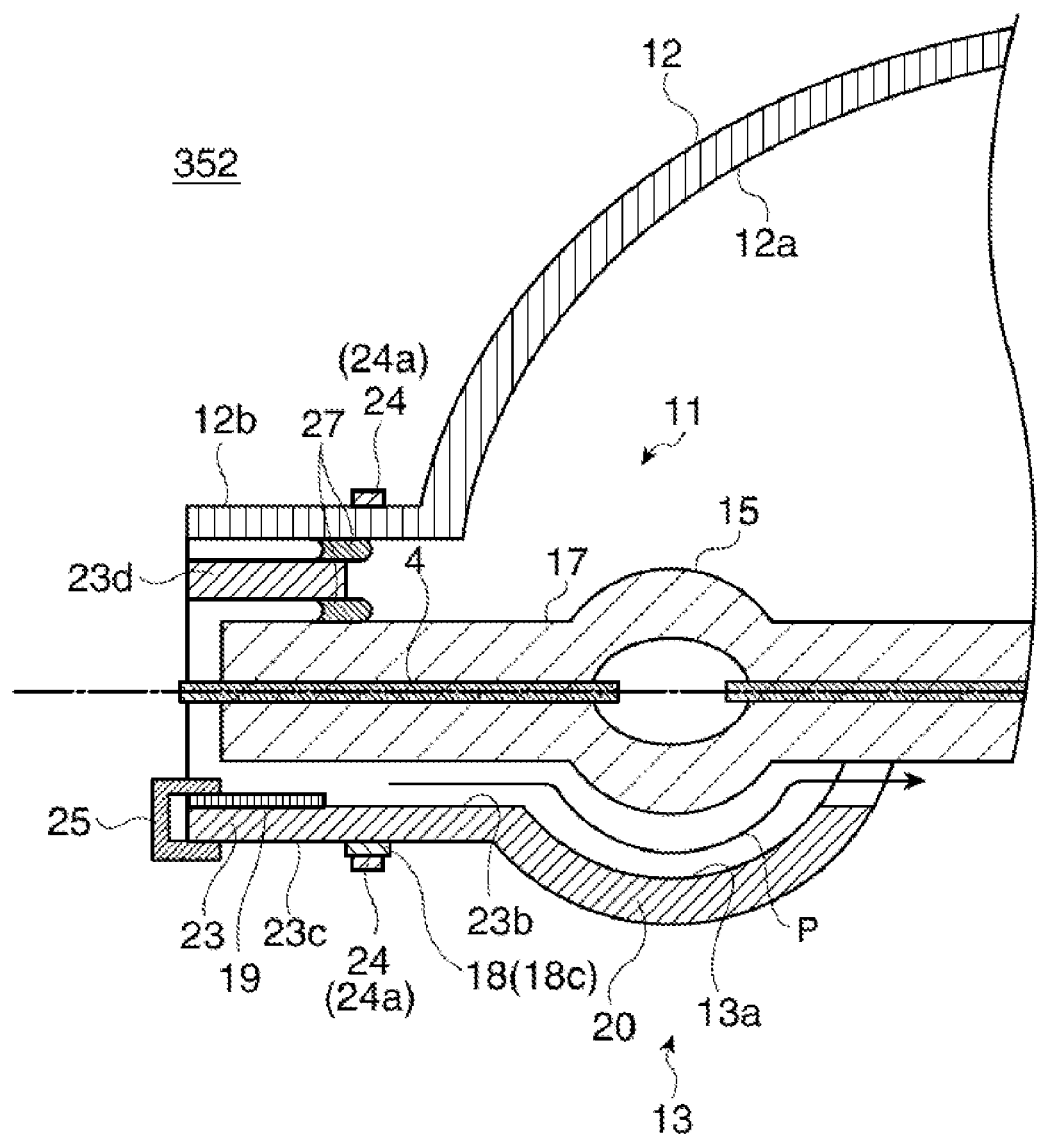
FIG. 33 is a lateral cross-sectional view of the light source unit.

FIG. 27 is an external perspective view showing a schematic configuration of a light source unit 352 according to an eleventh embodiment of the invention. FIG. 28 is a perspective view of the light source unit 352 shown in FIG. 27 viewed from the side of the secondary reflector. FIG. 29 is an exploded perspective view of the light source unit 352 shown in FIG. 27. FIG. 30 is an external perspective view of a first power feeding member. FIG. 31 is a perspective view for explaining a power receiving portion of a second power feeding member. FIG. 32 is a perspective view showing the secondary reflector in a state in which the second power feeding member is attached. FIG. 33 is a lateral cross-sectional view of the light source unit 352.

The light source unit 352 includes the arc tube 11, the primary reflector 12, the secondary reflector 13, the first cooling electrode (first electrode) 18, the second cooling electrode (second electrode) 19, a first power feeding member 24, and a second power feeding member 25. The light source unit 352 emits light containing red (R) light, green (G) light, and blue (B) light. In the description of the embodiments of this application, the X axis is an axis orthogonal to the center axis AX of the arc tube 11. The Y axis is an axis orthogonal to the center axis AX and the X axis. The Z axis is an axis parallel to the center axis AX. The direction of an arrow of the Z-axis indicates a direction from the light source unit 352 toward a surface to be irradiated, not shown. The directions of arrows of the respective axes are determined to be the positive directions, and opposite directions are determined to the negative directions. The side of the positive direction along the Z-axis with respect to the light source unit 352 is referred to as "front side", and the side of the negative direction is referred to as "rear side". Likewise, the side of the positive direction along the Y-axis with respect to the light source unit 352 is referred to as "upper side", and the side of the negative direction is referred to as "lower side".

The arc tube 11 and the primary reflector 12 employed in the eleventh embodiment are the same as those employed in the embodiments described above.

The secondary reflector 13 includes the secondary reflecting portion 20 formed with the secondary reflecting surface 13a for reflecting the light emitted from the light-emitting portion 15 and the extending portion (first extending portion) 23. The secondary reflector 13 reflects the light emitted from the light-emitting portion 15 off the secondary reflecting surface 13a toward the light-emitting portion 15. The light reflected from the secondary reflecting surface 13a enters the primary reflecting surface 12a, and is reflected from the primary reflecting surface 12a and proceeds to the front side. The secondary reflecting surface 13a covers part of the periphery of the light-emitting portion 15 from the underside. The clearance is provided between the secondary reflecting portion 20 and the light-emitting portion 15. The secondary reflector 13 is formed by evaporating the high-reflective member such as the dielectric multilayer film onto the surface of the base material formed into a desired shape. In the eleventh embodiment, the basic material used for the secondary reflector 13 is the insulator such as quartz. The dielectric multilayer film is also the insulator. The high-reflective member uses a member demonstrating a high reflectance ratio for light having wavelengths in the visible region. With the provision of the primary reflector 12 and the secondary reflector 13, the light emitted from the light-emitting portion 15 can be proceeded efficiently toward the front.

The extending portion 23 is formed on the back side portion of the secondary reflecting portion 20 so as to cover part of the first sealed portion 17. By the extending portion 23 secured to the arc tube 11 or the primary reflector 12, positioning and fixation of the secondary reflector 13 in the light source unit 352 are achieved. The extending portion 23, the arc tube 11, and the primary reflector 12 are secured via the securing portion 27. Cement or the like having a heat resistant property is used as the securing portion 27. The back side portion of the extending portion 23 is a cylindrical portion 23d having a cylindrical shape to allow the arc tube 11 and the primary reflector 12 to be secured easily. The surface of the secondary reflector 13 on the side on which the arc tube 11 is arranged is referred to as an inner side surface 23b and the surface on the opposite side thereof is referred to as an outer side surface 23c.

The first cooling electrode 18 and the second cooling electrode 19 are arranged so as to interpose the secondary reflector 13 between the both electrodes 18 and 19. The first cooling electrode 18 and the second cooling electrode 19 serve to induce the ionic wind due to the surface discharge by applying a voltage between the both electrodes 18 and 19.

The first cooling electrode 18 is formed by bending the plate-shaped metallic member so as to follow the shape of the extending portion 23, and serves as the discharging portion 18c as a whole. The first cooling electrode 18 is arranged on the outer side surface 23c of the extending portion 23.

The second cooling electrode 19 is formed by bending the plate-shaped metallic member so as to follow the shape of the extending portion 23. The second cooling electrode 19 is provided with the discharging portion 19c at the distal end thereof, and a proximal portion extends to the back side of the extending portion 23. The second cooling electrode 19 is bonded to the inner side surface 23b of the extending portion 23. Accordingly, the second cooling electrode 19 is arranged between the first sealed portion 17 and the extending portion 23.

The second cooling electrode 19 is arranged in such a manner that the discharging portion 19c is shifted backward from the discharging portion 18c of the first cooling electrode 18. In this arrangement, the discharging portion 18c of the first cooling electrode 18 is arranged at a position shifted from the discharging portion 19c of the second cooling electrode 19 toward the light-emitting portion 15. The cooling electrodes 18 and 19 may be formed of a metallic film or an ITO film (transparent conductive films). In particular, the ITO film has a smaller difference in linear expansion coefficient thereof from that of the secondary reflector 13 than the difference between the linear expansion coefficient of the metallic member and the linear expansion coefficient of the secondary reflector 13 in many cases, so that when it is stuck on the secondary reflector 13, the probability of occurrence of separation thereof due to the temperature change may be reduced.

The first power feeding member 24 is a member for supplying an electric power to the first cooling electrode 18, and is formed of metal. The first power feeding member 24 includes a power feeding portion 24a, a power receiving portion 24b, and a fitting portion 24c. The fitting portion 24c has substantially a C-shape, and has an inner diameter slightly smaller than the outer diameter of a proximal portion 12b of the primary reflector 12. Accordingly, by fitting the fitting portion 24c to the proximal portion 12b, the first power feeding member 24 is fixed to the primary reflector 12. An elastic force of the fitting portion 24c causes the first power feeding member 24 to come into tight contact with the proximal portion 12b and prevents from coming apart easily.

The power feeding portion 24a of the first power feeding member 24 is formed so as to extend from one end portion of the fitting portion 24c. As shown in FIG. 28, the power feeding portion 24a is formed so as to come into contact with the first cooling electrode 18 provided on the outer side surface 23c of the secondary reflector 13 in a state in which the fitting portion 24c is fitted to the proximal portion 12b. By setting the distance between the upper end portion of the fitting portion 24c and the power feeding portion 24a to be smaller than the distance between the lower end of the extending portion 23 and the upper end of the proximal portion 12b in a state in which the light source unit 352 is assembled, the power feeding portion 24a can be brought into tight contact with the first cooling electrode 18 by the resilient force of the first power feeding member 24.

The power receiving portion 24b is configured to hold a power cable 26 by clipping the same as shown in FIG. 30. More specifically, a plate-shaped portion formed so as to extend from the other end of the fitting portion 24c is configured as the power receiving portion 24b, and the power cable 26 is clipped by bending the plate-shaped portion.

The second power feeding member 25 is a member for supplying the electric power to the second cooling electrode 19, and is formed of metal. The second power feeding member 25 includes power feeding portions 25a and a power receiving portion 25b. The power feeding portions 25a is formed into substantially an angular U-shape. A clearance between distal ends of the power feeding portions 25a is determined to be slightly smaller than the thickness of the extending portion 23. As shown in FIG. 32, the second power feeding member 25 is fitted to the extending portion 23 so as to clip the extending portion 23 and the second cooling electrode 19 from the back side of the secondary reflector 13 (the side opposite from the direction of light emission). Since the clearance between the distal ends of the power feeding portions 25a is formed to be slightly smaller than the thickness of the extending portion 23, the power feeding portion 25a and the second cooling electrode 19 can be brought into tight contact with each other by the elastic force of the power feeding portions 25a. The second power feeding member 25 can be prevented from coming apart easily from the extending portion 23. In this manner, the power feeding portions 25a of the second power feeding member 25 function as a fitting portion to be fitted to the extending portion 23 of the secondary reflector 13.

The power receiving portion 25b of the second power feeding member 25 is configured to hold the power cable 26 by clipping the same as shown in FIG. 31. More specifically, a plate-shaped portion formed so as to extend from the power feeding portion 25a is configured as the power receiving portion 25b, and the power cable 26 is clipped by bending the plate-shaped portion.

The first cooling electrode 18 and the second cooling electrode 19 are connected to the voltage applying unit, not shown, and a voltage is applied between the both electrodes 18 and 19, so that the surface discharge is caused between the both electrodes 18 and 19 arranged so as to interpose the extending portion 23 of the secondary reflector 13 as the insulator therebetween. The air molecules ionized by the surface discharge near the discharging portion 19c of the second cooling electrode 19 are attracted toward the discharging portion 18c of the first cooling electrode 18 and move between the extending portion 23 and the first sealed portion 17. The ionized air molecules collide with other air molecules when they are moving, and induce so-called the ionic wind from the second cooling electrode 19 toward the first cooling electrode 18. The voltage to be applied between the both electrodes 18 and 19 is preferably the AC voltage.

With the generation of the ionic wind between the extending portion 23 and the first sealed portion 17, the flow of air along the arrow P is generated, so that the air between the light-emitting portion 15 and the secondary reflecting surface 13a is caused to flow. Accordingly, the portion of the arc tube 11 covered with the secondary reflector 13 can effectively be cooled down, and hence the appropriate temperature adjustment of the arc tube 11 is achieved. The surface discharge occurs more easily than the corona discharge even with the electrode having no pointed distal end, so that ionization of the air might be achieved in a wide range. For example, the air might be ionized in the periphery of substantially the entire area of one side of the discharging portion 19c on the side of the first cooling electrode 18, so that the stronger ionic wind can be induced. Therefore, the air between the light-emitting portion 15 and the secondary reflecting surface 13a is caused to flow significantly, so that the cooling of the light-emitting portion 15 is achieved further effectively.

Since the air between the light-emitting portion 15 and the secondary reflecting surface 13a is caused to flow without providing the blower or the fan duct, the probability of occurrence of the problems such as the complication of the structure and the noise generation by the blower is reduced. In addition, since the ionic wind can be induced in a portion where the air flow is wanted, that is, in the vicinity of the portion between the light-emitting portion 15 and the secondary reflecting surface 13a, the effective cooling is achieved with a small quantity of wind.

In this embodiment, the respective cooling electrodes 18 and 19 and the power cable 26 are connected via the power feeding members 24 and 25. It is also possible to connect the respective cooling electrodes 18 and 19 directly with the power cable 26 by soldering or the like. However, the solder may be melted by the heat from the arc tube 11, so that it is difficult to maintain a favorable connecting state. In contrast, with the connection via the power feeding members 24 and 25, since the power cable 26 is held by being clipped, and the power feeding portions 24a and 25a are brought into tight contact with the respective cooling electrodes 18 and 19, the connection between the respective cooling electrodes 18 and 19 and the power cable 26 is achieved without using the solder or the like. Therefore, by using the power feeding members 24 and 25, a power supply with high reliability is realized even under a high-temperature environment, namely, in the vicinity of the arc tube 11.

Since the power feeding members 24 and 25, are not secured to, but are brought into contact with the respective cooling electrodes 18 and 19, even though the coefficients of linear expansion of the respective cooling electrodes 18 and 19 are different from the coefficients of the linear expansion of the power feeding members 24 and 25 for example, what will occur is only a shift corresponding to the difference in degree of expansion from each other under the high-temperature environment and the low-temperature environment. Therefore, there is no risk of occurrence of cracks at a connected point as in the case of the connection using the solder, so that the power supply with higher reliability can be realized.

The shape of the second power feeding member 25 is only needed to be able to clip the extending portion 23 and the second cooling electrode 19, and is not limited to the angular U-shape. For example, a C-shape is also applicable. It is also possible to configure the second power feeding member 25 so as be fitted onto the extending portion 23 from the lateral side of the extending portion 23.

Figure 34:
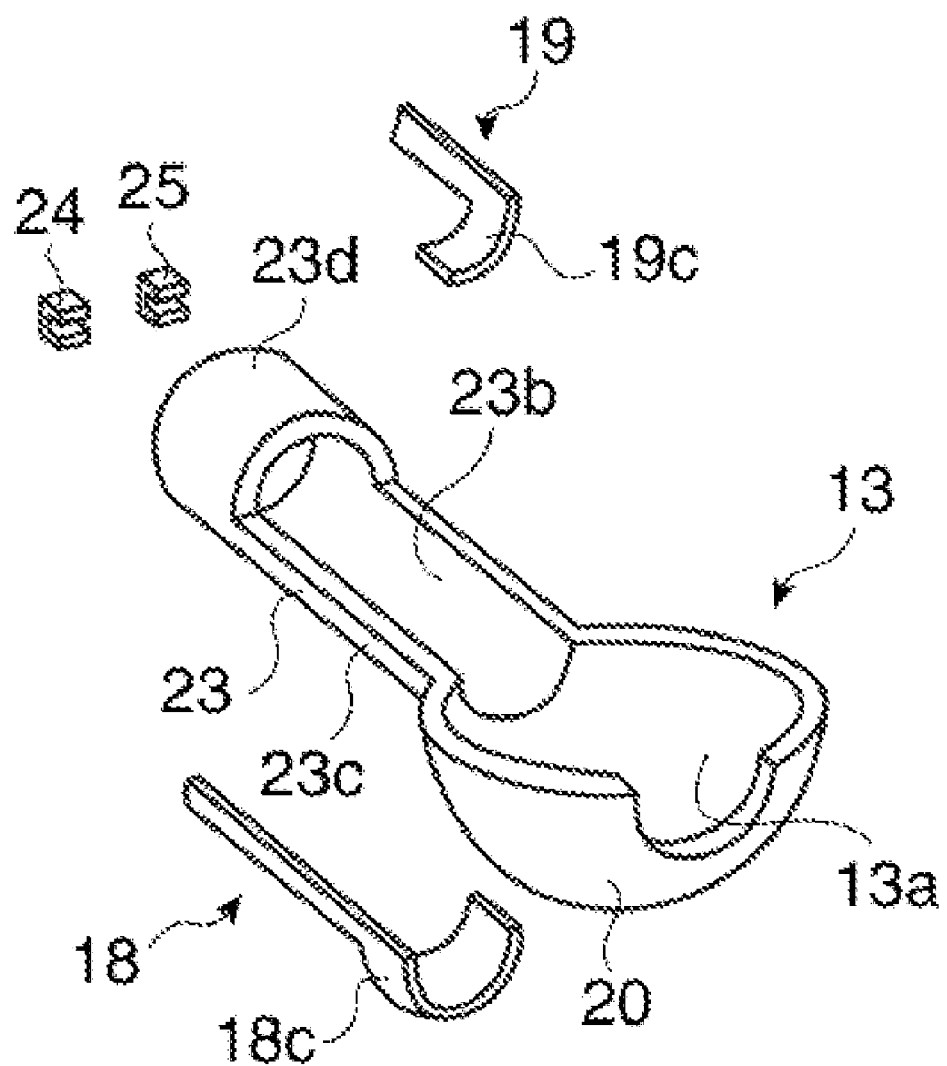
FIG. 34 is an exploded perspective view of a portion of the secondary reflector provided in the light source unit according to a first modification of the eleventh embodiment.
Figure 35:
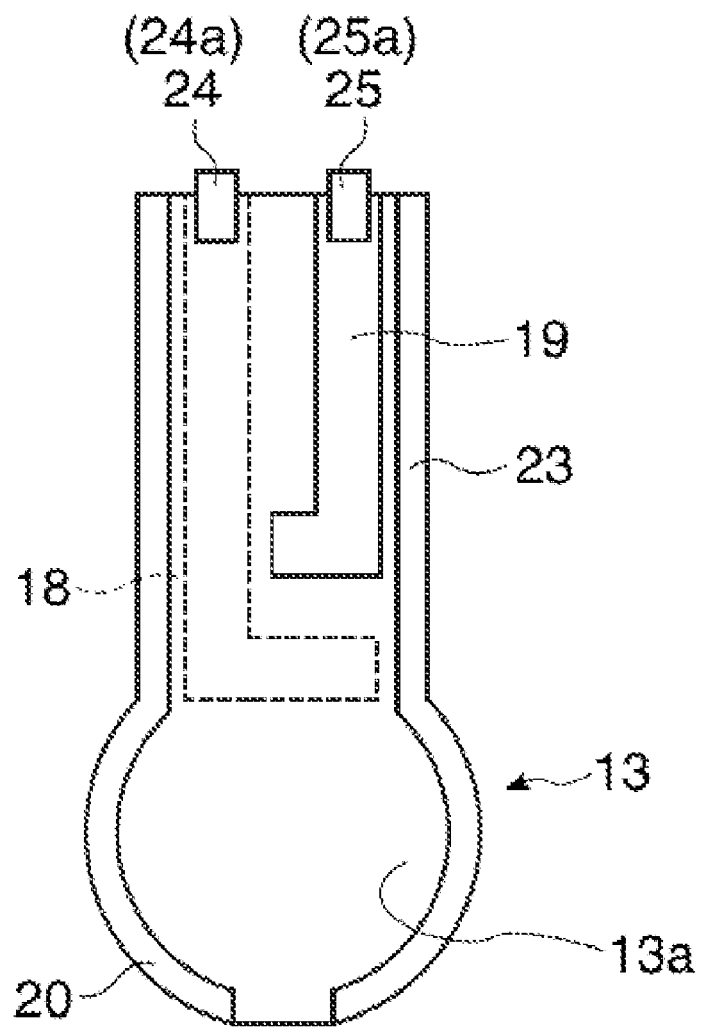
FIG. 35 is a plan view of the secondary reflector having the first electrode and the second electrode attached thereto.

FIG. 34 is an exploded perspective view of the secondary reflector provided in the light source unit according to a first modification of the eleventh embodiment. FIG. 35 is a plan view of the secondary reflector having the first cooling electrode and the second cooling electrode attached thereto. In the first modification, the first power feeding member 24 having the same shape and configuration as the second power feeding member 25 describe above is used. The first power feeding member 24 and the second power feeding member 25 are also fitted to the extending portion 23 from the back side of the secondary reflector 13.

As shown in FIG. 35, the first power feeding member 24 and the second power feeding member 25 are formed so that the proximal portions thereof extend to the back side of the extending portion 23. The portions extending to the back sides of the first power feeding member 24 and the second power feeding member 25 are formed so as to be apart from each other as much as possible two-dimensionally, so that the generation of the ionic wind in a region other than the discharging portions 18*c* and 19*c* is restrained.

In this manner, by employing the first power feeding member 24 and the second power feeding member 25 to have the same shape and configuration, the components may be used commonly, so that the manufacturing cost may be reduced.

Figure 36:
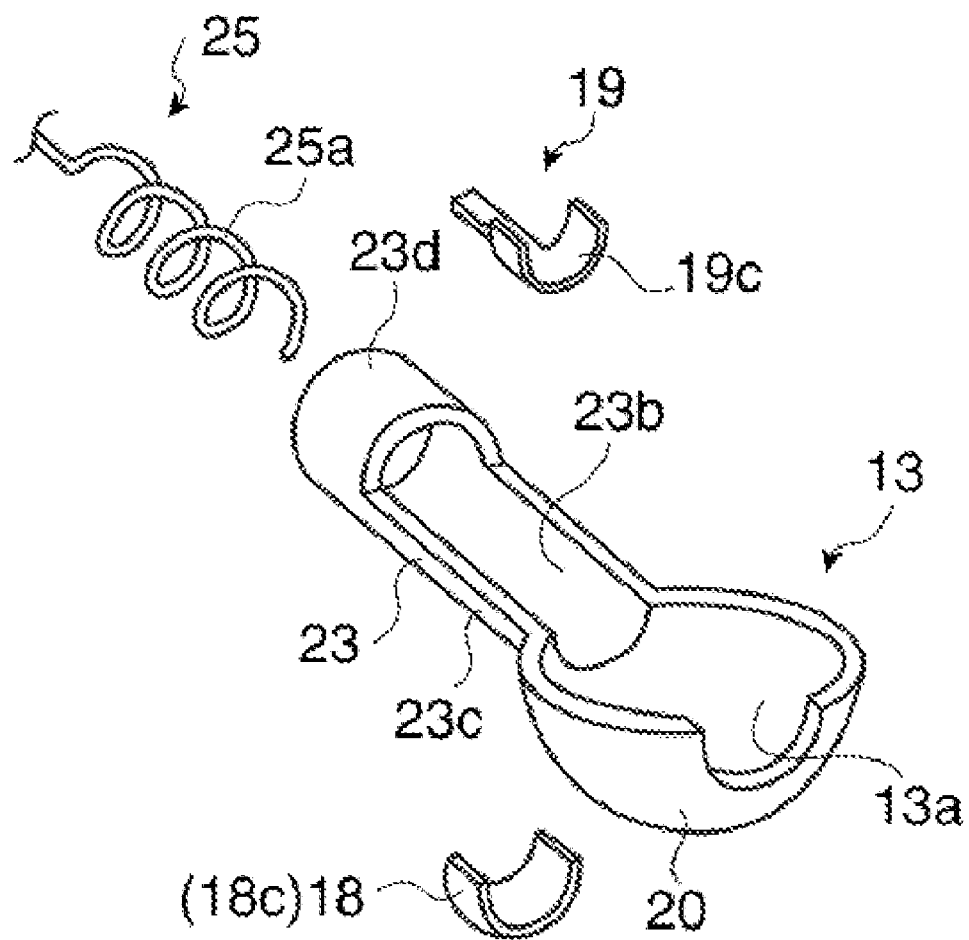
FIG. 36 is an exploded perspective view of the secondary reflector provided in the light source unit according to a second modification of the eleventh embodiment.
Figure 37:
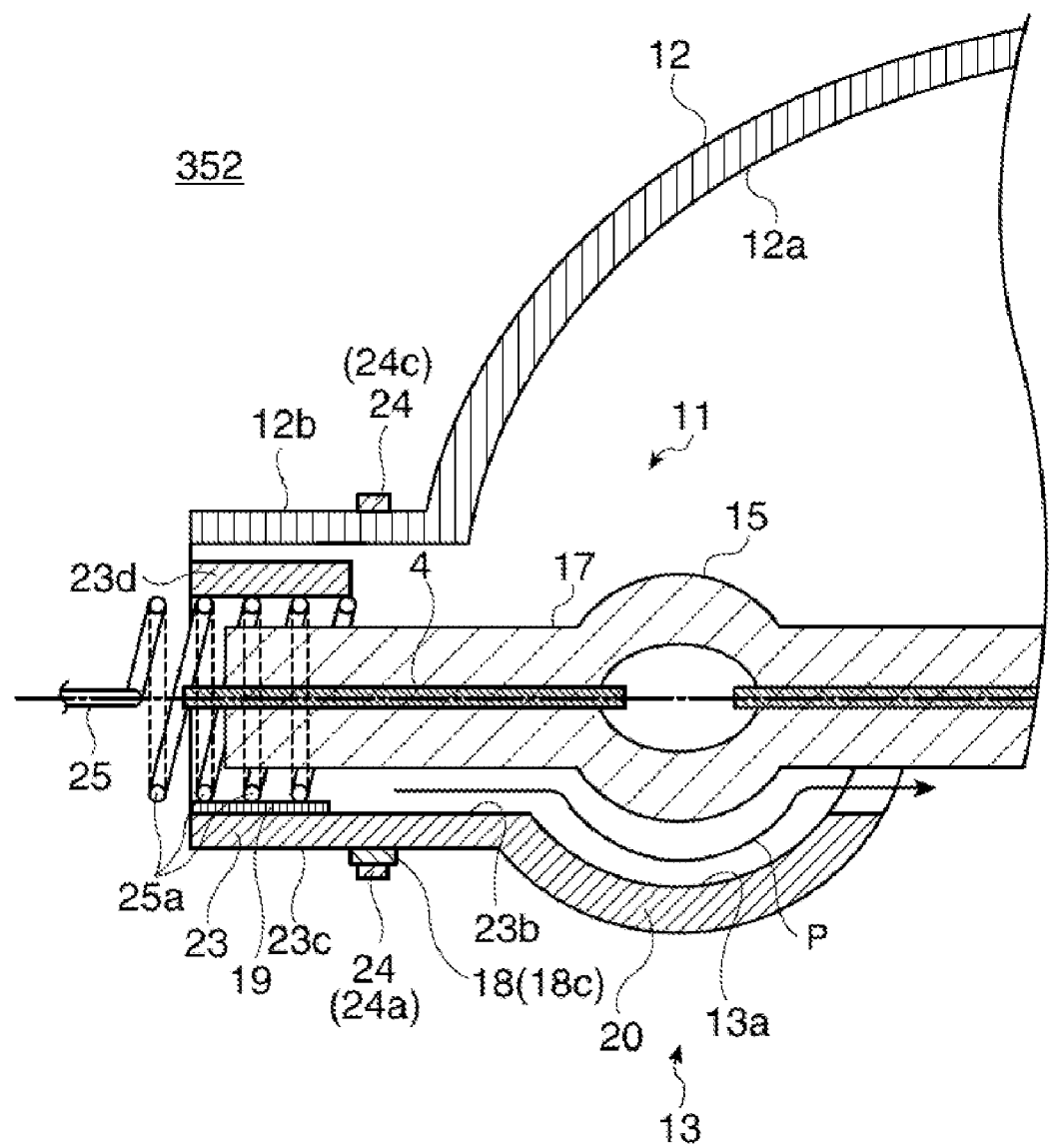
FIG. 37 is a lateral cross-sectional view of the light source unit according to the second modification.

FIG. 36 is an exploded perspective view showing the secondary reflector provided in the light source unit according to a second modification of the eleventh embodiment. FIG. 37 is a lateral cross-sectional view of the light source unit according to the second modification. In the second modification, the second power feeding member 25 assumes a coil shape formed into a helical shape having an outer diameter larger than an inner diameter of the cylindrical portion 23*d* of the extending portion 23. The second power feeding member 25 is formed of a metal wire. A portion of the second power feeding member 25 formed into the helical shape functions as the power feeding portion 25*a*.

By pushing and fitting the coil-shaped second power feeding member 25 onto the cylindrical portion 23*d* of the extending portion 23, the outer diameter of the second power feeding member 25 is compressed. As shown in FIG. 37, the power feeding portion 25*a* and the second cooling electrode 19 can be brought into tight contact with each other by the elastic force generated by the compression of the outer diameter of the second power feeding member 25. The second power feeding member 25 can be prevented from coming apart from the cylindrical portion 23*d* easily. In this manner, in the second power feeding member 25 according to the second modification, the power feeding portion 25*a* functions as the fitting portions to be fitted to the extending portion 23 of the secondary reflector 13.

A helical-shaped portion preferably assumes an irregular disordered shape rather than being a tidy circular shape when viewed from the front side or from the back side. In this manner, by forming the helical-shaped portion into the irregular shape, any portion formed into the irregular shape may come into contact with the second cooling electrode 19 easily when being fitted onto the cylindrical portion 23*d* of the extending portion 23, so that lowering of yield due to the contact failure or the like may be reduced. Also, a configuration in which the power cable is clipped at the proximal portion of the second power feeding member 25, or a configuration in which the second power feeding member 25 as the metal wire by itself is used as the power cable is also applicable.

Twelfth Embodiment

Figure 38:
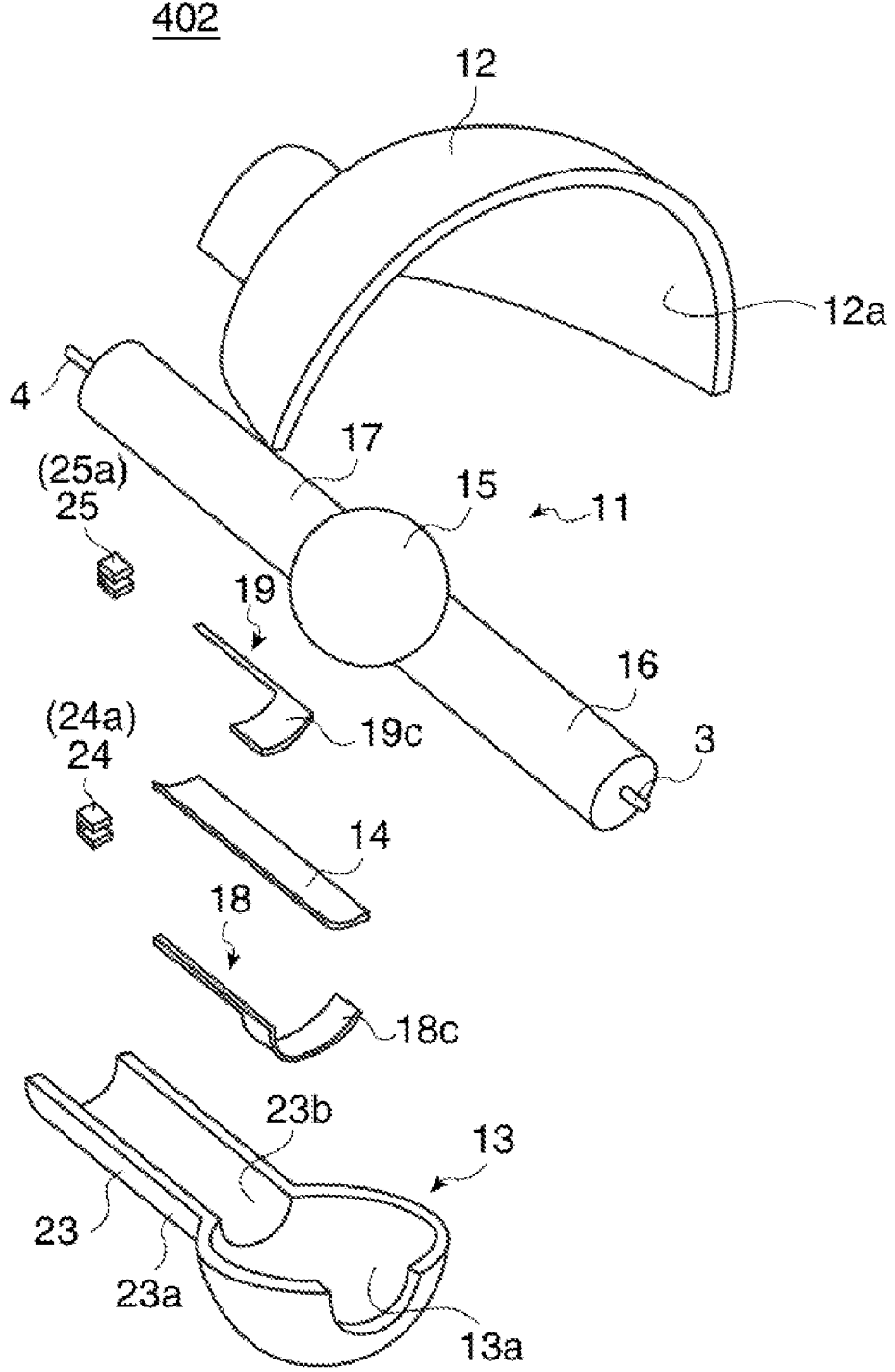
FIG. 38 is an exploded perspective view of a light source unit according to a twelfth embodiment of the invention.
Figure 39:
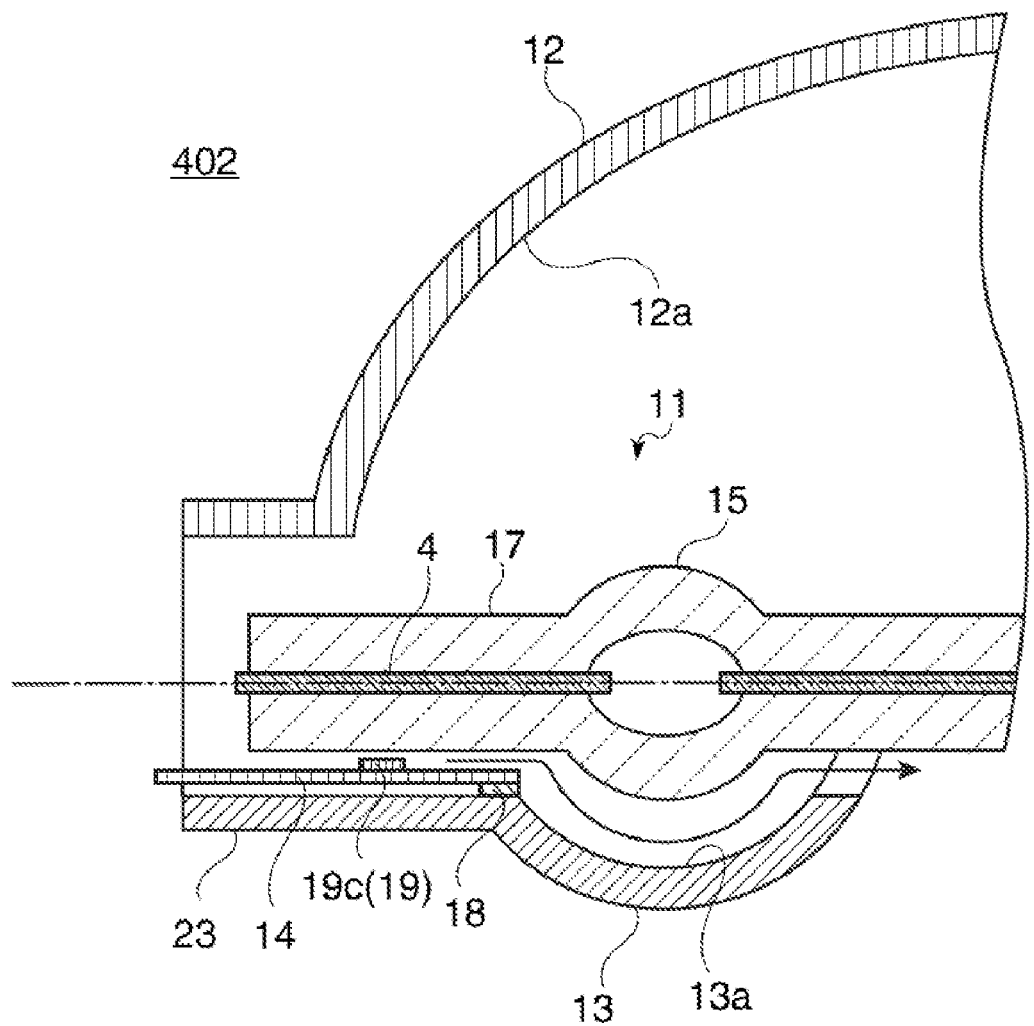
FIG. 39 is a cross-sectional view of the light source unit.

FIG. 38 is an exploded perspective view of a light source unit 402 according to a twelfth embodiment of the invention. FIG. 39 is a cross-sectional view of the light source unit 402 according to the twelfth embodiment. In the eleventh embodiment, the first cooling electrode 18 is arranged inside the secondary reflector 13. The insulating sheet (insulating film) 14 is provided between the first cooling electrode 18 and the second cooling electrode 19. As the insulating sheet 14, an insulating material formed into a sheet shape is used.

The first power feeding member 24 and the second power feeding member 25 having the same shapes and configurations are used as described in the first modification of the eleventh embodiment. In contrast, in this embodiment, the position where the first cooling electrode 18 is arranged and the presence or absence of the insulating sheet 14 are different from the first modification of the eleventh embodiment. Therefore, the cross-sectional configuration in which the first power feeding member 24 and the second power feeding member 25 are fitted to the extending portion 23 is different.

Figure 40:
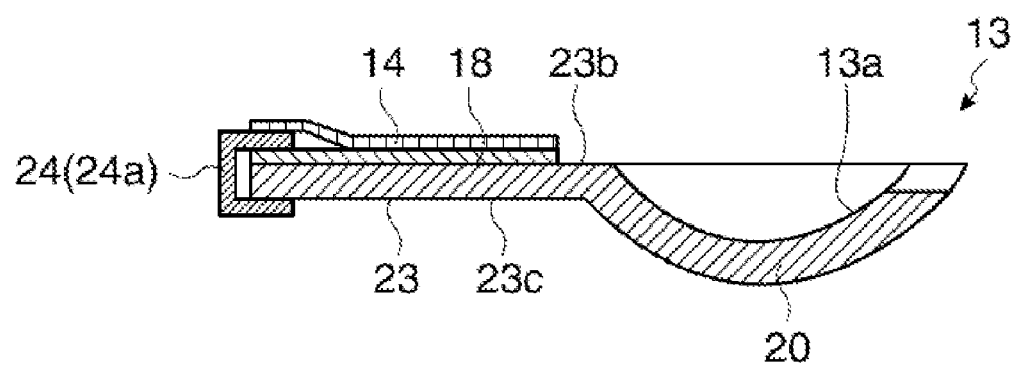
FIG. 40 is a lateral cross-sectional view showing a state of a first power feeding member in a fitted state.

FIG. 40 is a lateral cross-sectional view showing a state of the first power feeding member 24 in a fitted state. As shown in FIG. 40, the first power feeding member 24 is fitted onto the extending portion 23 so as to clip the first cooling electrode 18 and the extending portion 23 of the secondary reflector 13. Part of the first power feeding member 24 is covered with the insulating sheet 14.

Figure 41:
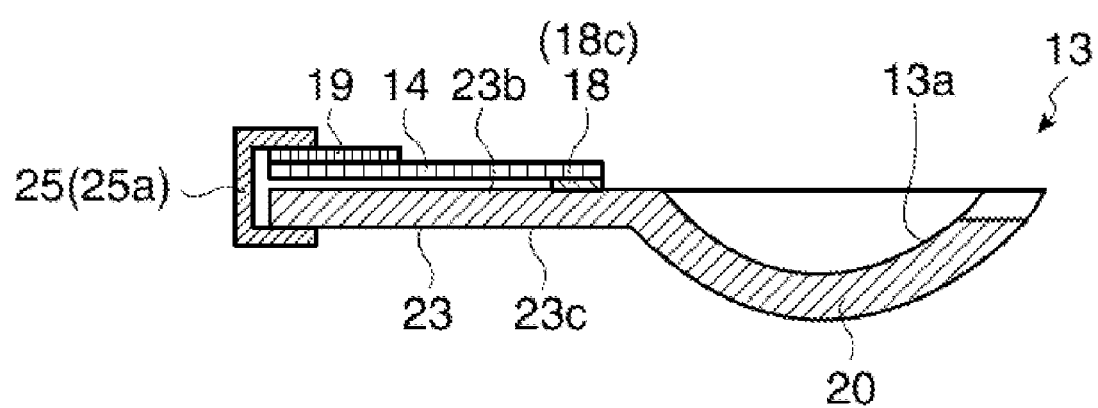
FIG. 41 is a lateral cross-sectional view showing a state of the second power feeding member in a fitted state.

FIG. 41 is a lateral cross-sectional view showing a state of the second power feeding member 25 in a fitted state. As shown in FIG. 41, the second power feeding member 25 is fitted onto the extending portion 23 so as to clip the second cooling electrode 19, the insulating sheet 14, and the extending portion 23 of the secondary reflector 13.

In the configuration as described above, the electric power can be supplied to the first cooling electrode 18 and the second cooling electrode 19 with high reliability by using the first power feeding member 24 and the second power feeding member 25.

The first cooling electrode 18 and the second cooling electrode 19 are connected to the voltage applying unit, not shown, and a voltage is applied between the electrodes 18 and 19 by the voltage applying unit. Consequently, the surface discharge is caused between the both electrodes 18 and 19. The air molecules ionized by the surface discharge near the discharging portion 19*c* of the second cooling electrode 19 are attracted toward the first cooling electrode 18 and move on the insulating sheet 14. The ionized air molecules collide with other air molecules when they are moving, and induce so-called the ionic wind from the second cooling electrode 19 toward the first cooling electrode 18. The voltage to be applied between the both electrodes 18 and 19 is preferably the AC voltage. With the generation of the ionic wind on the insulating sheet 14, the air between the light-emitting portion 15 and the secondary reflecting surface 13*a* is caused to flow. Accordingly, the portion of the arc tube 11 covered with the secondary reflector 13 can effectively be cooled down, and hence the appropriate temperature adjustment of the arc tube 11 is achieved.

In the same manner as other embodiments, by using the power feeding members 24 and 25, the power supply with high reliability is realized even under the high-temperature environment, namely, in the vicinity of the arc tube 11.

Thirteenth Embodiment

Figure 42:
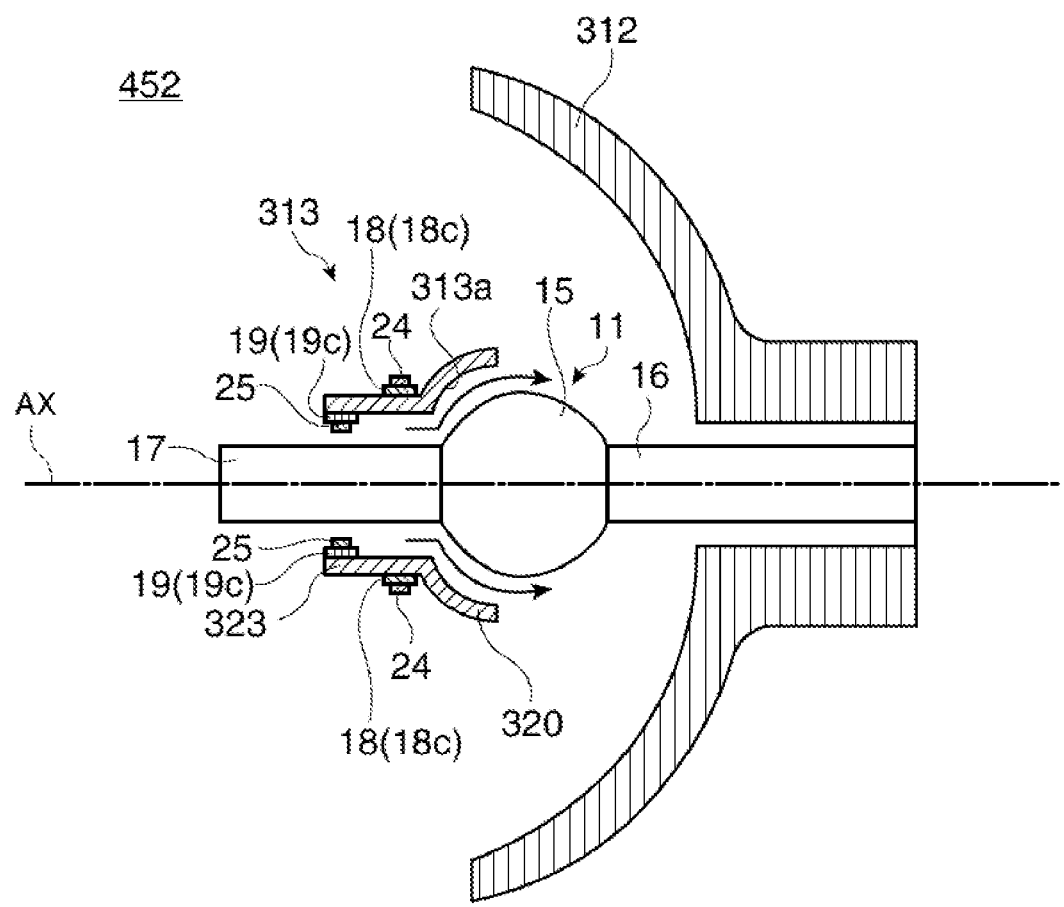
FIG. 42 is a lateral cross-sectional view of a light source unit according to a thirteenth embodiment of the invention.
Figure 43:
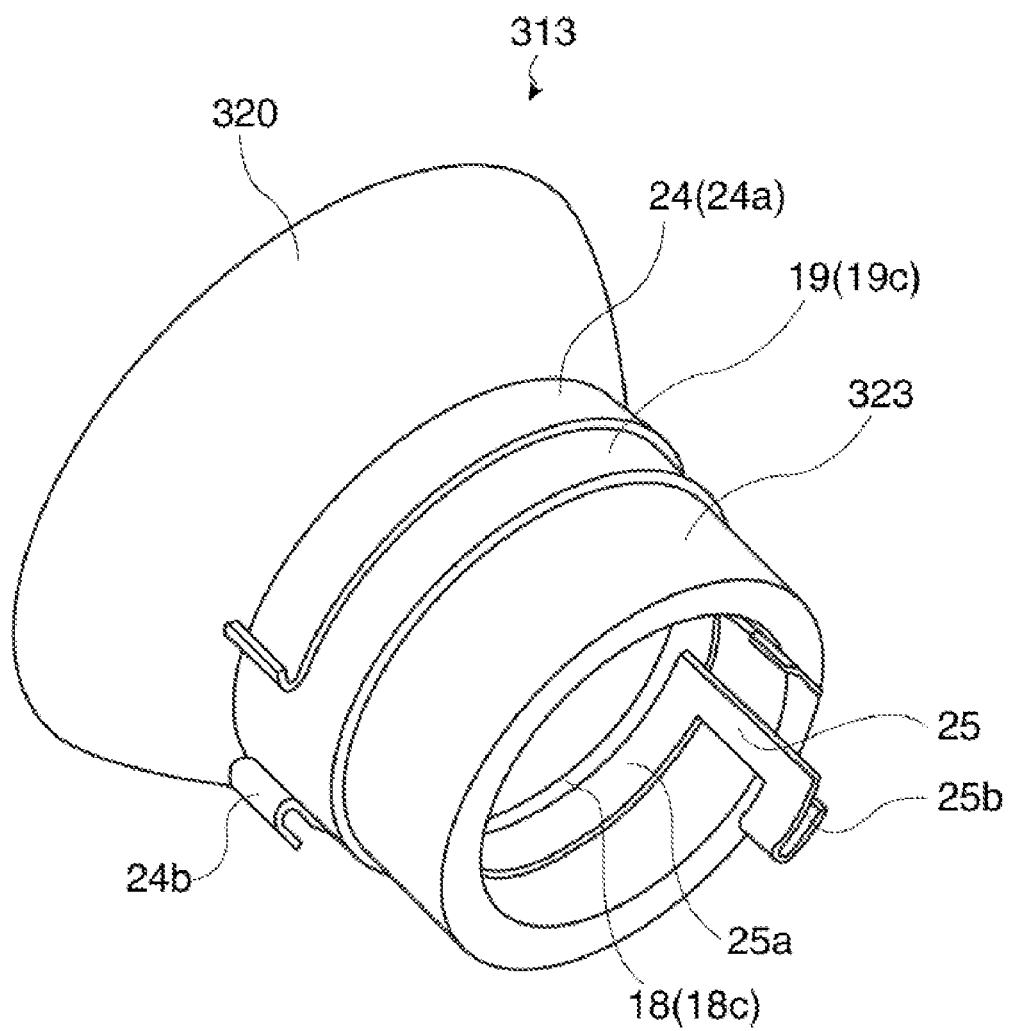
FIG. 43 is an external perspective view of the secondary reflector.
Figure 44:
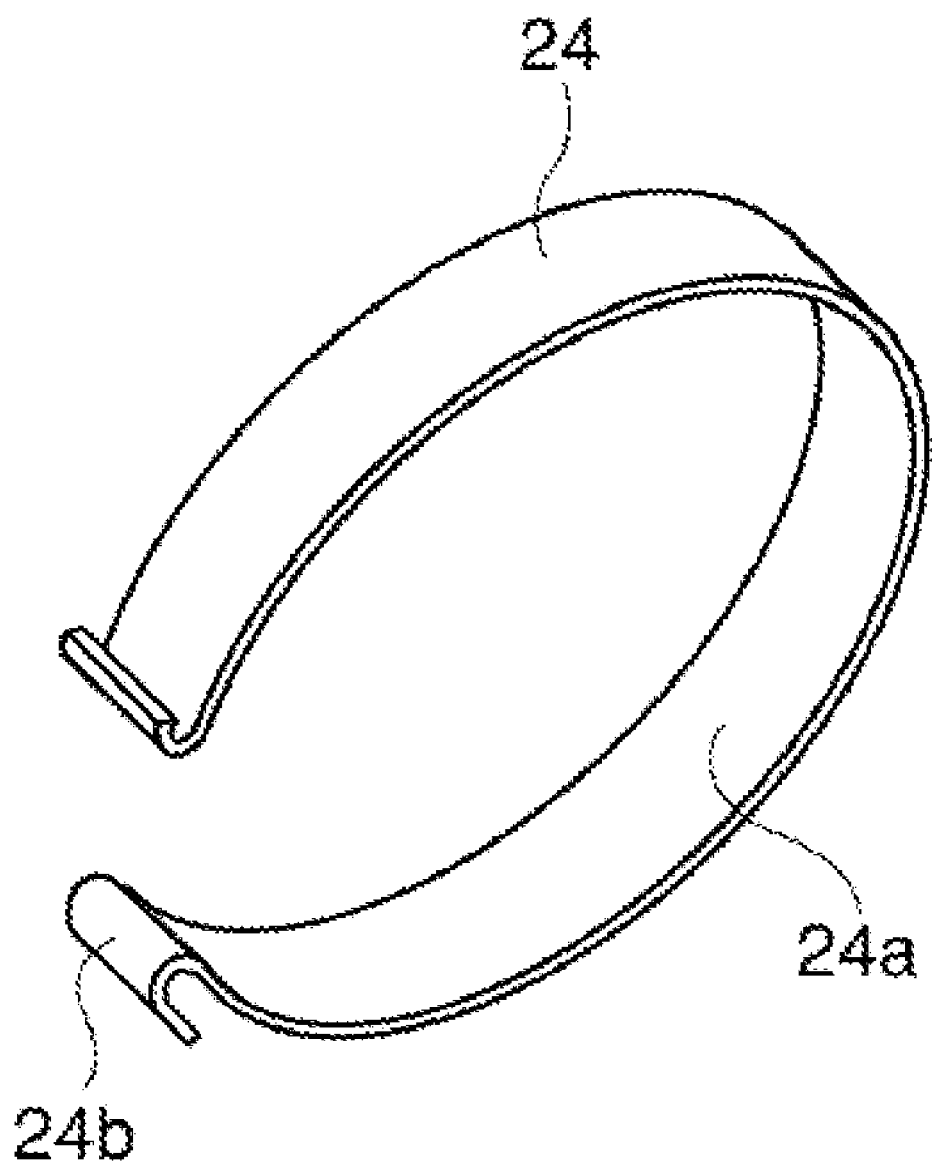
FIG. 44 is an external perspective view of the first power feeding member.
Figure 45:
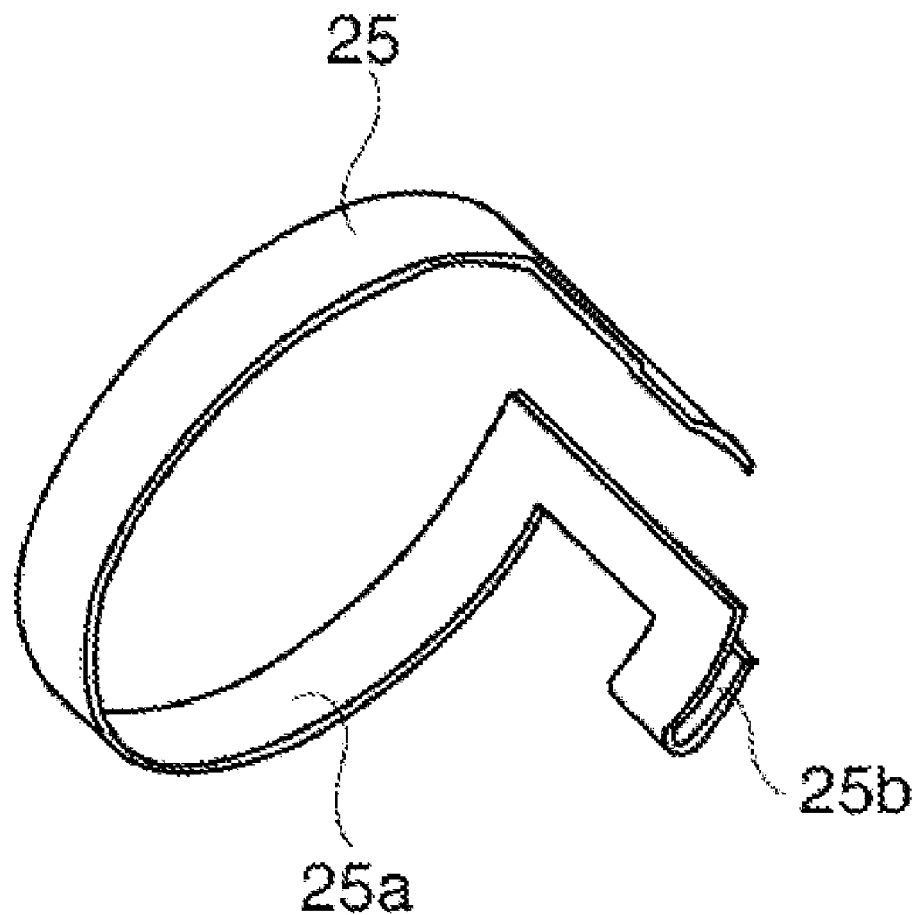
FIG. 45 is an external perspective view of the second power feeding member.

FIG. 42 is a lateral cross-sectional view of a light source unit 452 according to a thirteenth embodiment of the invention. FIG. 43 is an external perspective view of the secondary reflector. FIG. 44 is an external perspective view of the power feeding member 24. FIG. 45 is an external perspective view of the second power feeding member. The light source unit 452 according to the thirteenth embodiment is characterized in that the secondary reflector 313 is provided on the front side (the side of the surface to be irradiated) of the light-emitting portion 15.

The primary reflector 312 has substantially the same shape as the spheroid obtained by rotating the ellipse about the center axis AX. The primary reflector 312 is formed by evaporating the high-reflective member, for example, the dielectric multilayer film or the metallic member onto the surface of the base material formed into a desired shape. The primary reflector 312 is not limited to substantially the same shape as the spheroid and, may be substantially the same shape as the surface of revolution obtained by rotating the predetermined curved line such as the parabola or may be the shape of the free-form surface.

The secondary reflector 313 includes the secondary reflecting portion 320 formed with the secondary reflecting surface 313a and the extending portion 323. The secondary reflector 313 covers the periphery of the light-emitting portion 15 on the front side with respect to the light emitting portion 15 with the secondary reflecting portion 320. The secondary reflector 313 reflects the light emitted from the light-emitting portion 15 by the secondary reflecting surface 313a toward the light-emitting portion 15. A clearance is provided between the secondary reflecting surface 313a and the light-emitting portion 15. The secondary reflector 313 is formed by evaporating the dielectric multilayer film as a high-reflective member onto the surface of the base material formed into a desired shape. The base material used for the secondary reflector 313 in the thirteenth embodiment is an insulator. The dielectric multilayer film is also an insulator. With the provision of the primary reflector 312 and the secondary reflector 313, the light emitted from the light-emitting portion 15 is allowed to proceed efficiently toward the front.

The secondary reflector 313 is formed with the extending portion (first extending portion) 323 on the front side thereof so as to cover the first sealed portion 17 of the arc tube 11. The extending portion 323 is the cylindrical portion assuming a cylindrical shape which covers the periphery of the first sealed portion 17. In the thirteenth embodiment, the first sealed portion 17 of arc tube 11 is the sealed portion provided on the front side of the light-emitting portion 15.

The first cooling electrode 18 is arranged on the outside of the extending portion 323. The second cooling electrode 19 is bonded to the inside of the extending portion 323. In the thirteenth embodiment, the first cooling electrode 18 and the second cooling electrode 19 serve as a discharging portion as a whole. The second cooling electrode 19 is arranged so as to be shifted backward from the first cooling electrode 18. In this arrangement, the first cooling electrode 18 is arranged at a position shifted from the second cooling electrode 19 toward the light-emitting portion 15.

The first power feeding member 24 includes the power feeding portion 24a and the power receiving portion 24b. The power feeding portion 24a has substantially a C-shape having an inner diameter smaller than the outer diameter of the extending portion 323, and is fitted to the outside of the extending portion 323 and the first cooling electrode 18. Accordingly, the power feeding portion 24a is brought into tight contact with the first cooling electrode 18 by the elastic force of the first power feeding member 24. The power feeding portion 24a also functions as the fitting portion. The power receiving portion 24b is configured to hold the power cable (not shown) by clipping the same as described in the eleventh embodiment.

The second power feeding member 25 includes the power feeding portion 25a and the power receiving portion 25b. The power feeding portion 25a has substantially a C-shape having an outer diameter larger than an inner diameter of the extending portion 323, and is fitted to the inside of the extending portion 323 and the second cooling electrode 19. Accordingly, the power feeding portion 25a is brought into tight contact with the second cooling electrode 19 by the elastic force of the second power feeding member 25. The power feeding portion 25a functions as the fitting portion. The power receiving portion 25b is configured to clip and hold the power cable (not shown) as described in the eleventh embodiment.

In the configuration as described above, the first cooling electrode 18 and the second cooling electrode 19 are connected to the voltage applying unit, not shown, and a voltage is applied between the both electrodes 18 and 19, so that the surface discharge is caused between the both electrodes 18 and 19 arranged so as to interpose the extending portion 323 of the secondary reflector 313 as the insulator therebetween. The air molecules ionized by the surface discharge near the discharging portion 19c of the second cooling electrode 19 are attracted toward the first cooling electrode 18 and move between the extending portion 323 and the first sealed portion 17. The ionized air molecules collide with other air molecules when they are moving, and induce so-called the ionic wind from the second cooling electrode 19 toward the first cooling electrode 18. The voltage to be applied between the both electrodes 18 and 19 is preferably the AC voltage.

With the generation of the ionic wind between the extending portion 323 and the first sealed portion 17, the air between the light-emitting portion 15 and the secondary reflecting surface 313a is caused to flow. Accordingly, the portion of the arc tube 11 covered with the secondary reflector 313 can effectively be cooled down, and hence the appropriate temperature adjustment of the arc tube 11 is achieved.

In the same manner as other embodiments, by using the power feeding members 24 and 25, the power supply with high reliability is realized even under the high-temperature environment, namely, in the vicinity of the arc tube 11.

As described in the twelfth embodiment, a configuration in which the first cooling electrode 18 is arranged inside the extending portion 323 and the insulating sheet is provided between the first cooling electrode 18 and the second cooling electrode 19 is also applicable. In this case, the first power feeding member 24 may be formed to have the outer diameter larger than the inner diameter of the extending portion 323, and be fitted outside the insulating sheet. Also, the second power feeding member 25 may be fitted inside the insulating sheet.

Fourteenth Embodiment

Figure 46:
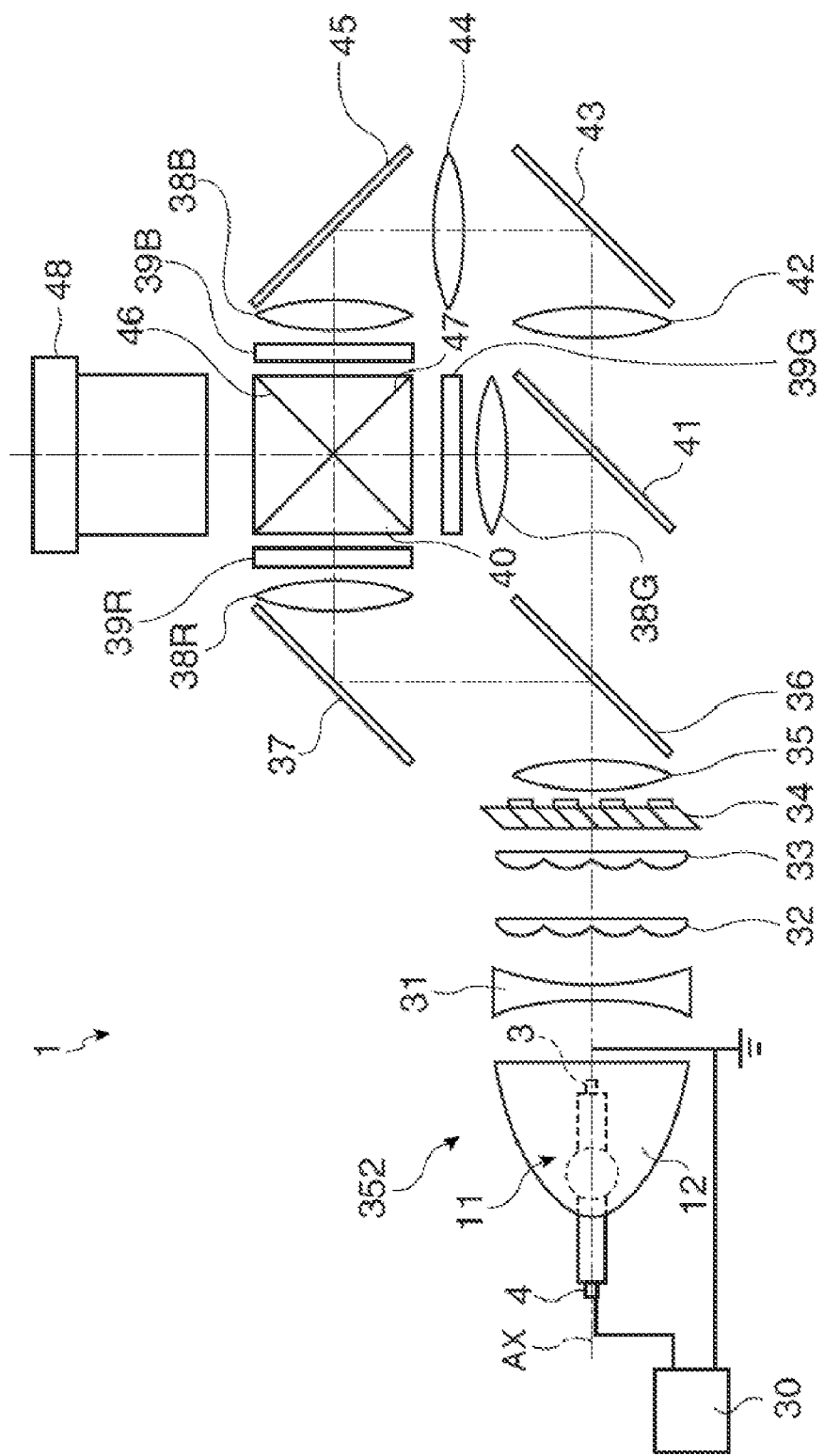
FIG. 46 is a drawing showing a schematic configuration of the projector according to a fourteenth embodiment of the invention.

FIG. 46 is a drawing showing a schematic configuration of the projector 1 according to a fourteenth embodiment of the invention. The projector 1 is the front projector configured to project light on the screen, not shown, and allow the viewers to appreciate the images by observing the light reflected from the screen. The projector 1 includes the light source unit 352 according to the eleventh embodiment (see also FIG. 27 to FIG. 33). The light source unit 352 emits light containing red (R) light, green (G) light, and blue (B) light. The voltage applying unit 30 is connected to the light source unit 352. The voltage applying unit 30 applies the AC voltage supplied from the power source (not shown) between the first cooling electrode 18 and the second cooling electrode 19. The first cooling electrode 18 is grounded.

In the projector 1 according to the fourteenth embodiment of the invention, the light emitted from the light source unit 202 is modulated by the R-light spatial light modulator 39R, the G-light spatial light modulator 39G, and the B-light spatial light modulator 39B, is passed through the projection lens 48, and is projected in the direction of the screen in the same manner as the projectors according to the above-described embodiments.

With the employment of the light source unit 352 which is capable of cooling down the light-emitting portion effectively while restraining occurrence of the problems such as the complication of the structure or the generation of noise, the projector 1 is capable of displaying the bright images stably with high efficiency in the simple configuration. If the state shown in FIG. 33 is the elect state and the state inverted vertically therefrom is defined as the inverted state, the upper side of the arc tube 11 is covered with the secondary reflector 13 when the light source unit 352 is used in the inverted state. In this inverted state, the heat is apt to stay between the light-emitting portion 15 and the secondary reflecting surface 13a. However, since the light-emitting portion 15 can be cooled down effectively by causing the air between the light-emitting portion 15 and the secondary reflector 13 to flow using the ionic wind, the probability of occurrence of malfunction due to the ineffective cooling is restrained and the stable operation of the projector 1 is achieved. Also, since the surface discharge can be utilized by arranging the secondary reflector 13 as the insulator so as to be interposed between the first cooling electrode 18 and the second cooling electrode 19, the AC voltage supplied from the power source can be applied without converting into the DC voltage. Therefore, the component for converting the voltage can be eliminated, and hence the cost reduction is achieved.

The light source unit used in the projector 1 is not limited to the light source unit 352 described in the eleventh embodiment, and the light source unit 402 described in the twelfth embodiment and the light source unit 452 described in the thirteenth embodiment may also be used.

The projectors in the embodiments described above are not limited to a case where a transmissive liquid crystal display apparatus is used as the spatial light modulator. As the spatial light modulator, a reflective liquid crystal display device (Liquid Crystal On Silicon; LCOS), DMD (Digital Micromirror Device), GLV (Grating Light Valve) and so on may be employed. The projector is not limited to a configuration in which the spatial light modulators are provided for the respective colored lights. The projector may have a configuration which modulates two, three or more of the colored lights by one spatial light modulator. The projector is not limited to the case where the spatial light modulator is used. The projector may be a slide projector using a slide provided with image information.

The shapes of the cooling electrodes in the embodiments described above are not limited to the shapes described in the embodiments described above. The shape of the cooling electrode must simply be the shape which can induce the ionic wind by the corona discharge or the surface discharge, and various shapes may be employed. Furthermore, the cooling electrode to which the electric power is supplied via the power feeding member is not limited to the configuration of being provided with the intermediary of the insulator therebetween, and a configuration which can induce the ionic wind by the corona discharge may also be employed.

The entire disclosure of Japanese Patent Application Nos. 2009-145047, filed Jun. 18, 2009, 2009-145048, filed Jun. 18, 2009, 2010-027332, filed Feb. 10, 2010 and 2010-085856, filed Apr. 2, 2010 are expressly incorporated by reference herein.

What is claimed is:

1. A light source unit comprising:
an arc tube having a light-emitting portion;
a secondary reflector covering part of the periphery of the light-emitting portion and being provided with a secondary reflecting surface for reflecting light emitted from the light-emitting portion;
a primary reflector having a primary reflecting surface for reflecting the light emitted from the light-emitting portion and the light reflected from the secondary reflector;
a first electrode; and
a second electrode;
wherein the second electrode is arranged at a position which causes an ionic wind to be induced by applying a voltage between the second electrode and the first electrode and causes air between the secondary reflecting surface and the light-emitting portion to flow, and
either one of the first electrode or the second electrode is arranged between the arc tube and the secondary reflector.

2. The light source unit according to claim 1, further comprising:
an insulator provided so as to be interposed between the first electrode and the second electrode, wherein
the arc tube further includes a first sealed portion provided integrally with the light-emitting portion on one side,
the secondary reflector further includes a first extending portion which covers the first sealed portion,
the second electrode is provided between the first sealed portion and the first extending portion, and
the first electrode is arranged so as to be shifted from the second electrode toward the light-emitting portion.

3. The light source unit according to claim 2, wherein the insulator is an insulating film provided between the first sealed portion and the first extending portion.

4. The light source unit according to claim 2, wherein the insulator is the secondary reflector.

5. The light source unit according to claim 4, wherein the first extending portion includes an opening formed at a position farther from the light-emitting portion than the second electrode so as to penetrate therethrough from a surface on the side of the light-emitting portion to an opposite surface therefrom.

6. The light source unit according to claim 4, wherein the arc tube includes a second sealed portion provided integrally with the light-emitting portion on the other side,
the secondary reflector includes:
a second extending portion which covers the second sealed portion,
a third electrode arranged between the secondary reflector and the arc tube, and
a fourth electrode arranged on the opposite side of the second extending portion from the side where the arc tube is provided, the third electrode is arranged so as to be shifted from the fourth electrode toward the light-emitting portion, and the ionic wind is induced by applying a voltage between the third electrode and the fourth electrode to allow the air between the secondary reflecting surface and the light-emitting portion to flow.

7. The light source unit according to claim 1, further comprising:

a first power feeding member fitted to at least one of the primary reflector and the secondary reflector so as to come into contact with the first electrode; and a second power feeding member fitted to at least one of the primary reflector and the secondary reflector so as to come into contact with the second electrode.

8. The light source unit according to claim 7, wherein at least one of the first power feeding member and the second power feeding member includes a power receiving portion to be connected to a power cable, and the power receiving portion clips and holds the power cable.

9. The light source unit according to claim 7, wherein at least one of the first power feeding member and the second power feeding member is fitted to the secondary reflector so as to clip part of the secondary reflector and the electrode.

10. The light source unit according to claim 9, wherein at least one of the first power feeding member and the second power feeding member clips the first extending portion from the opposite side of a surface to be irradiated.

11. The light source unit according to claim 7, wherein the first extending portion includes a cylindrical portion having substantially a cylindrical shape, and the second power feeding member has a coil shape formed into a helical shape having an outer diameter larger than an inner diameter of the cylindrical portion, and is fitted to an inner surface of the cylindrical portion so as to come into contact with the second electrode by being inserted into the cylindrical portion.

12. The light source unit according to claim 7, wherein the first extending portion includes the cylindrical portion having substantially the cylindrical shape, and the first power feeding member has substantially C-shape having an inner diameter smaller than an outer diameter of the cylindrical portion, and is fitted to an outer peripheral surface of the cylindrical portion so as to come into contact with the first electrode.

13. The light source unit according to claim 7, wherein the primary reflector includes a base portion which is secured to at least one of the first extending portion and the first sealed portion, and the first power feeding member is fitted to an outer peripheral surface of the base portion and comes into contact with the first electrode.

14. The light source unit according to claim 1, wherein the first electrode is arranged between the secondary reflector and the light-emitting portion, and is arranged so as to be shifted from the second electrode toward the light-emitting portion.

15. The light source unit according to claim 14, wherein the second electrode has a needle-like shape.

16. The light source unit according to claim 15, comprising:

a plurality of the second electrodes.

17. The light source unit according to claim 14, wherein an edge portion of the second electrode on the first electrode side has a sawtooth shape having a plurality of projections and depressions in plan view.

18. A projector comprising:

the light source unit according to claim 1;

a voltage applying unit configured to apply a voltage between the first electrode and the second electrode, and a spatial light modulator configured to modulate light emitted from the light source unit according to an image signal.

19. A projector according to claim 18, further comprising:

an insulator provided so as to be interposed between the first electrode and the second electrode, wherein the voltage applying unit applies an AC voltage between the first electrode and the second electrode.

20. The projector according to claim 18, wherein the first electrode is arranged between the secondary reflector and the light-emitting portion and is arranged so as to be shifted from the second electrode toward the light-emitting portion, and the voltage applying unit is configured to apply a voltage which causes a corona discharge and does not cause a spark between the first electrode and the second electrode.

* * * * *